United States Patent
Leblanc

(10) Patent No.: US 12,398,841 B2
(45) Date of Patent: Aug. 26, 2025

(54) MODULAR UTILITY SYSTEM

(71) Applicant: ARCHI ENTERPRISES INC., Vancouver (CA)

(72) Inventor: Alexander Leblanc, Vancouver (CA)

(73) Assignee: Archi Enterprises Inc., Vancouver (CA)

( * ) Notice: Subject to any disclaimer, the term of this patent is extended or adjusted under 35 U.S.C. 154(b) by 693 days.

(21) Appl. No.: 17/805,815

(22) Filed: Jun. 7, 2022

(65) Prior Publication Data

US 2022/0299159 A1 Sep. 22, 2022

Related U.S. Application Data

(63) Continuation of application No. 16/138,422, filed as application No. PCT/CA2017/050376 on Mar. 24, 2017, now Pat. No. 11,384,898.

(Continued)

(51) Int. Cl.
*F16B 7/20* (2006.01)
*B66C 23/62* (2006.01)
(Continued)

(52) U.S. Cl.
CPC .......... *F16M 11/425* (2013.01); *B66C 23/62* (2013.01); *F16B 7/0446* (2013.01); *F16B 7/20* (2013.01);
(Continued)

(58) Field of Classification Search
CPC ........ F16M 11/04; F16M 11/10; F16M 11/20; F16M 11/2014; F16M 11/2085;
(Continued)

(56) References Cited

U.S. PATENT DOCUMENTS 7,481,692 B2  1/2009  Bruder
8,157,470 B2  4/2012  DeWilde
(Continued)

FOREIGN PATENT DOCUMENTS

CA  2806014 A1  2/2012
CA  2835679 A1  5/2015
(Continued)

OTHER PUBLICATIONS

International Search Report and Written Opinion dated Jul. 20, 2017 issued in related PCT App. No. PCT/CA2017/050376 (8 pages).

*Primary Examiner* — Daniel J Wiley
(74) *Attorney, Agent, or Firm* — Osha Bergman Watanabe & Burton LLP

(57) ABSTRACT

A kit of portable modular components for use in demountably configuring a variety of structural assemblies. The kit comprises three types of elongate structural support components wherein the first type has a pair of opposed male ends, the second type has a male end and an opposed female end, and the third type has a pair of opposed female ends, wherein the male ends are configured for demountable engagement with the female ends. Each of the male ends comprises a cylindrical body with at least one linear set of two spaced-apart prongs around the circumferential surface of the cylindrical body. Each of the female ends has a cylindrical receptacle with one or more linear channels for receiving therein the cylindrical body and the at least one linear set of prongs. The female ends are provided with locking assemblies for releasable engagement the male ends.

52 Claims, 48 Drawing Sheets

Related U.S. Application Data

(60) Provisional application No. 62/312,617, filed on Mar. 24, 2016.

(51) Int. Cl.
*F16B 7/04* (2006.01)
*F16B 9/00* (2006.01)
*F16M 11/04* (2006.01)
*F16M 11/10* (2006.01)
*F16M 11/20* (2006.01)
*F16M 11/24* (2006.01)
*F16M 11/42* (2006.01)
*G03B 17/56* (2021.01)
*H04N 5/222* (2006.01)
*F16B 7/18* (2006.01)
*G12B 5/00* (2006.01)

(52) U.S. Cl.
CPC ............... *F16B 9/05* (2018.08); *F16M 11/04* (2013.01); *F16M 11/10* (2013.01); *F16M 11/20* (2013.01); *F16M 11/2014* (2013.01); *F16M 11/2085* (2013.01); *F16M 11/2092* (2013.01); *F16M 11/24* (2013.01); *F16M 11/42* (2013.01); *G03B 17/561* (2013.01); *H04N 5/222* (2013.01); *F16B 7/185* (2013.01); *F16M 2200/024* (2013.01); *F16M 2200/041* (2013.01); *F16M 2200/044* (2013.01); *G12B 5/00* (2013.01)

(58) Field of Classification Search
CPC .... F16M 11/2092; F16M 11/24; F16M 11/42; G03B 17/561; H04N 5/222; B66C 23/62
See application file for complete search history.

(56) References Cited

U.S. PATENT DOCUMENTS

| | | | |
|---|---|---|---|
| 8,192,105 B2 * | 6/2012 | Keyvanloo | A47B 47/0016 403/348 |
| 8,801,491 B2 | 8/2014 | Bruder | |
| 2019/0154194 A1 * | 5/2019 | Leblanc | F16M 11/42 |
| 2020/0216104 A1 * | 7/2020 | Leblanc | B62B 3/02 |
| 2021/0139063 A1 * | 5/2021 | Leblanc | B66C 23/18 |

FOREIGN PATENT DOCUMENTS

| | | | |
|---|---|---|---|
| CN | 2320830 | Y | 5/1999 |
| CN | 2638359 | Y | 9/2004 |
| CN | 101504100 | A | 8/2009 |
| CN | 202901653 | U | 4/2013 |
| CN | 203395524 | U | 1/2014 |
| CN | 203453665 | U | 2/2014 |
| CN | 103827408 | A | 5/2014 |
| CN | 104508210 | A | 4/2015 |
| CN | 105275932 | A | 1/2016 |
| EP | 0111439 | A1 | 6/1984 |
| EP | 1284172 | A1 | 2/2003 |
| FR | 1174089 | A | 3/1959 |
| FR | 2488057 | A1 | 2/1982 |
| GB | 1316861 | A | 5/1973 |
| JP | S52149021 | U | 11/1977 |
| JP | 2002121891 | A | 4/2002 |
| JP | 2013540456 | A | 11/2013 |
| WO | 1996024002 | A1 | 8/1996 |
| WO | 2009072219 | A1 | 6/2009 |
| WO | 2016038325 | A1 | 3/2016 |
| WO | 2017161461 | A1 | 9/2017 |
| WO | 2017218326 | A1 | 12/2017 |
| WO | 2018047059 | A1 | 3/2018 |

* cited by examiner

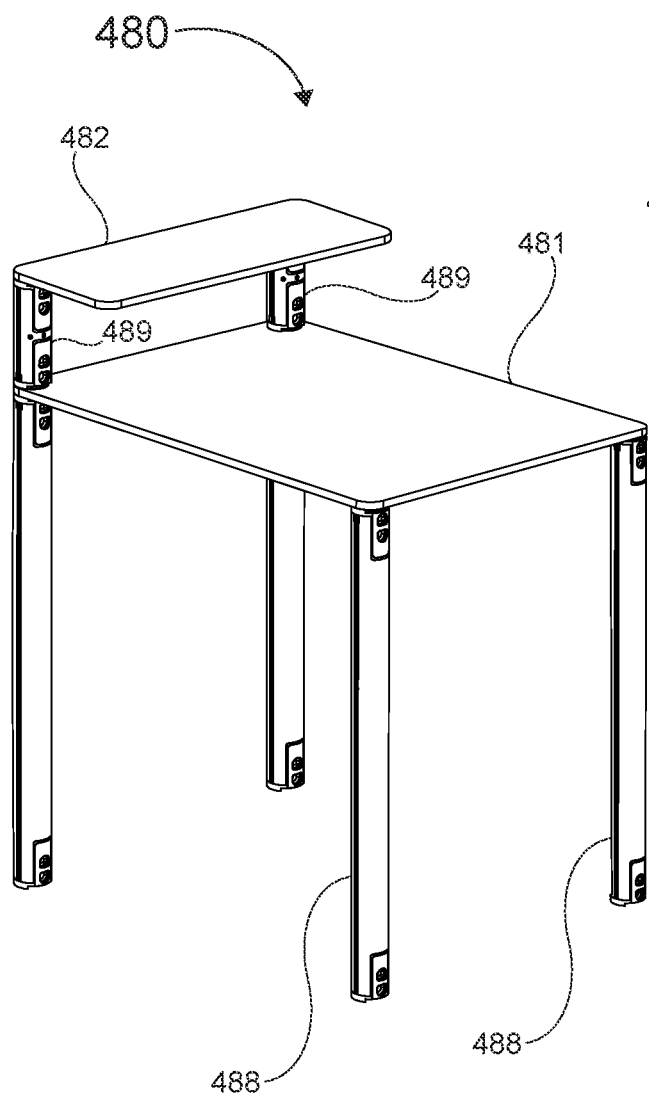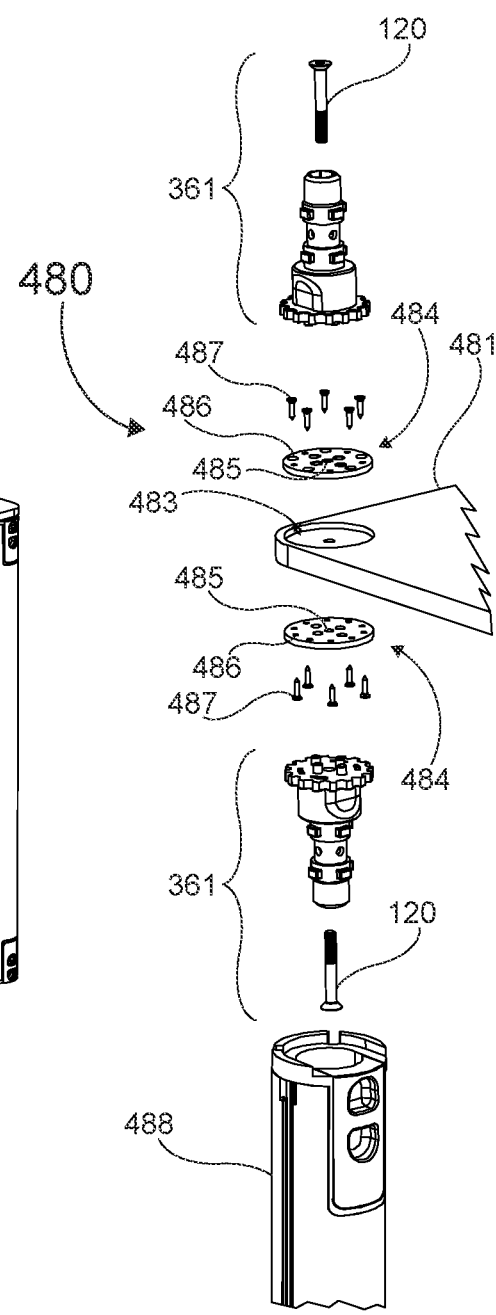

490

490

500

500

MODULAR UTILITY SYSTEM

CROSS REFERENCE TO RELATED APPLICATION

This non-provisional application is a continuation of U.S. patent application Ser. No. 16/138,422 filed on Sep. 21, 2018, which claims priority to International Application PCT/CA2017/050376 filed Mar. 24, 2017 which claims the benefit of and priority to U.S. Provisional Patent Application No. 62/312,617 filed Mar. 24, 2016, which is incorporated herein by reference in its entirety.

TECHNICAL FIELD

The present disclosure relates to the field of utility equipment and, in particular, to modular components for demountable engagement into various configurations of assemblies for use in engagement and/or support and/or operation and/or conveyance of equipment for multiple utility purposes.

BACKGROUND

Utility equipment of various forms is essential to every industry and can range vastly in both size and complexity in order to meet the particular needs of a selected industry. Irrespective of the industry, most utility equipment is designed to have a single function. Consequently, a variety of utility equipment is required to meet the various needs of a selected industry.

The filmmaking industry is one example of such an industry requiring various specialized utility equipment. Cinematic techniques in filmmaking, videography, and photography have increased in both scale and complexity. Such cinematic techniques depend on a wide range of utility equipment, in particular camera support equipment, that provide filmmakers with the technical means to create the camera shots needed for a scene or a cinematographic effect. Additionally, the necessary portability of film set equipment and properties of many kinds requires a large variety of carts, wheelbarrows, stands and the like to execute efficient movement around a working location.

Various types of camera and motion support equipment are available and are widely used by filmmakers and photographers. Some commonly used equipment include, for example, jibs or cranes to provide the ability to add vertical and sideways movement to a shot, and with the ability to achieve a high angle shot, depending on the size of the jib. Various types of dollies similarly range in size from the very large to compact systems to provide smooth rolling camera movement thereby enabling the addition of horizontal motion to a shot. Handheld and body-supported stabilizers and gimbals allow a smooth shot to be taken while the operator is walking, while maintaining the ability to control the pan and tilt movements of the camera. Sliders, for another example, are essentially a condensed, mountable version of a dolly on a supported track and provide smooth movement along a straight path.

Each type of camera support equipment is designed to allow certain camera angles or dynamic motion. In this way, each type of camera support equipment is designed to provide a particular function to achieve a particular type of shot, with consideration of the challenges presented by a particular filming location. The functionality and usability of each type of camera support equipment is therefore limited and often results in the need to employ multiple types of camera support equipment for a given project. The limited versatility of camera support equipment has meant that each type is typically used individually or can sometimes be used in various combinations in order to provide filmmakers with some options for achieving a scene or effect. These options, however, are difficult to orchestrate, often due to the limitations of the location and the typically large and bulky size of the equipment and the cumbersome nature of transporting and setting up of the equipment, requiring time, money, and effort.

Although current systems attempt to address challenges in portability and set-up/break-down of camera support equipment, there continues to be a need for systems that are easy to transport and to assemble, and further offer versatility and multi-functionality for supporting creative camera angles and motion without necessarily requiring a multitude of types of support equipment.

The limitations found with camera support equipment are common with utility equipment in other industries such as construction, staging and others.

SUMMARY

The present disclosure generally relates to modular utility system assemblies for engaging, supporting, manipulation of and operation of tools, equipment, instruments and other types of loads. More specifically, this disclosure pertains to sturdy and durable utility system assemblies for temporary use on a work site or location wherein the assemblies can be configured and quickly assembled by interconnecting and securely engaging a plurality of modular structural support components along with a selection modules designed for mounting, and optionally for operation, of tools or equipment or instruments, modules having rolling components such as wheels, castors and the like, end-capping modules, and other types of modules that may be useful in configuring such modular utility system assemblies. After the need for a modular utility system assembly has been satisfied and the assembly is no longer required on a work site or location, it can be quickly and easily dis-assembled into the individual modular elements that can be collected together for transport or storage.

One embodiment of the present disclosure relates to three types of elongate structural support components wherein the first type has a pair of opposed male ends, the second type has a male end and an opposed female end, and the third type has a pair of opposed female ends, wherein the male ends are configured for demountable engagement with the female ends. Each of the male ends comprises a cylindrical body with one or more linear set(s) of two spaced-apart prongs on the circumferential surface of the cylindrical body. Each of the female ends has a cylindrical receptacle with one or more linear channels for receiving therein the cylindrical body and the at least one linear set of prongs. The female ends are provided with locking assemblies for releasable engagement of the male ends.

According to one aspect, a cylindrical body of a male end may have two or more linear sets of two or more spaced-apart prongs wherein the linear sets are equidistantly spaced apart around the circumferential surface of the cylindrical body. According to another aspect, a cylindrical receptacle of a female end may have two or more equidistantly spaced-apart linear channels to receive therein the cylindrical body having two or more linear sets of prongs.

According to one aspect, the male ends of the first and/or second types of elongate structural support components may be rotatable within the female cylindrical receptacles of the second and/or third types of elongate structural support components. According to another aspect, the male ends of the first and/or second types of elongate structural support components may be fixed and securely engaged within the female cylindrical receptacles of the second and/or third types of elongate structural support components so that the male ends are not rotatable within the female receptacles.

According to another embodiment of the present disclosure, one or more of the three types of elongate structural support components may have an elongate structural element interposed the two opposing ends of the elongate structural support components. According to one aspect, the elongate structural element may be tubular or rod-like. According to another aspect, the elongate structural element may have a circular cross-section or an elliptical cross-section or a square cross-section or a rectangular cross-section or a trapezoidal cross-section or a triangular cross-section or a hexagonal cross-section or an octagonal cross-section or a decagonal cross-section or an I-shaped cross-section.

Another embodiment of the present disclosure relates to modules configured for demountable engagement of an imaging device and/or a sound recording device and/or a sound reproduction device and/or a lighting device and/or a light-directing device. Some modules may be provided with wheels or castors or rollers, and the like. Some modules may be provided with seats or caps or weight components. Some modules may be provided with hand grips or fixed foot pegs or adjustable foot pegs, end-caps, and the like. Some modules may have telescoping mechanisms whereby one of the ends may be controllably extended out of the modules and then controllably retracted into the modules. Some modules may comprise two mating components that can be used for clamping onto cylindrical components.

Another embodiment of the present disclosure pertains to mounting blocks to which may be engaged one or more male ends configured as disclosed herein. According to some aspects, the mounting blocks may be elbow-shaped, cubes, triangles, pyramids, hexagonal, octagonal, and the like.

Some embodiments of the present disclosure relate to kits containing pluralities of multiple modular components disclosed herein.

Some embodiments of the present disclosure relate to modular elongate structural support components and to modules for demountable engagement of other elements thereto, that have been down-sized to make them suitable for handling and use by juveniles during play and learning activities.

BRIEF DESCRIPTION OF THE DRAWINGS

These and other features of the disclosure will become more apparent in the following detailed description in which reference is made to the appended drawings, wherein:

FIGS. 1A and 1B are perspective views of an example of a male/receptacle closed-tube rotator module with one male component extending longitudinally from the closed-tube end, wherein FIG. 1A is a perspective view with the male component extending forward with a tension-adjustment screw knob shown on the left, and FIG. 1B is a perspective view of the rear of the male/receptacle closed-tube rotator module with the tension-adjustment screw knob shown on the right;

FIG. 3A is a perspective view of an example of a 2-way closed-tube rotator hub assembly, while

FIGS. 5A and 5B are perspective views of the double-receptacle extension-tube rotator module shown in FIG. 4 configured into a 4-way hub assembly having two male member side-mount assemblies demountably engaged with the side walls of the extension-tube housing, wherein FIG. 5A is a whole view and FIG. 5B is a partially exploded view;

FIG. 6A shows a 3-way hub assembly having one joiner receptacle, a linearly aligned male component, and one male member side-mount assembly demountably engaged with the side wall of the joiner closed-tube housing. FIG. 6B shows a 5-way hub assembly having one receptacle, a linearly aligned male component, and three male member side-mount assemblies;

FIGS. 8A and 8B illustrate an example of a male/receptacle side-opening joiner module having one side-opening receptacle and a linearly aligned male member extension-tube end assembly, wherein FIG. 8A is a whole perspective view and FIG. 8B is an exploded perspective view;

FIGS. 9A and 9B illustrate an example of a double-male joiner module, wherein FIG. 9A is a whole perspective view and FIG. 9B is an exploded perspective view;

FIGS. 10A and 10B illustrate an example of a double-male extension-tube joiner module having at each end a male member extension-tube end assembly, wherein FIG. 10A is a whole perspective view and FIG. 10B is an exploded perspective view;

FIGS. 11A and 11B show the double-male extension-tube joiner module from FIG. 10 reconfigured into a 6-way hub assembly, wherein FIG. 11A is a whole perspective view and FIG. 11B is a partially exploded perspective view;

FIGS. 12A and 12B illustrate an example of a double-male adapter joiner module, wherein FIG. 12A is a whole perspective view and FIG. 12B is an exploded perspective view;

FIGS. 13A-13D illustrate examples of variants of side-mount bracket modules wherein FIG. 13A is an exploded perspective view of a 30° side-mount bracket module having a 30° angle male member mount bracket and an optional clamp bracket, FIG. 13B is an exploded perspective view of a multi-angle side-mount bracket module having two multi-angle male member mount brackets being demountably engaged with four bracket screws, FIG. 13C is a perspective view of an example of a 90° offset side-mount bracket module, and FIG. 13D is a perspective view of an example of a 45° offset side-mount bracket module;

FIGS. 14A-14F illustrate examples of variants of male member mounting block modules wherein FIG. 14A shows a 90° elbow male member mounting block module, FIG. 14B shows a cube male member mounting block module, FIG. 14C shows a triangular male member mounting block module, FIG. 14D shows a pyramidal male member mounting block module, FIG. 14E shows a hexagonal male member mounting block module, and FIG. 14F shows an octagonal male member mounting block module;

FIGS. 15A and 15B show an example of a 5° increment adjustable male member mount module wherein FIG. 15A is a whole perspective view of the module, and FIG. 15B is an exploded perspective view of the module;

FIGS. 16A and 16B show an example of a baseplate module in an assembly having two mounting brackets and three male member plate assemblies wherein FIG. 16A is a whole perspective view of the module, and FIG. 16B is an exploded perspective view of the module;

FIGS. 17A and 17B show another example of a baseplate assembly wherein FIG. 17A is a whole perspective view of the assembly, and FIG. 17B is an exploded perspective view of the assembly, configured with one of a first example of a double-receptacle extension-tube joiner module and two of a first example of male/receptacle extension-tube joiner modules;

FIGS. 18A and 18B are perspective views of an example of a tray assembly, wherein FIG. 18A is a whole view, and FIG. 18B is a partial exploded view of the assembly, configured with four of a second example of double-receptacle extension-tube joiner modules;

FIGS. 19A and 19B are perspective views of an example of a desk assembly wherein FIG. 19A is a whole view, and FIG. 19B is a partial exploded view showing some details of the assembly, configured with two of a first example of double-receptacle side-opening joiner modules and four of a second example of double-receptacle side-opening joiner modules;

FIGS. 20A-20D are perspective views of two examples of lighting mount modules wherein FIGS. 20A and 20B are a whole view and a partially exploded view, respectively, of a ⅝" spigot lighting mount module, and FIGS. 20C and 20D are a whole view and an exploded view, respectively, of a spigot-adapter lighting mount module;

FIGS. 23A-23D are perspective views of two examples of wheel modules wherein FIGS. 23A and 23B are a whole view and a partially exploded view, respectfully, of a wheel module assembly having a standard wheel attached by an axle bolt to a wheel-axle/receptacle side-opening joiner module, while FIGS. 23C and 23D are a whole view and an exploded view, respectfully, of a caster wheel module assembly;

FIGS. 24A and 24B are a whole perspective view and an exploded perspective view, respectively, of an example of a leveling foot module, while

FIGS. 25A and 25B, are a partially exploded perspective view and a whole perspective view, respectively, of an example of a pivotable support module demountably engaged with a pad component, while

FIGS. 26A and 26B are perspective views of an example of a weight module assembly wherein FIG. 26A is a whole view and FIG. 26B is a partially exploded view of the assembly configured with one of a second double-receptacle extension-tube rotator module;

FIGS. 27A-27C illustrate an example of a telescoping extension module wherein FIG. 27A is a whole perspective view, FIG. 27B is an exploded perspective view, and FIG. 27C is a cross-sectional view showing the threaded rod and retaining components contained therein;

FIGS. 28A-28E illustrate an example of a grip end-cap module wherein FIG. 28A is a perspective view showing the outer sleeve of the module in a locked position, FIG. 28B is an exploded perspective view, FIG. 28C is an exploded perspective view showing the outer sleeve in the locked position, FIG. 28D is a top view showing the outer sleeve in an unlocked position, and FIG. 28E is a top view showing the outer sleeve in the locked position;

FIGS. 29A and 29B are perspective views of an example of a shell end-cap module mounted onto one of a first male/receptacle extension-tube rotator module wherein FIG. 29A is a whole view and FIG. 29B is a partially exploded view;

FIGS. 30A and 30B are a whole perspective view and an exploded perspective view, respectively of an example of a female dome pad end-cap module mounted onto the exemplary shell end-cap module shown in FIG. 29, while

DETAILED DESCRIPTION

Definitions

Figure 1A:
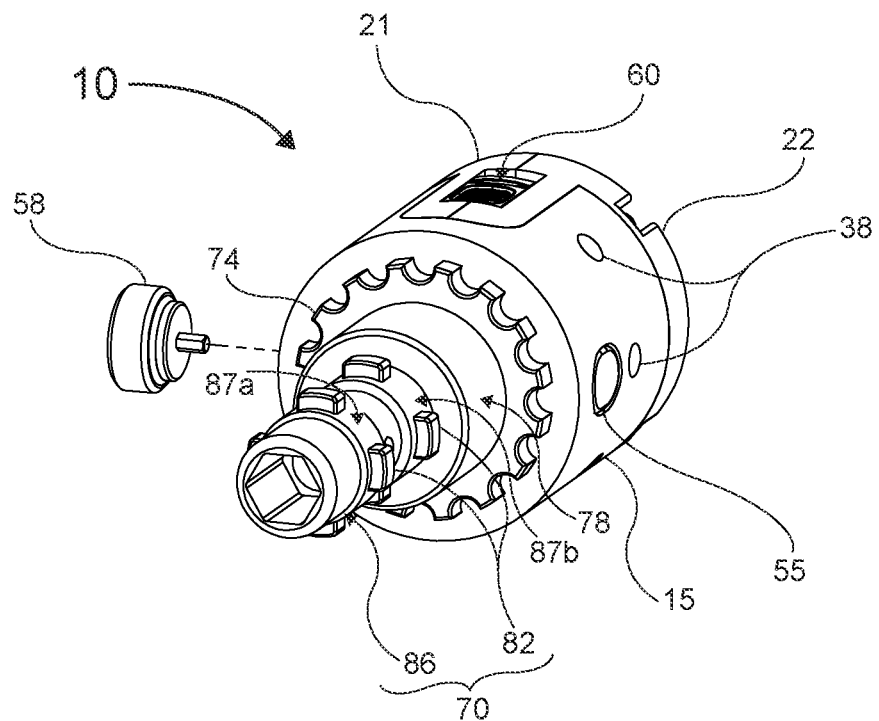

Unless defined otherwise, all technical and scientific terms used herein have the same meaning as commonly understood by one of ordinary skill in the art to which this disclosure relates.

As used herein, the term "about" refers to an approximately +/−10% variation from a given value. It is to be understood that such a variation is always included in any given value provided herein, whether or not it is specifically referred to.

As used herein, the term "perspective view" refers to a three-dimensional view of a component or a module or an assembly disclosed herein that portrays height, width, and depth of the component or module or assembly for a more realistic image and representation.

As used herein, the term "top view" refers to an illustration of a component or a module or an assembly that looks directly down on the top surface of the component or module or assembly.

As used herein, the term "back view" refers to an illustration of a component or a module or an assembly that looks horizontally and directly at the rear of the component or module or assembly.

As used herein, the term "front view" refers to an illustration of a component or a module or an assembly that looks horizontally and directly at the front of the component or module or assembly.

As used herein, the term "side view" refers to an illustration of a component or a module or an assembly that looks horizontally and directly at a side of the component or module or assembly.

As used herein, the term "bottom view" refers to an illustration of a component or a module or an assembly that looks directly up on the bottom surface of the component or module or assembly.

As used herein, the terms "rotator module" or "rotator assembly" mean a component or assembly that is configured for demountable engagement with another module or assembly with a controlled rotational functionality whereby a structurally secure and stable connection is provided between the two modules or assemblies. A rotator module may comprise: (i) one rotator receptacle and an opposed male end; (ii) two opposed rotator receptacles; or (iii) one rotator receptacle and an opposed joiner receptacle, separated by a cylindrical tube or rod, or a square tube or rod, or a rectangular tube or rod, or a trapezoidal tube or rod, or a triangular tube or rod, or a hexagonal tube or rod, or an octagonal tube or rod, or a decagonal tube or rod, or an I-shaped tube or rod wherein the tube or rod may be of varying lengths to provide varying lengths of extension between the receptacles, or between the receptacles and male ends. Certain rotator modules defined as "hub module" or "hub assembly", may be configured to provide pivotable and lockable angular interconnection points for a plurality of modules within an assembly system.

As used herein, the terms "joiner module" or "joiner assembly" mean a component that is configured to provide a demountable structural connection and extension between selected modules. A joiner module may comprise: (i) one joiner receptacle and an opposed male end; (ii) two opposed joiner receptacles; or (iii) two male ends, which are separated by a cylindrical tube or rod, or a square tube or rod, or a rectangular tube or rod, or a trapezoidal tube or rod, or a triangular tube or rod, or a hexagonal tube or rod, or an octagonal tube or rod, or a decagonal tube or rod, or an I-shaped tube or rod wherein the tube or rod may be of varying lengths to provide varying lengths of extension between the joiner receptacles, or between the joiner receptacles and male ends, or between the male ends. Certain joiner modules defined as "hub module" or "hub assembly" may be configured to provide pivotable and lockable angular interconnection points for a plurality of modules within an assembly system.

As used herein, the terms "hub module" or "hub assembly" mean a component or assembly that is configured to provide a structural angular interconnection point between selected modules. A hub module or assembly may comprise multiple male members and/or receptacles in various numbers and orientations to provide a variety of structural configuration options. Hub modules and hub assemblies may be defined, according to some embodiments, to be of a group of modular components wherein each module or assembly is configured for a different structural requirement having a different number and orientations of male members and/or receptacles. According to some embodiments, hub modules and hub assemblies may be defined as a modular configuration comprising a demountable assembly of one or more male members with other modules such as, for example, a joiner module or a rotator module, to thereby provide a particular function to the hub modules or hub assemblies and whereby direct structural demountable connections can be made by the added male members.

As used herein, the term "male member mount modules" means a category of modules, which include male member side-mount bracket modules and male member mounting block modules, having a demountable engagement mechanism for fixed or pivotable incorporation into an assembly, allowing for special-function hub assemblies.

As used herein, the terms "tool support module" and "load support module" mean a category of modules having a demountable engagement mechanism for fixed or pivotable incorporation into an assembly wherein the tool support module or load support module directly interface with a selected tool or load. A tool support assembly and load support assembly may be configured by a user for pivotable or fixed attachment of a selected tool or load to the assembly.

As used herein, the terms "baseplate module" and "baseplate assembly" mean a module or assembly configured for stable and secure demountable engagement with a camera, a microphone, or other tool or supported load.

As used herein, the terms "tray module" or "tray assembly" refer to a component that is configured to provide a pivotable or fixed box-support function or tray-support function for transporting equipment, properties, materials, supplies, and the like around a worksite or other location.

Alternatively, a tray module or tray assembly may be used as a shelving system, or a table, or a staging platform.

As used herein, the terms "table module" or "table assembly" or "desk module" or "desk assembly" or "shelf module" or "shelf assembly" refer to a component or modular assembly that provides a table or workstation or shelving configuration, or alternatively may be used as a staging platform.

As used herein, the term "lighting mount module" refers to a component or modular assembly that may be incorporated into an assembly to provide a lighting mount spigot or other attachment means for demountable engagement with standard lighting equipment or other similar loads.

As used herein, the term "base modules" means a category of modules having a demountable engagement mechanism for fixed or pivotable attachment into an assembly to provide roller modules, or wheel modules, or counterbalance/base weight modules, or foot modules, or extendable support modules for an assembly.

As used herein, the terms "rail-rolling module" means a modular assembly configured with two pairs of inline wheel assemblies to provide a rolling or sliding function on a rail track assembly.

As used herein, the terms "rail-surround rolling module" means a modular assembly configured with two opposed sets of two pairs of inline wheel assemblies configured to provide a rolling or sliding function on a rail track assembly.

As used herein, the term "rail track assembly" refers to a modular assembly configured to receive and support thereon a rail-rolling module or alternatively, a rail-surround rolling module to provide a desired pathway for transport thereealong of a support assembly. Rail track assemblies may be straight or curved, and may optionally have flexible lengths to enable assembly of desired curves and curvilinear configurations.

As used herein, the term "wheel module" means a modular assembly having a fixed or alternatively a pivotable wheel, for demountable engagement into a support assembly to provide the support assembly with a rolling functionality. The wheels may be pneumatic, solid rubber, plastic, or foam.

As used herein, the terms "weight module" and "weight assembly" refer to a component or modular assembly that provides an operational counterweight, base weight, or weighted foot module functionality within a support assembly. Weight modules and weight assemblies can be configured in a variety of sizes, weights, and modules to provide a diverse range of support options.

As used herein, the term "telescoping extension module" means a component providing a two-way structural extension having a length-adjustment mechanism to enable extension and retraction of the linear length of the module.

As used herein, the term "leveling foot module" means a component for assemblies requiring a foot component with a height-adjustment mechanism to facilitate configurations of assemblies to be positioned on uneven surfaces or terrain.

As used herein, the term "end-cap modules" means a category of modules having a demountable engagement mechanism to provide a terminus and a grip function or a handle function or a foot function or a pad function or a bumper function or a cap function, that may be incorporated into a structural support assembly.

As used herein, the term "seat module" means a modular assembly with a seat component for incorporation into a structural support assembly where there is a requirement for an onboard operator such as in a ride-along dolly assembly, or alternatively, as a component of a stool, bench, or workstation assembly.

As used herein, the term "unit scale" refers to the scalable units of measure within which the relative proportions of the configurable modular components of a system may be universally constructed to allow cross-compatibility of the modules, and in any stated values used to inform cross-compatibility and not to be intended to limit the sizes or relative proportions of a system of the present disclosure. The units of measure may be in system format units-of-scale, metric format, or imperial format.

As used herein, the term "system format" means shared-design characteristics of scale and demountable engagement features of a group of modules disclosed herein, wherein each of the modules comprises similar or compatible mechanisms to facilitate demountable engagement with each of the other modules, and which may optionally share a system-wide unit scale.

The modular utility and support assemblies disclosed herein comprise a plurality of modules that may be demountably engaged into a wide assortment of combinations to thereby form assemblies that can be used in various stationary and mobile load-bearing equipment and materials support capacities. The modularity of the systems allows them to be disassembled into individual modular assemblies and/or components to facilitate ease of transport and storage. As well, the modularity of the systems disclosed herein enables multi-functionality in that the individual modules can be easily configured into one type of assembly, and then quickly and easily broken down for transport and/or storage, and then demountably engaged into new configurations of different types of assemblies with different types of functionalities.

The modular components disclosed herein generally comprise a demountable engagement mechanism that enable the modules to be quickly, easily, stably, and securely interconnected and locked into place. In this way, modules can be quickly and securely interconnected into a wide variety of useful utility assemblies for demountably engaging, supporting, and manipulating various types of tools, equipment, instruments, and the like. Alternatively, modules can be quickly and securely interconnected into a wide variety of useful utility assemblies for containing and transporting loads about a site, for example a work site or recreational site, and once a utility assembly has been completed on a site, it can then be quickly and easily dismantled by disengagement and disassembly of the individual modules for removal and transport to a storage facility or alternatively, to another site for use to configure other types of utility assemblies.

There is no limit on the types of utility systems that can be configured and assembled by demountable engagement of the modular components disclosed herein. Most utility assembly configurations will generally comprise a plurality of rotator modules, a plurality of joiner modules, a plurality of hub modules and/or hub assemblies, a plurality of male member mount modules, a plurality of tool/load support modules, a plurality of base modules, and a plurality of end-cap modules wherein the plurality of modules interconnect together in varying arrangements to form various utility or support systems.

One embodiment of the present disclosure relates to three types of portable modular components that can be used for demountable engagement with each other to configure a wide variety of structural assemblies. The first type of portable modular components comprises an elongate structural support component having a pair of opposed male ends. The second type of portable modular components comprises an elongate structural support component having a pair of opposed ends wherein a first end is a male end and a second end is a female end. The third type of portable modular components comprises an elongate structural support component having a pair of opposed female ends. The male ends of the first and second types of portable modular components are configured for demountable engagement with the female ends of the second and third types of portable modular components.

According to another embodiment of the present disclosure, the first type of elongate structural support component and/or the second type of elongate structural support component and/or the third type of elongate structural support component may have an elongate structural element interposed the pair of opposed ends. According to one aspect, the elongate structural element may be a tube. According to another aspect, the elongate structural element may be a rod.

According to one aspect, each of the male ends may comprise a cylindrical body with at least one linear set of prongs, or more than one set spaced apart, on the circumferential surface of the cylindrical body wherein each set of prongs has two or more spaced-apart prongs. According to some aspects, some of the male ends may have two linear sets of prongs spaced apart around the circumference of the cylindrical body, or alternatively, between three and twelve sets of prongs spaced apart around the circumference of the cylindrical body. According to some aspects, each set of prongs may have between one and eight spaced-apart prongs. According to some aspects, some of the male ends may have no prongs.

According to another aspect, each of the female ends may have a cylindrical receptacle for receiving therein a male cylindrical body disclosed herein. The female receptacle may have at least one linear channel for slidingly receiving therein the prongs of the male ends. According to some aspects, some of the female ends may have receptacles with two linear channels spaced apart around the circumference of the receptacle for receiving therein a male cylindrical body having two linear sets of prongs spaced apart around the circumference of the cylindrical body. Alternatively, some of the female ends may have receptacles with between three and twelve spaced-apart linear channels for slidingly receiving therein a male cylindrical body having between three and twelve linear sets of prongs spaced apart around the circumference of the cylindrical body. According to another aspect, each linear channel in the receptacle(s) of the female ends of the second type or third type of elongate structural support components or elements may have one or more side channels extending therefrom fully or partially around the cylindrical receptacle for rotational and demountable engagement with the spaced-apart prongs on a male cylindrical body. According to another aspect, a female end may have no linear channels where demountably engaging a male cylindrical body of a male end having no prongs. According to another aspect, some of the female ends may be provided with a locking assembly for releasable engagement therewith one of the male ends.

According to another embodiment of the present disclosure, one or more male ends of the first type or second type of elongate structural support components or elements may be rotatable around a longitudinal axis of the second type or third type of elongate structural support components or elements.

According to another embodiment of the present disclosure, one or more female ends of the second type or third type of elongate structural support components or elements may be rotatable around a longitudinal axis of the first type or second type of elongate structural support components or elements.

According to another embodiment of the present disclosure, one or more of the first type of elongate structural support components or elements, and/or the second type of elongate structural support components or elements, and/or the third type of elongate structural support components or elements may have one male end extending radially outward therefrom, wherein the male end comprises a cylindrical body with at least one linear set of prongs, or more than one set spaced apart, on the circumferential surface of the cylindrical body, wherein the male end is configured for rotational and demountable engagement with a female end. According to one aspect, there may be two or more male ends extending radially outward, in the same plane or a different plane, from the first type of elongate structural support components or elements, and/or the second type of elongate structural support components or elements, and/or the third type of elongate structural support components or elements, wherein each of said male ends comprises a cylindrical body with at least one linear set of prongs, or more than one set spaced apart, on the circumferential surface of the cylindrical body, wherein the male ends are configured for rotational and demountable engagement with female ends.

Another embodiment of the present disclosure pertains to end-cap modules having a male end component for demountable engagement with a female end of the second type of elongate structural support components or elements, or of the third type of elongate structural support components or elements. Another embodiment of the present disclosure pertains to end-cap modules having a female end component for demountable engagement with a male end of the first type of elongate structural support components or elements, or of the second type of elongate structural support components or elements.

The modularity of the components and assemblies disclosed herein enables and facilitates the customization of utility assemblies. According to some embodiments disclosed herein, there is provided a customizable kit comprising pluralities of various modular components that may be assembled into selected or certain types of desired utility assemblies and/or support assemblies. In this way, the modular components, assemblies, and systems of the present disclosure provide on-site versatility and ease-of-use. For the purposes of illustrating the versatility and ease-of-use and configuration of the present modules, the following non-limiting description will refer to examples of utility assemblies that are useful for demountable engagement with cameras, sound equipment, lighting equipment, props, and other types of equipment used in filmmaking, videography, and photography applications, as well as some general utility-cart applications, and as well as some general workstation applications.

Some examples of embodiments of the modular components and modular assemblies of the present disclosure will be described in reference to FIGS. 1-33 to illustrate various types of demountably engageable modules that may be securely and stably interconnected and assembled into many different configurations for engaging, supporting, and conveying various types of utility equipment and/or tools and/or devices and/or components, and/or parts and/or materials and/or supplies within and around a film set or a production studio or a photography studio or a performance venue or a sporting venue, or other locations commonly used for filming movies, videos, television programs, sports, news, documentaries, music videos, time-lapse photography, and still photography. Those skilled in these arts will understand how to securely and stably demountably engage the modules and modular assemblies disclosed herein for assemblies that will be useful in other types of sites such as construction, landscaping, agricultural, industrial, healthcare, retail, warehouses and the like, or alternatively, for use in some household and recreational applications. The numbers and types of modules that may be incorporated into a particular assembly will vary depending on the intended end-use of the utility or support system. However, an assembled system will generally comprise: one or more of a group of rotator modules exemplified in FIGS. 1 to 5; one or more of a group of joiner modules exemplified in FIGS. 6 to 12; one or more of a group of male member mount modules exemplified in FIGS. 13 to 15; one or more of a group of hub modules and hub assemblies exemplified in FIGS. 3, 5 to 7, 11, and 13 to 15; one or more of a group of tool/load support modules exemplified in FIGS. 16 to 20; one or more of a group of base modules exemplified in FIGS. 21 to 27, and one or more of a group of end-cap modules exemplified in FIGS. 28 to 33.

The modules can be used to assemble a variety of utility systems and support structures, for example, dollies, carts, tracks, stands, tables, workstations, seating, shelving, bedframes, railings, staging, partitions, and the like. FIGS. 34-48 illustrate examples of various types of utility and support assemblies that can be configured by combinations of the modular components and modular assemblies disclosed herein.

It should be noted that all the modules disclosed herein provide universal interconnectivity into a variety of utility system assemblies to provide a wide range of functional capabilities, or alternatively, a specialized functionality. After the need for the assemblies is concluded, they are easily dismantled into the individual modular components for transport and/or storage. For example, baseplate modules and assemblies such as those exemplified in FIGS. 16 and 17 are useful for securing thereto a camera, microphone, or such equipment or tool. According to other embodiments, one or more tray modules and one or more table/desk modules (FIGS. 18 and 19) can be configured for transporting equipment, materials, supplies, and the like around a location, and may be configured as a mobile or stationary workstation. One or more lighting mount modules (FIG. 20) can be incorporated into a utility system assembly for demountable engagement thereto of lighting or sound or other similar equipment. According to other embodiments, wheel modules (FIG. 23) can be configured to provide a rolling function to a system assembly, or foot modules (FIGS. 24 and 25) may be included for stationary setups. According to other embodiments, a system assembly may comprise one or more rail-rolling modules (FIGS. 21 and 22) upon which a system can travel on, or be passed through by, an extended length or series of rail track assemblies (FIGS. 34, 35, 36, 39 and 43). Additionally, weight modules (FIG. 26) can be included in a system for structural counterbalancing and base stability options when required. Additionally, a system assembly may include one or more telescoping extension modules (FIG. 27). One or more of a group of end-cap modules (FIGS. 28 to 33), including handle, foot, pad, seat, bumper, and cap components and modules may also be provided within a system for functions of various end-use requirements.

Demountable Engagement Mechanisms

A key feature of the embodiments of the present disclosure pertains to mechanisms enabling and facilitating quick, stable and secure demountable engagement of one module with another module so that the modules are securely and stably locked together. Some of the modules disclosed herein have one end or both ends configured to provide a functional pivot point that allows rotational movement in 360° at the one end or both ends.

FIGS. 1 to 33 depict a range of exemplary interconnecting modules which generally embody the structural components and framework of the exemplary utility systems and support structures disclosed herein. Each of these modules comprises all or part of a reversible joining mechanism, according to embodiments of the present disclosure, and are referred to for illustration purposes. It will be understood that all or part of the varying embodiments of the reversible joining mechanism can be made a component of any module to allow interconnection into a larger system according to embodiments described herein. A reversible joining mechanism may comprise a receptacle in one module, as illustrated in units 11, 211, 252, configured to receive and engage, on another module, a male member having a male component 70.

The male component 70 generally comprises a cylindrical body having a first collar 87*a* (i.e., the distal collar) with a chamfered leading edge 86 that functions as a retaining-lock chamfer, and a neck 88 separating the first collar 87*a* from a second collar 87*b* (i.e., the proximal collar). Four prongs 82 extend radially outward from each of the collars 87*a*, 87*b*. The prongs 82 are configured for sliding engagement, for example, with prong-retaining slots 223 provided therefor in a joiner receptacle 211 (FIG. 6), or with prong-retaining slots 262 provided therefor in a side-opening joiner receptacle 252, or with prong-retaining slots 630 provided therefor in a grip end-cap module 625 (FIG. 28). Alternatively, prongs 82 may be unobstructed within a rotator receptacle 11 (FIGS. 1, 3, and 5) to allow a full 360° rotation of a male component 70 within the receptacle 11. A male component may have two to eight spaced apart collars with each collar having two to twelve spaced-apart prongs 82 extending outwardly therefrom for slidable engagement with a receptacle configured to receive and engage the male component.

Some of the modules disclosed herein may have a receptacle 11 in a housing 15 provided with reversible joining mechanism that comprises a pivot lock 60 for releasable engagement with a male end of another module. According to an aspect, a module housing may have two or more spaced-apart pivot locks 60 situated around the circumference of the module housing. As shown in FIG. 2, some modules may have a pivot lock 60 with a pivot-lock indexing peg 62 which reversibly locks its module against a second module whereby the indexing peg 62 extends into a pivot-lock sprocket 74, 112, 216, 272, 284, 362, 396, 423, 506 (FIGS. 1, 3, 6, 9, 10, 13, 15, 16, 20, respectively). A pivot-lock sprocket may have around its outer edge, for example, sixteen slots that provide sixteen locking positions at 22.5° increments.

Rotator Modules

The exemplary rotator modules shown in FIGS. 1-5, 26, and 29 comprise a reversible joining mechanism as disclosed herein, thereby allowing the modules to be reversibly interconnected with other modules of the system. The rotator modules are configured to provide a rotation functionality for various pivotable connection points between selected modules throughout an assembly. According to some embodiments, a rotator module can provide a pan and/or tilt function for a tool support module or a load support module or tool support assembly or a load support assembly and device mounted thereon such as a camera or other load.

Also, a rotator module can provide other functional pivot points within an assembly, for example, such as a wheel module's directional and/or drive rotation.

According to some embodiments, a tool support assembly or a load support assembly may comprise one or more of a group of closed-tube rotator modules having different lengths, which may be sized in reference to a system format-wide unit scale to help facilitate cross-compatibility of the modules of a system. For example, a closed-tube rotator module may have a 2-unit length and a 2-unit diameter, where a unit is 30 mm.

Figure 1B:
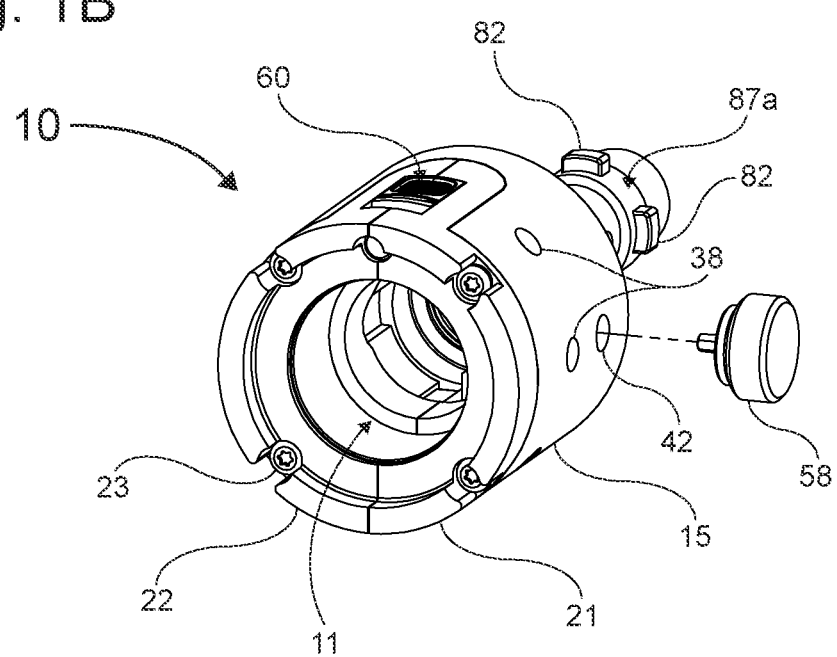
Figure 2:
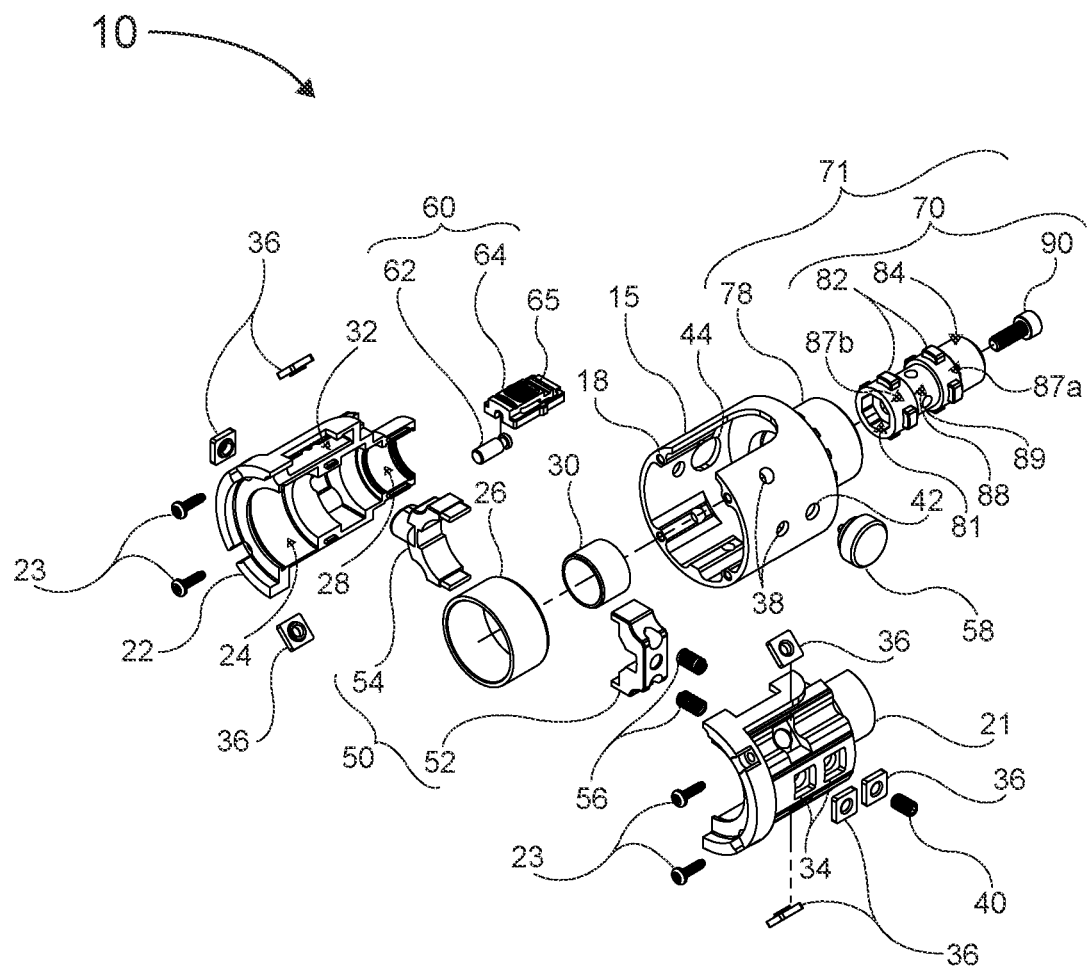
FIG. 2 is an exploded perspective view from the rear of the male/receptacle closed-tube rotator module shown in FIG. 1.
Figure 3A:
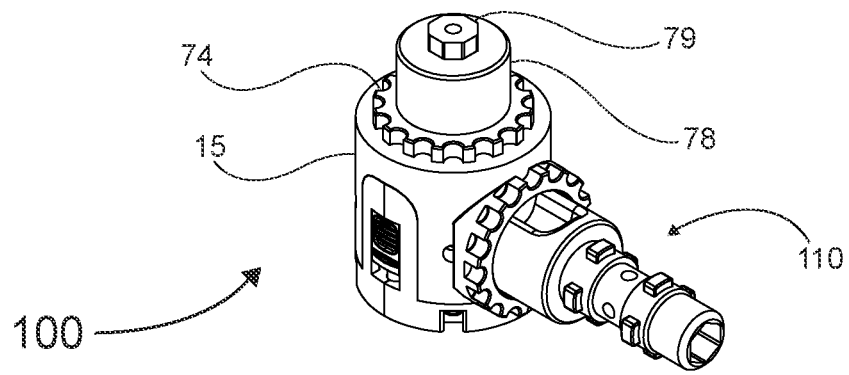
Figure 3B:
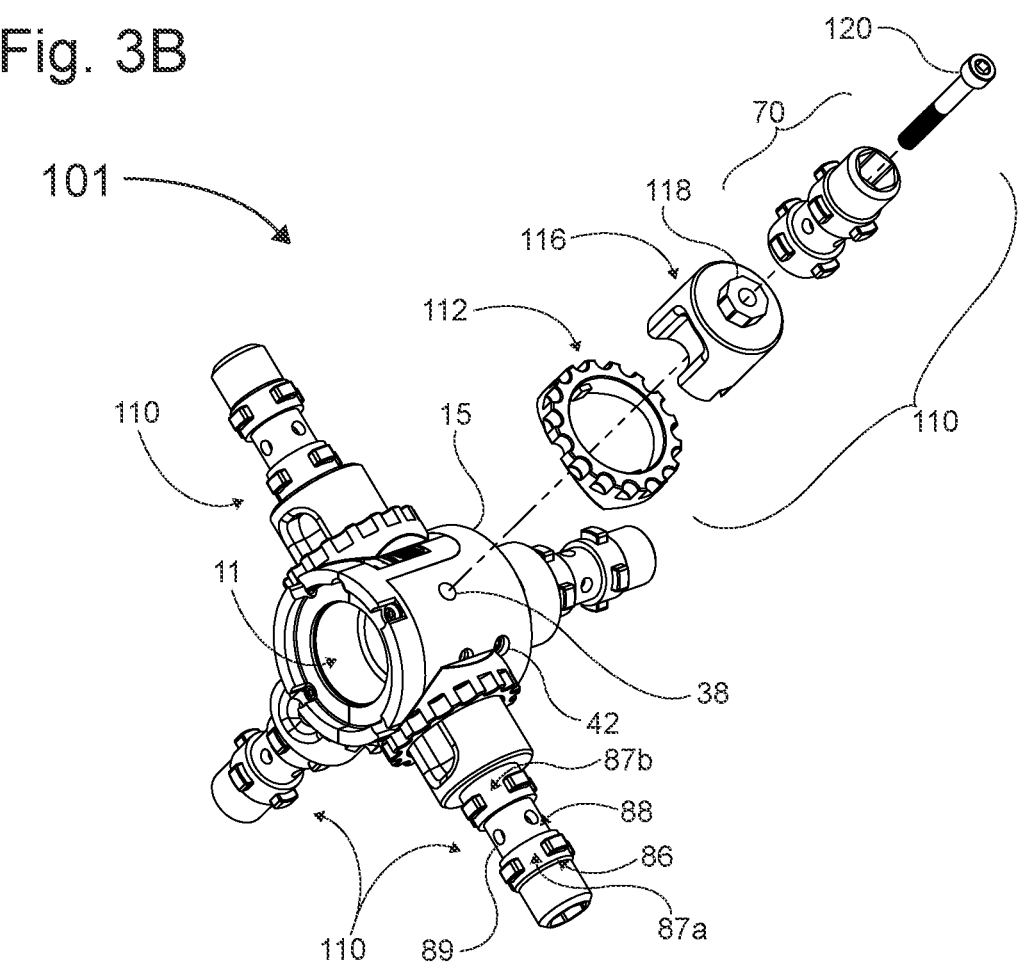
FIG. 3B illustrates the male/receptacle closed-tube rotator module from FIGS. 1 and 2 configured into a 6-way hub assembly with four male member side-mount assemblies demountably engaged with the side wall of the rotator closed-tube housing.

An example of a 2-unit length/2-unit diameter closed-tube rotator module 10 is shown in FIGS. 1 and 2, and is shown reconfigured in FIG. 3B as a 2-unit length/2-unit diameter 6-way closed-tube rotator hub assembly 101. These closed-tube rotator modules comprise a rotator receptacle 11 configured for secure demountable engagement with a second module wherein a male end of the second module may rotate 360° within receptacle 11. The closed-tube rotator modules 10, 100, 101 may comprise a closed-tube housing 15 that provides, in this example, a 2-unit modular length when a rotator receptacle assembly 20 (FIG. 5) is secured within the closed-tube housing 15 at four threaded tube-end screw slots 18 by four screws 23. The exemplary rotator receptacle assembly 20 comprises a lock-spring rotator half-socket 21 and a lock-release rotator half-socket 22 that together define: (i) an outer bushing channel 24 for an outer bushing 26; (ii) an inner bushing channel 28 for an inner bushing 30; (iii) a pivot-lock channel 32 for an exemplary pivot lock 60; and (iv) square-nut slots 34 for securing square nuts 36 within the closed-tube housing 15 for alignment with either a retaining lock 50 or a side-mount bore 38.

In these examples, a square-nut slot 34 is provided for receiving therein a square nut 36 that can threadably secure a retaining-lock set screw 40 coming in through the retaining-lock set screw bore 42 in the closed-tube housing 15 and passing through the nut 36 in to the rotator receptacle assembly 20 where, depending on the set screw's position, the retaining-lock set screw 40 engages a retaining lock 50. The retaining lock 50 comprises a retaining half-lock with spring receptacles 52 and a retaining half-lock with release button 54. Springs 56 are engaged within the half-lock with spring receptacles 52 and against the inside of the lock-spring rotator half-socket 21, thereby pressing the retaining half-lock with spring receptacles 52 towards the center of the receptacle and against the retaining half-lock with release button 54. Using a tension-adjustment screw knob 58 or other screw driver, the retaining-lock set screw 40 can be securely advanced against the retaining half-lock 52 thereby limiting how far it can move outward from the center of the receptacle against the springs 56. The retaining lock 50 can be moved by an operator by manually pressing the retaining lock-release button 55 on the retaining half-lock with release button 54 through a release button hole 44 in the closed-tube housing 15. When the set screw 40 is fully engaged, the retaining lock 50 can no longer be disengaged, therefor preventing the removal of a co-operating male component 70 until the retaining-lock set screw 40 is loosened, as will be described in further detail below.

Any one of a group of male components 70 situated on a co-operating module of the system may be demountably secured and pivotably engaged within a rotator receptacle 11 of the rotator modules 10, 151, 605, 640. Referring to FIGS. 1 and 2, the closed-tube rotator modules 10 may include a male component 70, a closed-tube housing 15, a pivot-lock sprocket 74, and a wide pivot segment 78 which is rotationally co-operative with the outer bushing 26 in a rotator receptacle 11 of another module.

The proximal end of the male component 70 has an octagonal recess 81 whereby it can be fixed to the larger assembly with an octagonal boss 79 (first seen in FIG. 3A) on the end-face of the wide pivot segment 78, or in the exemplary male member side-mount assembly 110 (first seen in FIGS. 3A, 3B) where the octagonal boss 118 is shown on a wide pivot component 116. The octagonal-shaped connection points allow for a male component 70 to be reversibly attached in two orientations relative to the supporting module.

Figure 8A:
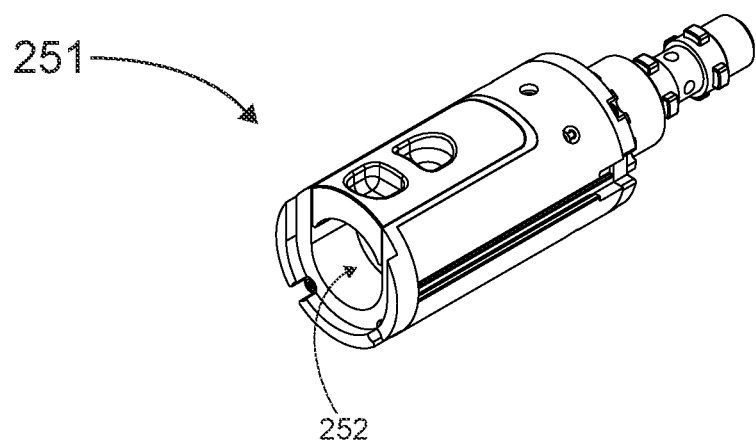

As shown in FIG. 2, a male component 70 may comprise eight prongs 82 in four linear sets of two prongs 82 wherein each set of prongs is spaced equidistantly at 90° intervals around the circumference of the male component 70 whereby the male component 70 may be demountably engaged with receptacles 11, 211, 252 (FIGS. 1, 6, 8A, respectively).

When demountably engaged with a rotator receptacle 11, the outer cylindrical section of the male component 70, i.e. the narrow pivot segment 84 (shown in FIG. 2), is rotationally co-operative with the inner bushing 30 of the receptacle 11. The male component 70 has two collars (distal 87a, proximal 87b) defining a neck 88 (FIG. 2). The leading edge 86 of the distal collar 87a is chamfered (86 is referred to hereinafter as a retaining-lock chamfer) and presses back the retaining half-lock with spring receptacles 52 to allow entry of the male component 70 into the receptacle 11 or alternatively into receptacle 211 (FIG. 6). The half-lock with spring receptacles 52 remains pressed back until the distal collar 87a and outer four prongs 82 on the male component 70 pass through it after which, the half-lock 52 is aligned with the neck 88 and engages within whereby the tension of the springs 56 co-operating with the half-lock 52 retains the male component 70 within the receptacle 11. An operator may manually disengage the retaining lock 50 by pressing the release button 55 through the release button hole 44 in the closed-tube housing 15 thereby moving the retaining half-lock with release button 54 inward, thereby pressing the retaining half-lock with spring receptacles 52 outward against the springs 56 thereby disengaging the retaining lock 50 from the neck 88 of the co-operating male component 70, thereby allowing separation of the co-operating modules.

A retaining-lock set screw 40 may be used to adjust the tension applied by the half-lock 52 with the springs 56 against a neck 88 of a male component 70. The position of the set screw 40 against the half-lock 52 can be adjusted and secured within a square nut 36 housed within a square nut slot 34 provided therefor in the lock-spring rotator half-socket 21, using a tension-adjustment screw knob 58 (shown in FIG. 1) or with another type of screwdriver through a retaining-lock set screw bore 42 provided therefor in the closed-tube housing 15. The retaining-lock set screw 40 may be adjusted between retracted and engaged positions to provide a range of friction in the pivotable contact between the neck 88 and the retaining lock-half 52, or alternatively, when fully engaged, to stop rotation of the male component 70 and also to prevent movement of the retaining lock 50 thereby preventing removal of the male component 70 until the set screw 40 is retracted and the half-lock 52 can again be pressed back against the springs 56 to enable removal of the male component 70 from the receptacle 11.

The neck 88 of the male component 70 may optionally comprise one or more spaced-apart threaded bores 89 to enable engagement of, for example, a side-connector screw 265 with a male/receptacle side-opening joiner module 251 as illustrated in FIG. 8. For use in the example shown in FIG. 8, the neck 88 has four equidistantly spaced apart threaded bores 89 thereby providing four positions in which a male component 70 can be fixed in place within a side-opening joiner receptacle 252.

According to one embodiment of the present disclosure, a male component 70 may be engaged with a closed-tube housing 15 by a connector screw 90 threadably engaged with a threaded bore at the center of a wide pivot segment 78 as shown in FIGS. 1 and 2. The assembly of a male component 70 engaged with wide pivot segment 78 is referred to hereinafter as a male member closed-tube end assembly 71. According to another embodiment of the present disclosure, a male component 70 may be engaged with a wide pivot component 116 and a pivot-lock sprocket 112 to form a male member side-mount assembly 110. As shown in FIG. 3, a male member side-mount assembly 110 may be demountably engaged with a closed-tube housing 15 with a bolt 120 passing through a side-mount bore 38 in the housing 15, or in other modules, to be threadably engaged with a square nut 36 secured within square-nut slot 34 in the rotator half-socket 21 or half-socket 22 at, in this example, up to four out of seven side-mount bore 38 positions (FIGS. 2 and 3).

According to another embodiment of the present disclosure, the narrow pivot segment 84 of the male component 70 may rotationally cooperate with the inner bushing 30 of a receiving rotator receptacle 11 (FIG. 2). Furthermore, the cylindrical surface of either a wide pivot segment 78 or wide pivot component 116 may rotationally cooperate with an outer bushing 26 fixed within the receptacle 11 (FIG. 2).

According to other embodiments of the present disclosure, for example as shown in FIGS. 1-5, 26, and 29, rotator modules 10, 151, 605, 640 may comprise a pivot lock 60 having a pivot-lock indexing peg 62 set within a pivot-lock button 64 for use to demountably engage a rotator module 10, 151, 605, 640 with another module. The pivot lock 60 can be engaged or disengaged by pressing down on the pivot-lock button 64 and lowering its lock-hold tab 65 into or out of a recess in the pivot-lock channel 32. Then once an operator has manually slid the pivot-lock button 64 to a lock or an unlock position and has released the downward flex applied manually to it, the lock-hold tab 65 returns upward where it holds the pivot lock 60 in place either within the lock's opening or alternatively, moved under into the recess in the pivot-lock channel 32. In this example, two side teeth on the base of the pivot-lock button 64 assist with holding the pivot lock 60 in place where they protrude into two pairs of corresponding indentations in the sides of the pivot-lock channel 32, and are flexed inwardly with the sliding force applied by the operator to allow the pivot-lock button 64 to move between the positions.

By engaging the pivot lock 60 in this manner, the indexing peg 62 may extend into, on another module with which its module is being engaged, a pivot-lock sprocket which has around its outer edge sixteen open-sided pivot-lock slots providing sixteen locking positions at 22.5° increments around the male components 70, wherein the indexing peg 62 reversibly locks the pivotable movement of a male component 70 of the other module within the receptacle 11 of the rotator module. The exemplary male member closed-tube end assembly 71 (FIG. 2), including features of the closed-tube housing 15, may comprise a pivot-lock sprocket 74 with pivot-lock slots around the base of the wide pivot segment 78 (FIG. 1A). Similarly, as shown in FIG. 3B, a male member side-mount assembly 110 may comprise a pivot-lock sprocket 112 with pivot-lock slots around its outer edge and two small teeth within its open inner circumference, wherewith the pivot-lock sprocket 112 is secured down against the cylindrical body of the module 101 by the wide pivot component 116 having in its concave bottom two retaining slots which correspond to the two teeth in the pivot-lock sprocket 112 which hold the components together as they are secured against the round side of module 101 by a bolt 120 threadably engaged with a square nut (not shown) within the closed-tube housing 15.

According to some embodiments, the rotator modules disclosed herein may comprise seven side-mount bores 38 positioned at 45° increments around the circumference of the modules except for locations wherein a pivot lock 60 is situated. The positioning of the side-mount bores 38 make it possible to configure assemblies, generically referred to herein as closed-tube rotator hub assemblies 100 with different varying angular orientations and degrees of separation for one or two or three or four attached male member side-mount assemblies 110 as illustrated in FIG. 3. As shown in FIG. 2, the side-mount bore 38, located opposite the pivot lock 60, that aligns with the seam of the two rotator socket-halves 21, 22 requires a threaded insert within the wall of the closed-tube housing 15 due to the recesses here in the socket-halves required to be open for where corresponding to a square nut channel 170 in embodiments where a rotator receptacle assembly 20 is contained within an extension-tube housing 155, as shown in FIG. 5.

Figure 4A:
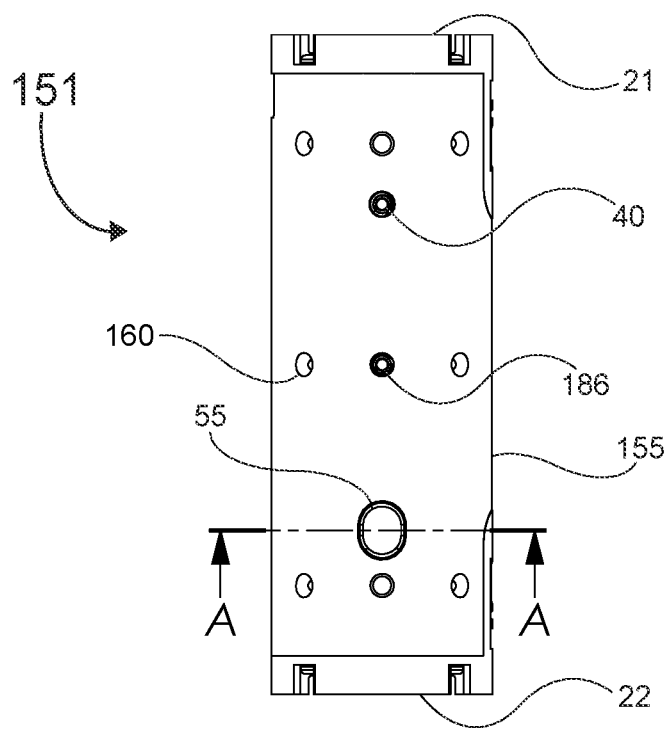
FIG. 4A is a side view of an example of a double-receptacle extension-tube rotator module.
Figure 4B:
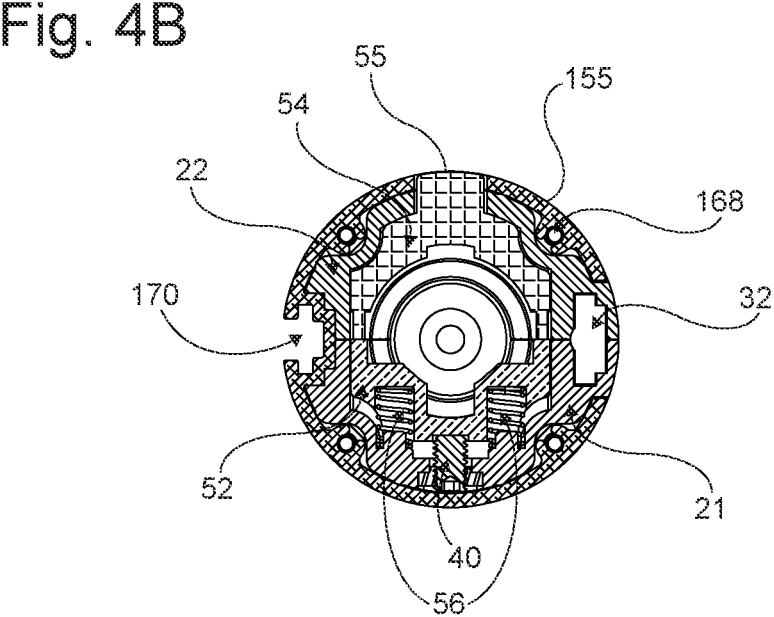
FIG. 4B is a cross-sectional end view thereof, showing an example of a retaining lock contained therein.
Figure 5A:
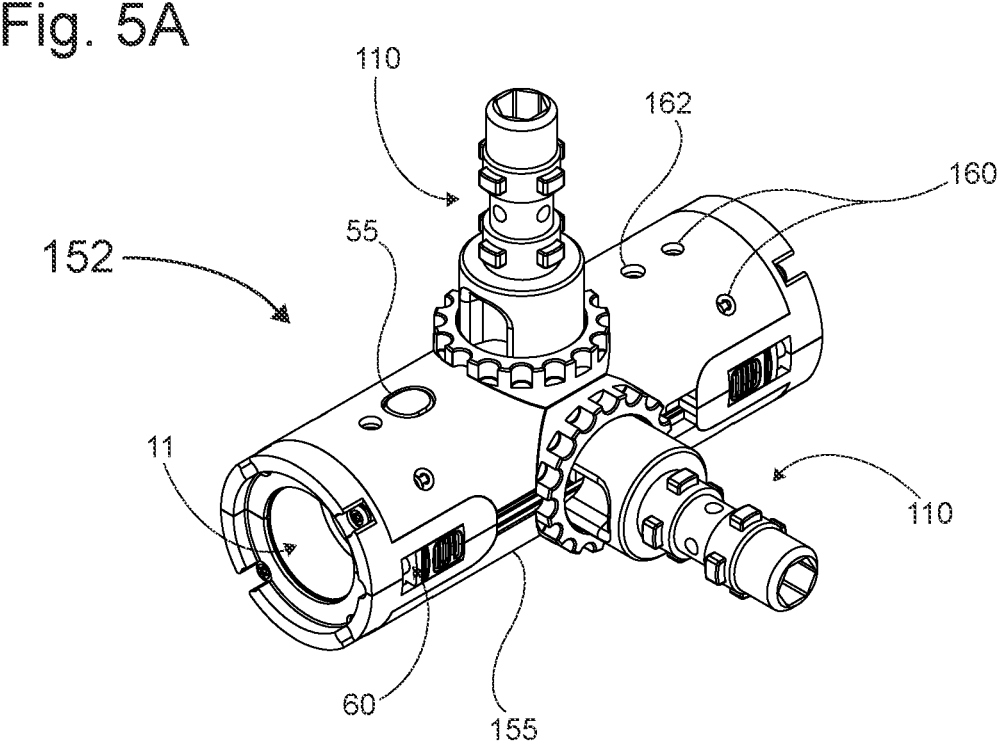
Figure 5B:
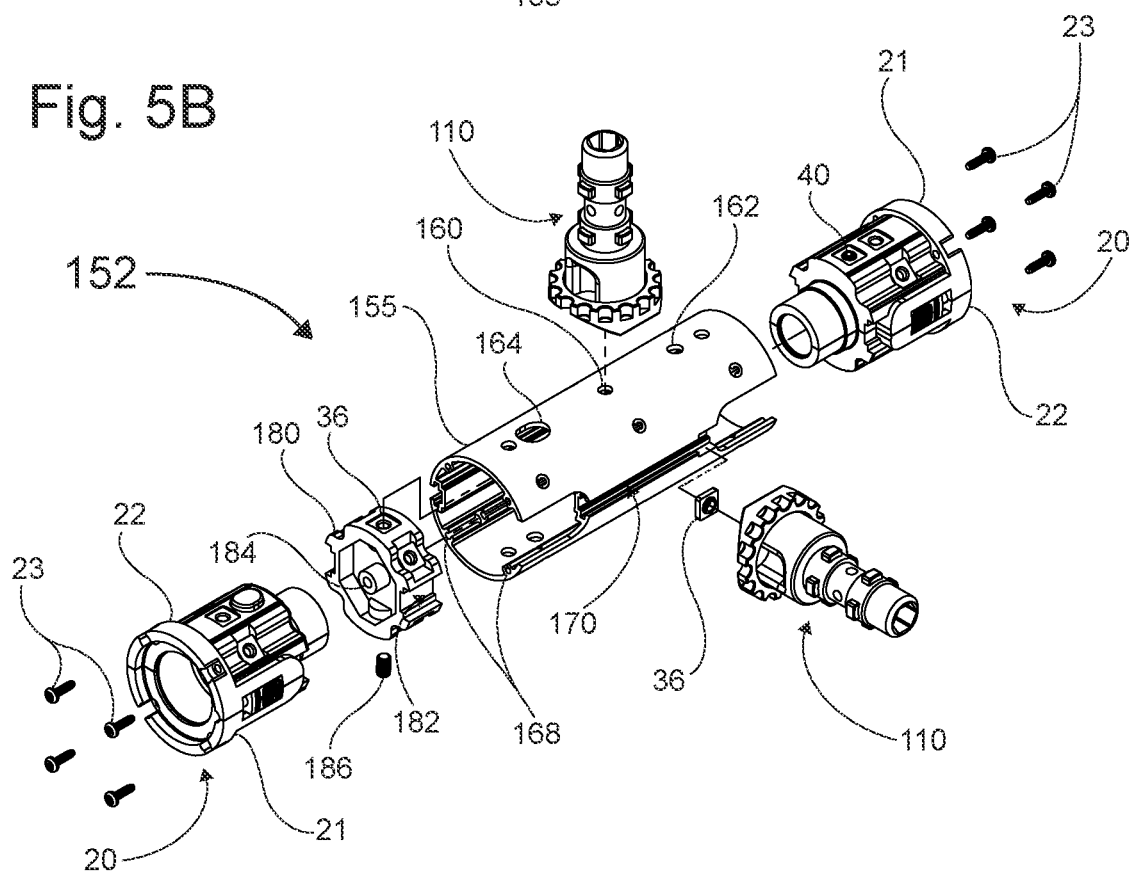

Some examples of double-receptacle extension-tube rotator modules 151, 152, 605 are illustrated in FIGS. 4, 5, and 26 wherein all three modules have a rotator receptacle 11 at each end. Modules 151, 605 are shown without any mounted male member side-mount assemblies 110 (FIG. 4). Module 152 is shown engaged with two male member side-mount assemblies 110 (FIG. 5) and is referred to herein as a 4-way double-receptacle extension-tube rotator hub assembly 152, which provides four points of interconnection with other modules of a system assembly.

The double-receptacle extension-tube rotator modules, according to the embodiments of the present disclosure, comprise a rotator receptacle 11 formed by a rotator receptacle assembly 20 having the same components and functionalities as previously described, securely fixed within each end of an extension-tube housing 155 by four screws 23 inserted into four threaded tube-end screw slots 168 within the inner wall of the extension-tube housing 155 (FIGS. 4, 5). According to some embodiments, matching the 2-unit diameter and several other features of the closed-tube housing 15 previously described, the extension-tube housing 155 may have two retaining-lock set-screw bores 162 for adjustment of each receptacle's retaining-lock set screw 40, two release button holes 164 for manual access to each retaining lock's release button 55, as well as the plurality of side-mount bores 160 (in the embodiment illustrated in FIGS. 4, 5: two sets of six bores), to match the number and positions of square nuts 36 contained by the housing 155 and receptacle assemblies 20 for reconfigurable attachment of up to four male member side-mount assemblies 110 around the extension-tube housing 155.

According to other embodiments disclosed herein, male member side-mount assemblies 110 can also be attached at middle points along an extension-tube housing through a plurality of side-mount bores corresponding with the same number of square nuts 36 securely held within the tube housing by a middle square-nut holder having a matching plurality of square-nut slots positioning each square nut in alignment with a side-mount bore. Referring to FIG. 5, middle square-nut holder 180 is positionable during construction, optionally by a threaded positioning-rod (not shown) temporarily engaged at threaded bore 184 to hold and move holder 180, within extension-tube housing 155 on the inward-facing edges of the housing's square nut channels 170 within the same number of tube rail channels 182 on the sides of the middle square-nut holder 180, until the holder 180 is aligned with an available set of six side-mount bores 160. In order to prevent unwanted movement of the middle square-nut holder 180 once it is in position, a short positioning set screw 186 may be inserted into an available side-mount bore 160, when not engaged by a side-mount assembly 110. A middle square-nut holder may also include crush ribs on its outer edges to prevent unwanted movement within an extension-tube housing.

In addition to providing engagement with tube rail channels 182, the square-nut channels 170 at their two positions around the circumference of the extension-tube housing 155 provide an opening within which one or more square nuts 36 can be inserted and are slidable within and along the channels 170, and thus, may be used for demountable engagement of an additional male member side-mount assembly 110 with a bolt 120 at various positions along the extension-tube housing 155 thereby allowing for a range of unique hub assemblies.

It is to be noted that the closed-tube housings of the closed-tube rotator modules disclosed herein may comprise elongate structural elements be selected from the range of 2 cm to 240 cm, for example 2 cm, 4 cm, 5 cm, 6 cm, 8 cm, 10 cm, 15 cm, 20 cm, 25 cm, 30 cm, 35 cm, 40 cm, 45 cm, 50 cm, 55 cm, 60 cm, 65 cm, 70 cm, 75 cm, 80 cm, 85 cm, 90 cm, 95 cm, 100 cm, 110 cm, 120 cm, 130 cm, 140 cm, 150 cm, 160 cm, 170 cm, 180 cm, 190 cm, 200 cm, 210 cm, 220 cm, 230 cm, 240 cm, and therebetween. An example of a suitable elongate structural element of the closed-tube housings disclosed herein may be a tube having a circular cross-section or an elliptical cross-section or a square cross-section or a rectangular cross-section or a trapezoidal cross-section or a triangular cross-section or a hexagonal cross-section or an octagonal cross-section or a decagonal cross-section or an I-shaped cross-section.

It is to be noted that the extension-tube housings of the double-receptacle rotator modules disclosed herein can be selected from the range of 2 cm to 240 cm, for example 2 cm to 240 cm, for example 2 cm, 4 cm, 5 cm, 6 cm, 8 cm, 10 cm, 15 cm, 20 cm, 25 cm, 30 cm, 35 cm, 40 cm, 45 cm, 50 cm, 55 cm, 60 cm, 65 cm, 70 cm, 75 cm, 80 cm, 85 cm, 90 cm, 95 cm, 100 cm, 110 cm, 120 cm, 130 cm, 140 cm, 150 cm, 160 cm, 170 cm, 180 cm, 190 cm, 200 cm, 210 cm, 220 cm, 230 cm, 240 cm, and therebetween. An example of a suitable elongate structural element of the extension-tube housings disclosed herein may be a tube having a circular cross-section or an elliptical cross-section or a square cross-section or a rectangular cross-section or a trapezoidal cross-section or a triangular cross-section or a hexagonal cross-section or an octagonal cross-section or a decagonal cross-section or an I-shaped cross-section.

It is optional to provide closed-tube housings with lengths from the range of 4 cm to 240 cm with a plurality of equidistantly spaced-apart middle square-nut holders 180 aligned with additional side-mount holes 160 to enable additional options for configuring a variety of demountable engagement options with a plurality of pivot male member side-mount assemblies.

It is optional to provide extension-tube housings with lengths from the range of 4 cm to 240 cm with a plurality of equidistantly spaced-apart middle square-nut holders 180 aligned with additional side-mount holes 160 to enable additional options for configuring a variety of demountable engagement options with a plurality of pivot male member side-mount assemblies.

Joiner Modules

Joiner modules, as disclosed herein, are the components or the modular assemblies of a structural system, configured for demountable assembly with rotator modules or other modules, to assemble a variety of tool-bearing or load-bearing structures and the like, that may be fixed-in-place and stationary, or alternatively, that may be mobile through co-operation with rollers or wheels or castors. Joiner modules may demountably interconnect with one or more of a rotator module, and/or one or more of a tool support module, and/or one or more of a load-bearing module, and/or one or more of a base module, and/or one or more of an end-cap module, as disclosed herein.

Examples of some embodiments of the joiner modules of the present disclosure are shown in FIGS. 6-12. Some embodiments pertain to joiner modules that comprise a joiner receptacle and an opposing male end. Some embodiments pertain to joiner modules additionally comprising an elongate structural element interposed a joiner receptacle and a male end. Some embodiments pertain to joiner modules that comprise two opposing male ends. Some embodiments pertain to joiner modules additionally comprising an elongate structural element interposed the two opposing male ends. Some embodiments pertain to joiner modules that comprise two opposing joiner receptacles. Some embodiments pertain to joiner modules additionally comprising an elongate structural element interposed the two opposing joiner receptacles. A joiner module comprising an elongate structural element may optionally be referred to as an extension-tube joiner module.

It is to be noted that the elongate structural element of the joiner modules may be a tube or a rod having a circular cross-section or an elliptical cross-section or a square cross-section or a rectangular cross-section or a trapezoidal cross-section or a triangular cross-section or a hexagonal cross-section or an octagonal cross-section or a decagonal cross-section or an I-shaped cross-section. The length of a joiner module elongate structural element may be selected from the range of 2 cm to 240 cm, for example 2 cm, 4 cm, 5 cm, 6 cm, 8 cm, 10 cm, 15 cm, 20 cm, 25 cm, 30 cm, 35 cm, 40 cm, 45 cm, 50 cm, 55 cm, 60 cm, 65 cm, 70 cm, 75 cm, 80 cm, 85 cm, 90 cm, 95 cm, 100 cm, 110 cm, 120 cm, 130 cm, 140 cm, 150 cm, 160 cm, 170 cm, 180 cm, 190 cm, 200 cm, 210 cm, 220 cm, 230 cm, 240 cm, and therebetween.

Some embodiments pertain to joiner modules that additionally comprise one or more male member assemblies demountably engaged with an elongate structural support component or element and extending radially therefrom. Such joiner modules may be referred to as a joiner hub module or a joiner hub assembly.

Figure 6A:
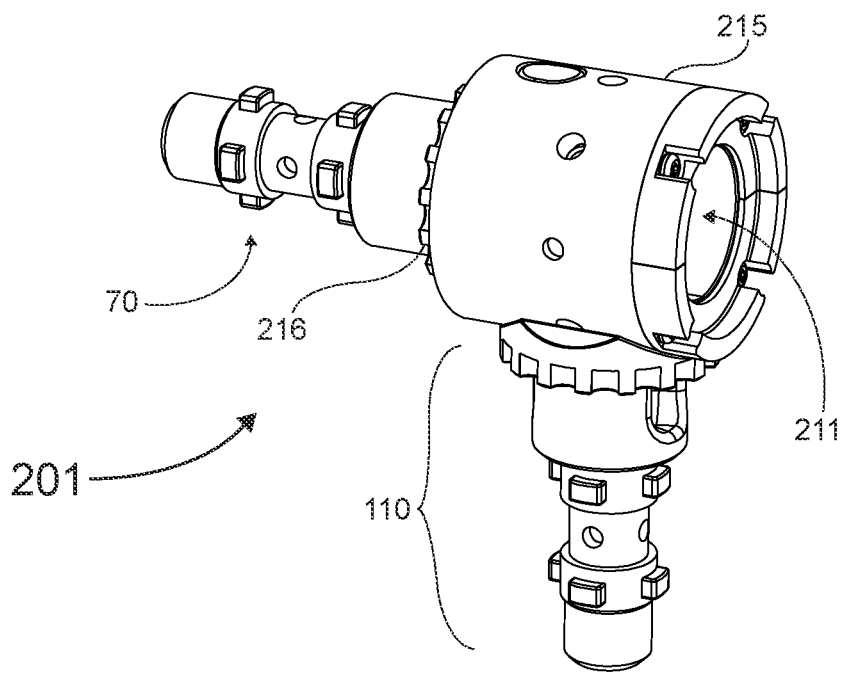
FIGS. 6A and 6B are perspective views of closed-tube joiner hub assemblies.

One example of a closed-tube joiner module, which as shown in FIG. 6A may also be referred to herein as a closed-tube joiner hub assembly 201, comprises a joiner receptacle 211 formed by a joiner receptacle assembly 220 housed within a joiner closed-tube housing 215 having a pivot-lock sprocket 216 and a male component 70 extending outward along the longitudinal axis of the joiner closed-tube housing 215. A male member side-mount assembly 110 is shown demountably engaged to the side of the joiner closed-tube housing 215 and extending radially therefrom. The joiner module 201 may provide a 90° elbow joint in a utility or structural support assembly, or alternatively, may provide a T-junction in a utility or structural support assembly.

Figure 6B:
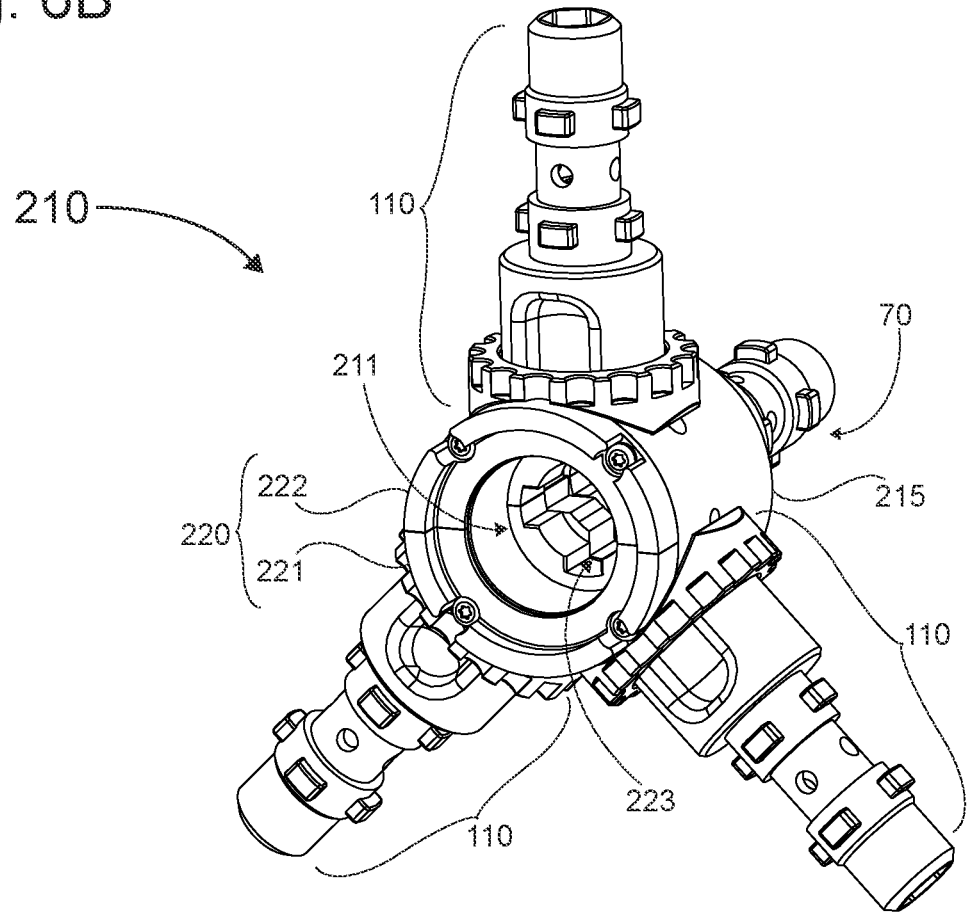
Figure 7:
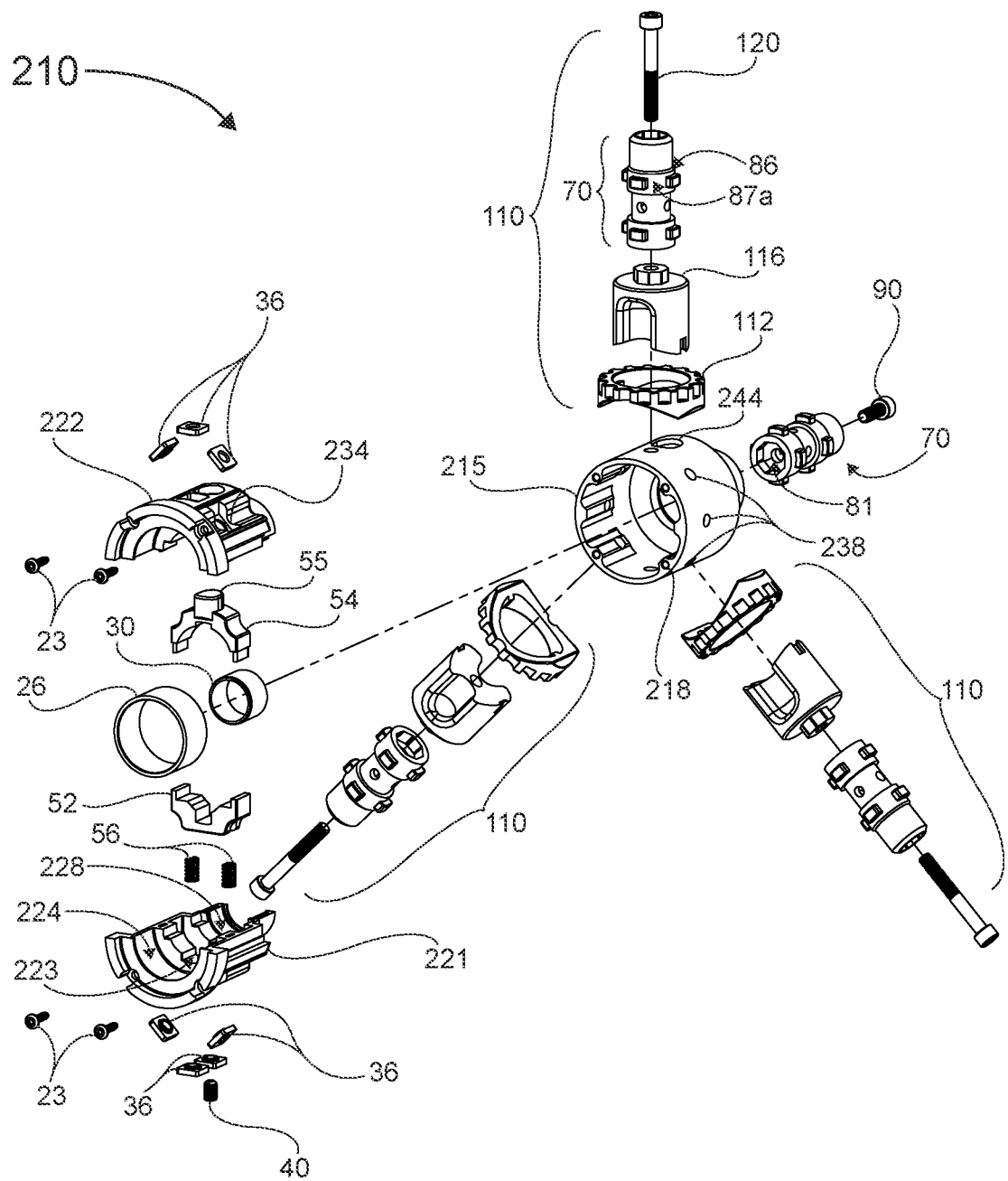
FIG. 7 is an exploded perspective view of the 5-way hub assembly shown in FIG. 6B.

An example of a 5-way closed-tube joiner hub assembly 210 is shown in FIGS. 6B and 7, and comprises a joiner closed-tube housing 215 with a joiner receptacle 211 at one end and a male component 70 at the other end, with three male member side-mount assemblies 110 extending outward radially from the joiner closed-tube housing 215. The joiner receptacle 211 comprises a joiner receptacle assembly 220 secured to four threaded tube-end screw slots 218 in the joiner closed-tube housing 215 with four screws 23. The joiner receptacle assembly 220 comprises a lock-spring joiner half-socket 221 and a lock-release joiner half-socket 222 that together define: (i) an outer bushing channel 224 for an outer bushing 26; (ii) an inner bushing channel 228 for an inner bushing 30; and (iii) square-nut slots 234 for securing square nuts 36 within the joiner closed-tube housing 215 for alignment with either a retaining lock 50 or a side-mount bore 238.

It should be noted that the 5-way closed-tube joiner hub assembly 210 shown in FIGS. 6B and 7 may have a 2-unit modular length matching a 2-unit diameter of 60 mm, which is the exemplary system format sizing of 30 mm units referred to herein as unit scale, which is described for demonstrative purposes only and not to be intended to limit the disclosure herein to these values or proportions.

As disclosed herein, a male component 70 of another module of a system assembly may be demountably engaged with a joiner receptacle 211 of the present joiner modules by way of operating the retaining lock-halves 52, 54 contained within the joiner receptacle assembly 220. When the male component 70 of another module (in this case, the second module) is inserted into the joiner receptacle 211 of a joiner module, the retaining-lock chamfer 86 on the distal collar 87a of the male component 70 presses back the retaining half-lock with spring receptacles 52 thereby allowing entry of the male component 70 into the joiner receptacle 211. The half-lock 52 remains pressed back until the distal collar 87a and outer four prongs 82 on the male component 70 is passed through to where the half-lock 52 is aligned with the neck 88 of the male component 70 and the tension of the springs 56 engages the half-lock 52 within the neck 88 and against the half-lock with release button 54. An operator may disengage the second module from the joiner module by pressing the release button 55 through the release button hole 244 in the joiner closed-tube housing 215 thereby moving the retaining half-lock with release button 54 inward resulting in an outward movement of the retaining half-lock with spring receptacles 52 against the springs 56 to where it is disengaged from the neck 88 of the second module allowing demounting of the second module from the joiner module.

A retaining-lock set screw 40 may be used to adjust the tension applied by the half-lock 52 with the springs 56 against a neck 88 of a male component 70. The position of the set screw 40 against the half-lock 52 can be adjusted and secured within a square nut 36 housed within a square nut slot 234 provided therefor in the lock-spring joiner half-socket 221, using a tension-adjustment screw knob 58 (shown in FIG. 1) or another type of screwdriver through a retaining-lock set screw bore (not visible in FIGS. 6 and 7) provided therefor in the joiner closed-tube housing 215. The retaining-lock set screw 40 may be adjusted between retracted and engaged positions to provide a range of pressure in the contact of the retaining lock-half 52 and the neck 88 of the second module. When fully engaged, the position of the set screw 40 prevents movement of the retaining lock 50 thereby preventing disengagement of the second module until the set screw 40 is retracted and the half-lock 52 can again be pressed back against the springs 56 to enable removal of the second module's male component 70 from the joiner receptacle 211.

Unlike the rotator receptacle 11 shown in FIGS. 1 and 2, which provides a secure engagement of a rotator module with a second module whereby a male member assembly of the second module is rotatable 360° within the rotator receptacle 11, the joiner receptacle 211 of a joiner module provides a securely fixed and un-rotatable engagement of a male member assembly of a second module mounted therein. The example of a joiner receptacle 211 shown in FIGS. 6 and 7 comprises a joiner receptacle assembly 220 having two half-sockets 221, 222 which form a total of four prong-retaining slots 223 within which the eight prongs 82 of a male component 70 of another module are aligned and fixedly secured upon insertion of the male component 70. The joiner receptacle assembly 220 additionally comprises an outer bushing 26 and an inner bushing 30, housed within bushing channels 224, 228 respectively, that cooperate with the prong-retaining slots 223 to securely engage the male member assembly by its wide pivot segment/component and its narrow pivot segment 84, respectively, upon insertion into the joiner receptacle 211.

Providing five points of demountable engagement with up to five other modular components, the 5-way closed-tube joiner hub assembly 210 includes a joiner receptacle 211 within a joiner closed-tube housing 215, a male component 70 in linear alignment with the joiner receptacle 211, and three male member side-mount assemblies 110 extending radially outward from the joiner closed-tube housing 215. The male component 70 in linear alignment with the receptacle is attached at its octagonal recess 81 to the joiner closed-tube housing 215 at the octagonal boss of the housing's wide pivot segment by a connector screw 90 (the octagonal boss and wide pivot segment are not visible in FIGS. 6B, 7). Each of the three male member side-mount assemblies 110 are engaged with the joiner closed-tube housing 215 with a bolt 120 passing through the center of the male component 70, the wide pivot component 116, and the pivot-lock sprocket 112, then through the side-mount bore 238 in the joiner closed-tube housing 215, and threadably engaged with a square nut 36 secured within one of the square-nut slots 234 around the outside of the joiner half-sockets 221, 222.

The joiner closed-tube housing 215 may comprise eight side-mount bores 238 positioned at 45° intervals around the circumference of the housing. These bores 238 make available varying angular orientations and degrees of separation for mounting thereon up to four male member side-mount assemblies 110 in various closed-tube joiner hub assemblies. Six of the eight side-mount bores 238 correspond with six square nuts 36 contained within square-nut slots 234. The remaining two side-mount bores 238 are located adjacent to the seam of the two joiner half-sockets 221, 222 where threaded inserts are required within the wall of the joiner closed-tube housing 215, due to the recesses here in the half-sockets for where in alignment with the square-nut channels of an extension-tube housing in the configuration of an extension-tube joiner module, for example, a double-receptacle extension-tube joiner module 460 or a male/receptacle extension-tube joiner module 465, shown in FIG. 17.

Some embodiments disclosed herein relate to one or more of a group of side-opening joiner modules for use in configuring a utility or structural support system assembly that may require an open-faced or closed side-ways connection from where a male member assembly of a second module can be demountably engaged from the side of the joiner module. An example of a male/receptacle side-opening joiner module 251 is illustrated in FIGS. 8A and 8B and has a side-opening receptacle 252 wherein a second module's male component 70/male member assembly may be securely or releasably engaged.

Male/receptacle side-opening joiner module 251 comprises an extension-tube housing 255 with a side-opening receptacle component 260 secured to one end with two screws 23 threadably engaged with tube-end screw slots 257, and a male member extension-tube end assembly 270 secured to the other end by four screws 23 passed through screw holes 278, provided therefor in a male member tube-end plate 271, and threadably engaged with four tube-end screw slots 257 in the extension-tube housing 255. Tube rail channels in both the side-opening receptacle component 260 and the inserted portion of the male member tube-end plate 271 allow each component to be secured in between the inward-facing edges of the opposing square-nut channels 256 of the extension-tube housing 255.

Figure 8B:
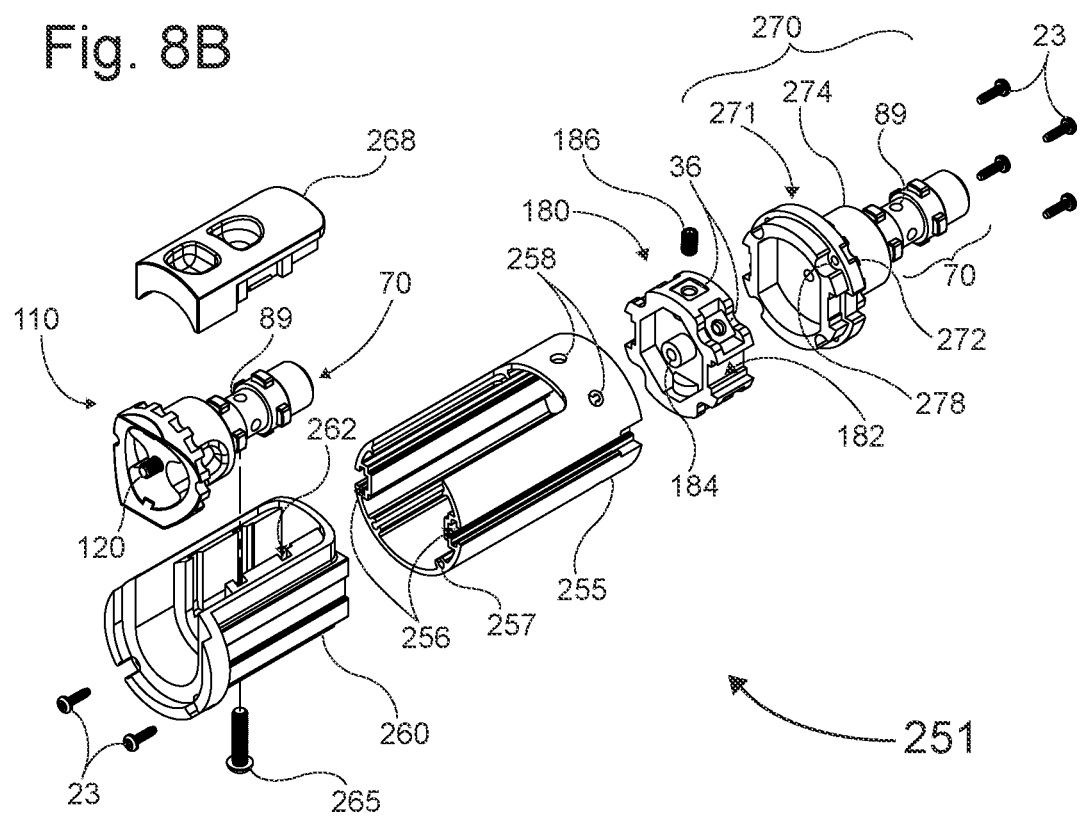

A male member side-mount assembly 110 for a second module is shown in FIG. 8B (the second module is not shown) in alignment for insertion into the side-opening receptacle 252 for secure engagement therein. Prong-retaining slots 262 are provided within the side-opening receptacle component 260 corresponding to the shape and alignment of prongs 82 on the male component 70 of an inserted male member assembly to facilitate insertion and removal of that male member assembly of the second module into and out of the side-opening receptacle component 260 and allow for secure engagement therein. For a secure engagement of the co-operating modules, a side connector screw 265 may be inserted through a bore provided therefor in both the extension-tube housing 255 and the side-opening receptacle component 260 (these bores are not visible in FIG. 8B) and then may be threadably engaged with one of the threaded bores 89 in the neck 88 of the male component 70. If so desired, a side-opening receptacle cover 268 may also be engaged with the receptacle component 260 to provide a protective closure of the engaged male member assembly. If separation of a side-opening joiner module and a second module is required during use and/or operation of the system assembly, the side connector screw 265 and side-opening receptacle cover 268 may be excluded from the assembly so that the male member assembly of the second module may temporarily remain seated until lifted out of the receptacle or the open receptacle is pointed downward.

The male member extension-tube end assembly 270 provided at the opposite end of the male/receptacle side-opening joiner module 251 in this example illustrated in FIGS. 8A and 8B comprises a male component 70 mounted to a male member tube-end plate 271 having a wide pivot segment 274 and a pivot-lock sprocket 272 for demountable engagement with other modules of a system assembly. The male member tube-end plate 271 is secured to the extension-tube housing 255 with four screws 23 through screw holes 278 threadably engaged with screw slots 257 provided therefor in the extension-tube housing 255.

The outward end-face of the male member tube-end plate 271 may comprise slots which align with the square-nut channels 256 of the extension-tube housing 255 whereby, in a completed module, square nuts 36 may be inserted through the end-face of the tube-end plate 271 into a square-nut channel for demountable engagement to a male member side-mount assembly 110.

In this example, up to four male member side-mount assemblies 110 may be attached radially from the extension-tube housing 255 by a bolt threadably engaged through one of the six side-mount bores 258 with a square nut 36 securely held within the tube housing by a middle square-nut holder 180 that has six square-nut slots that position each square nut 36 in alignment with a side-mount bore 258. The middle square-nut holder 180 is positioned during construction of the module inside extension-tube housing 255 upon the inward-facing rails of the housing's square-nut channels 256 within the tube rail channels 182 as shown in FIG. 8B. In addition to providing the inward-facing rails, the square-nut channels 256 provide channels within which one or more square nuts 36 are slidable and may provide a threadable engagement point for mounting of a male member side-mount assembly 110 with a bolt 120 at operator-selected positions along the extension-tube housing 255, thereby allowing for configuration of a wide range of unique hub assemblies.

According to some aspects, the length of the extension-tube housing 255 may be selected from the range of 2 cm to 240 cm, for example 2 cm, 4 cm, 5 cm, 6 cm, 8 cm, 10 cm, 15 cm, 20 cm, 25 cm, 30 cm, 35 cm, 40 cm, 45 cm, 50 cm, 55 cm, 60 cm, 65 cm, 70 cm, 75 cm, 80 cm, 85 cm, 90 cm, 95 cm, 100 cm, 110 cm, 120 cm, 130 cm, 140 cm, 150 cm, 160 cm, 170 cm, 180 cm, 190 cm, 200 cm, 210 cm, 220 cm, 230 cm, 240 cm, and therebetween. In constructions of side-opening joiner modules that have extension-tube housings with lengths of 4 cm or longer, it may be desirable to insert one or more middle square-nut holders 180 within the length of the extension-tube housing 255. It is optional, during construction of longer side-opening joiner modules, to temporarily engage a middle square-nut holder 180 with a threaded positioning-rod at threaded bore 184 to move and hold in place the middle square-nut holder 180 while it is aligned with and secured at a selected set of side-mount bores 258. In order to prevent unwanted movement of the middle square-nut holder 180 once it is in position, a short positioning set screw 186 may be inserted into an available side-mount bore 258, when not engaged by a side-mount assembly 110. A middle square-nut holder may also include crush ribs on its outer edges to prevent unwanted movement within an extension-tube housing.

Another embodiment of the present disclosure relates to double-male joiner modules having two male ends for demountable engagement with receptacles of the other modules of a utility or structural support system.

Figure 9A:
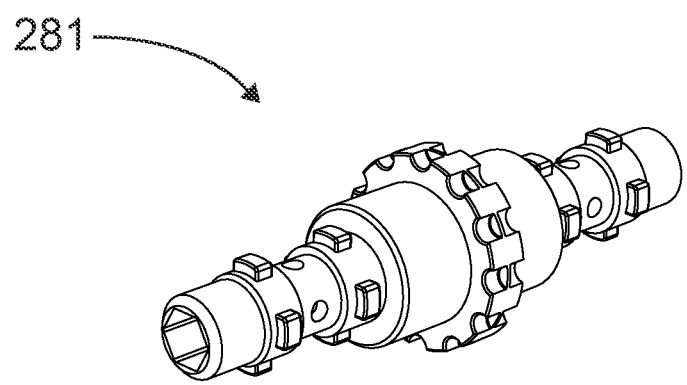
Figure 9B:
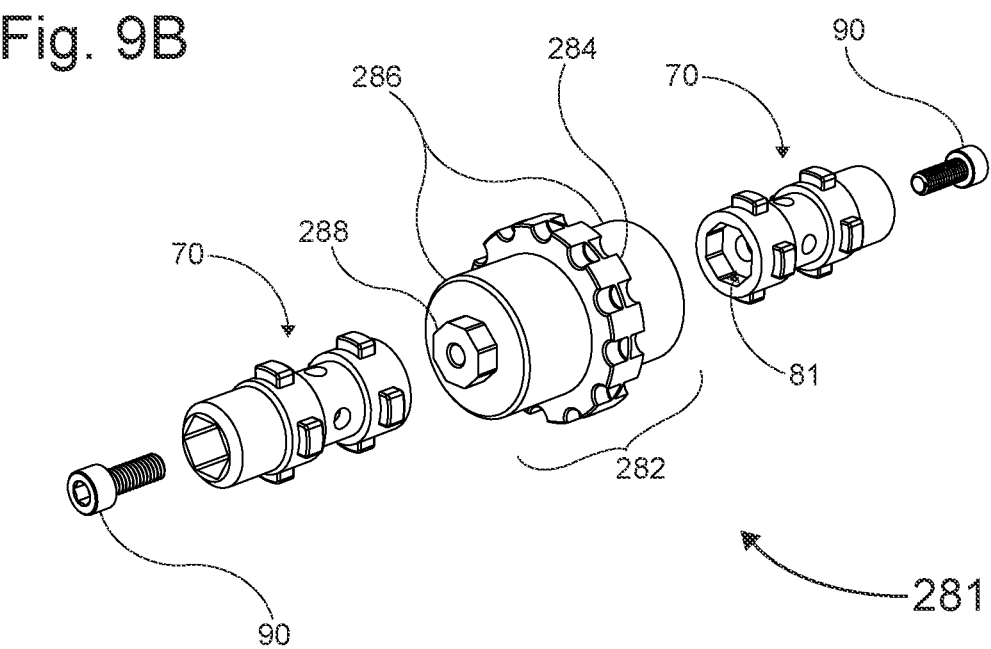

One example of a double-male joiner module 281 is shown in FIGS. 9A and 9B for use to demountably engage two adjacently positioned receptacles of two modules of a utility or structural support system, as may be required. The double-male joiner module 281 comprises a double-male component 282 with both sides having a pivot-lock sprocket 284 and a wide pivot segment 286 with an outward-facing octagonal boss 288 having a threaded bore therethrough. It is to be noted that the proximal ends of male components 70 have an octagonal recess 81 configured for sliding engagement with an octagonal boss 288. Each male component 70 is secured to the double-male component 282 by mounting onto an octagonal boss 288 and then inserting a connector screw 90 through the male component 70 to be threadably engaged with the threaded bore provided in the octagonal boss.

Figure 10A:
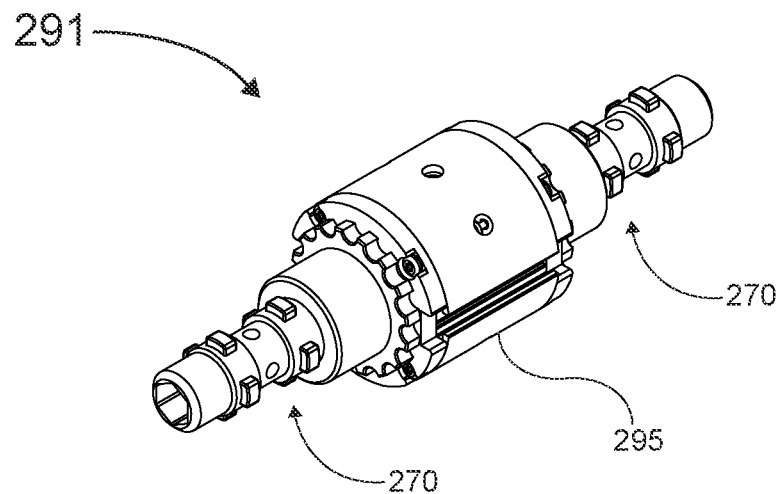
Figure 10B:
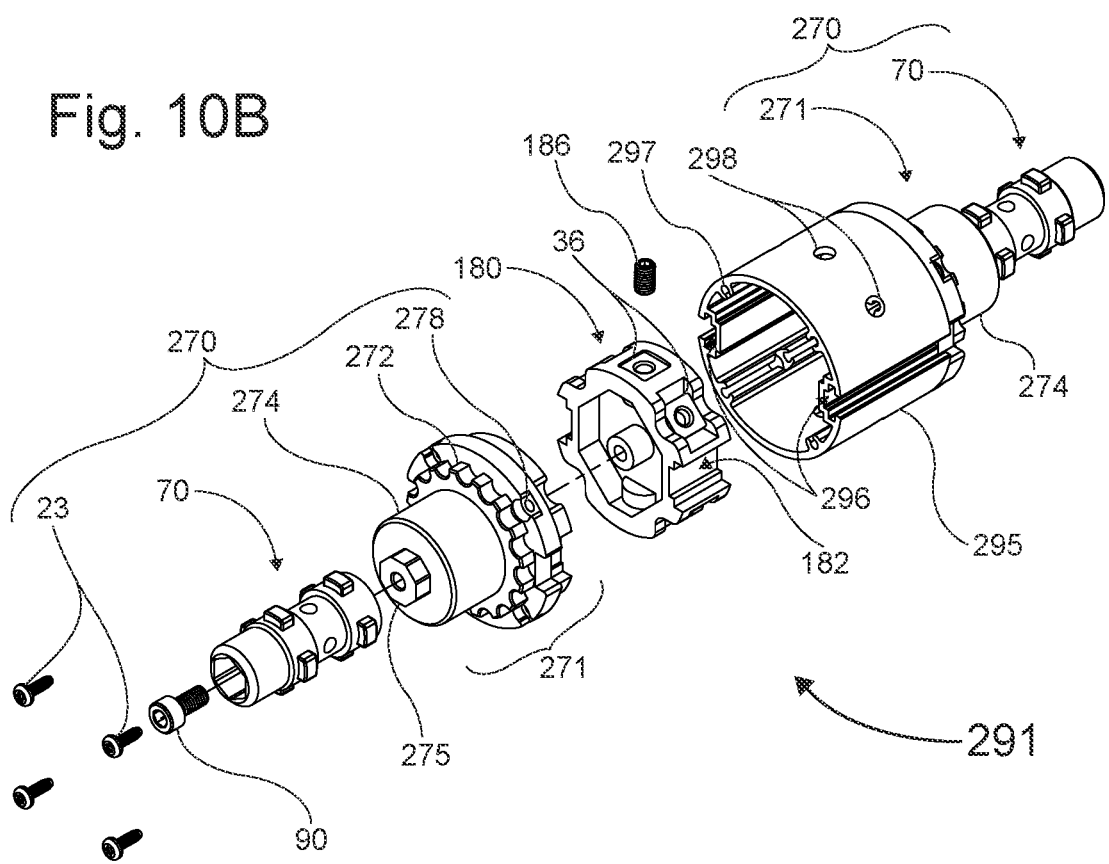

Another embodiment relates to a double-male joiner module having an extension-tube housing interposed two male end assemblies. An example of a double-male extension-tube joiner module 291 is shown in FIGS. 10A and 10B and comprises an extension-tube housing 295 engaged with a male member extension-tube end assembly 270 at each end.

The extension-tube housing 295 has a pair of opposing longitudinal square-nut channels 296 and four equidistantly spaced-apart longitudinal screw slots 297 extending between the ends of the extension-tube housing 295. One or more middle square-nut holders 180 may be inserted into the interior of the extension-tube housing 295 wherein the tube rail channels 182 of a middle square-nut holder 180 may slide along the inward-facing surfaces of the pair of longitudinal square-nut channels 296 of the extension-tube housing 295. In this example, up to six square nuts 36 may be inserted into the same number of slots in the middle square-nut holder 180 for demountable engagement with up to four male member side-mount assemblies 110 through the side-mount bores 298. A positioning set screw 186 can be used to maintain the positioning of the middle square-nut holder 180 when not engaged by a male member side-mount assembly 110. Also for this purpose, the middle square-nut holder 180 may comprise crush ribs around its outer edges to grip the inside surface of the extension-tube housing 295. Male member side-mount assemblies 110 may also be mounted at various positions along the extension-tube housing 295 within the square-nut channels 296, thereby allowing for a range of unique hub assemblies.

The double-male extension-tube joiner module has a male member extension-tube end assembly 270 secured to each end of the extension-tube housing 295 with screws 23 extending through screw holes 278 in the male member tube-end plate 271 and threadably engaged with tube-end screw slots 297 within the inner wall of the extension-tube housing 295. The octagonal bosses 275 are slidably engaged with an octagonal recess at the proximal end of each male component 70 after which a connector screw 90 is inserted through the distal ends of the male components 70 and threadably engaged with a threaded bore provided therefor in the octagonal bosses 275.

Figure 11A:
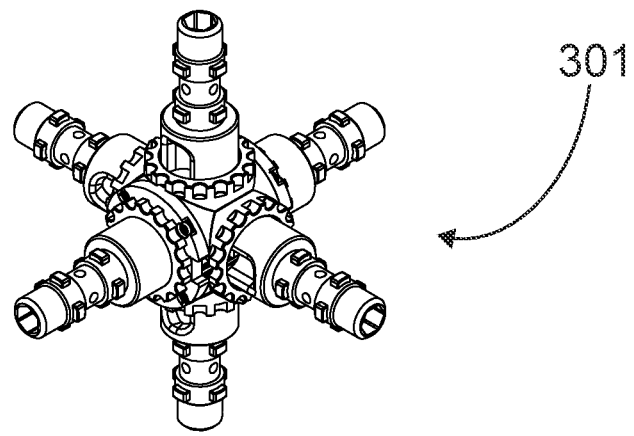
Figure 11B:
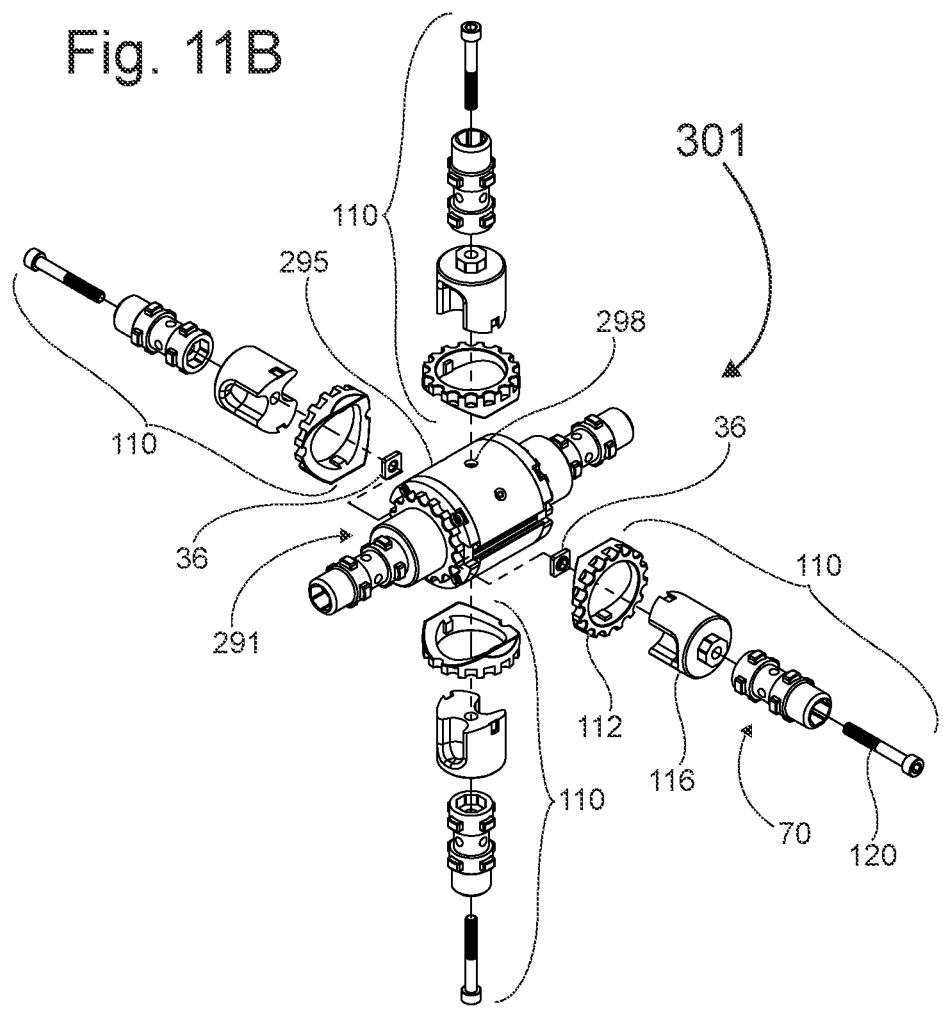

Another example of a multi-engagement point joiner hub assembly of the present disclosure is shown in FIGS. 11A, 11B. A 6-way extension-tube joiner hub assembly 301 may comprise the double-male extension-tube joiner module 291 shown in FIGS. 10A, 10B, to which is mounted four male member side-mount assemblies 110 extending outwardly from the extension-tube housing 295. Two opposing male member side-mount assemblies 110 are mounted to the extension-tube housing 295 by threadable engagement of bolts 120 inserted therethrough, with square nuts 36 that have been inserted into the square-nut channels 296. The other two opposing male member side-mount assemblies 110 are mounted to the extension-tube housing 295 by threadable engagement of bolts 120 inserted therethrough, and then through side-mount bores 298, into square nuts 36 housed by a middle square-nut holder 180 positioned inside the extension-tube housing 295 (not visible in FIGS. 11A, 11B).

Figure 12A:
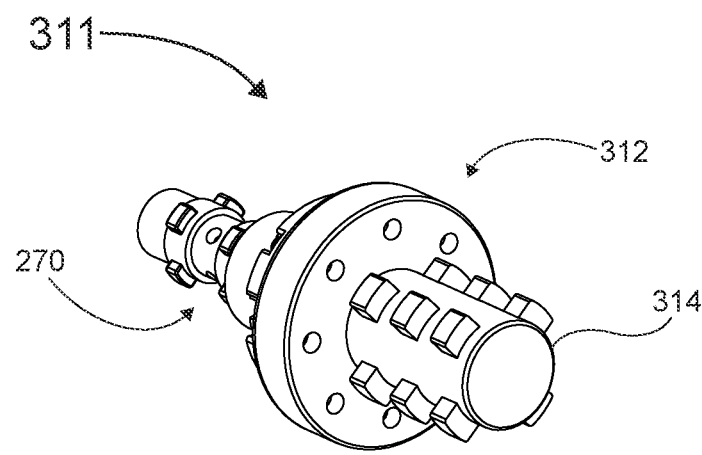
Figure 12B:
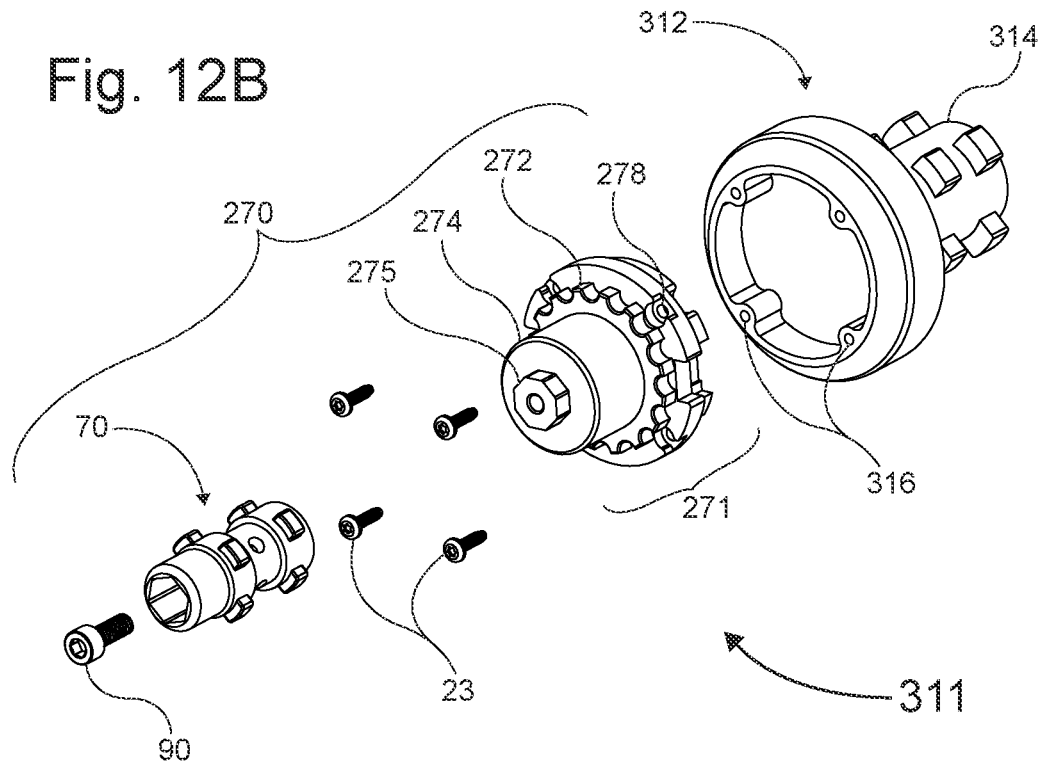

Another embodiment of the present disclosure relates to cross-format double-male adapter joiner modules that facilitate engagement of modules with male assemblies and receptacles with different dimensions, and optionally, system format characteristics such as the number of prongs on the male ends, into a single utility or structural support assembly. An example of a double-male adapter joiner module 311 is shown in FIGS. 12A and 12B.

Double-male adapter joiner module 311 comprises: (i) a male member tube-end plate 271 to which a male component 70 is mounted by a connector screw 90 inserted through the distal end of the male component 70 and threadably engaged with a threaded bore provided therefor in the octagonal boss 275 of the male member tube-end plate 271, (ii) an adapter joiner component 312, having a (iii) alternative male member component 314, which has a different diameter and length and number of prongs than male component 70, for demountable engagement into a receptacle of a different system format. The male member tube-end plate 271 is secured to the adapter joiner component 312 by insertion of screws 23 through screw holes 278 to be threadably engaged with screw slots 316 in the adapter joiner component 312.

Male Member Mount Modules

Further embodiments of the present disclosure relate to a variety of male member mount modules, which may include male member side-mount bracket modules and male member mounting block modules. Particularly, the male member side-mount bracket modules provide, among other functions, unique hub assemblies which may be included in a system assembly for demountably fixed or rotatable/slidable engagement of mounted male member assemblies, on an elongate tubular support element at special angular orientations, which can be rapidly repositioned without requiring removal of modules mounted thereon. Male member mounting block modules, for their part, provide for a variety of all-male hub assemblies.

Figure 13A:
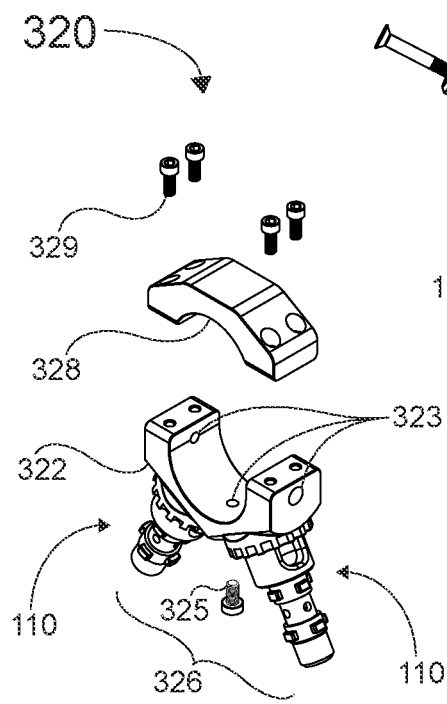

An example of a 2-way 30° side-mount bracket module 320 is shown in FIG. 13A that is demountably engageable with an elongate tubular support element, such as an extension-tube housing. The 30° side-mount bracket module 320 comprises a 30° angle male member mount bracket 322 and a clamp bracket 328 that may be securely engaged to an elongate tubular support element (not shown) by placing the male member mount bracket 322 and clamp bracket 328 around the elongate tubular support element, inserting clamp bracket screws 329 through bores provided therefor in the clamp bracket 328, and threadably engaging the screws 329 with bores provided therefor in the 30° angle male member mount bracket 322. It is to be noted that the combination of the male member mount bracket 322 and clamp bracket 328 may be referred to as a "collar clamp". The 30° angle male member mount bracket 322 is provided with a pair of threaded bores (not visible in FIG. 13A) for engagement therewith of up to two male member side-mount assemblies 110 which extend outward each at a 30° angle from the module's center, or at a 60° angle (326) between a pair. The 30° angle male member mount bracket 322 may be provided with one or more mount screw holes 323 to enable threadable engagement of a 30° side-mount bracket module 320 to an elongate tubular support element with a mount screw 325 threadably engaged, for example, with a square nut contained in an extension-tube housing's square-nut channel or middle square-nut holder 180.

Figure 13B:
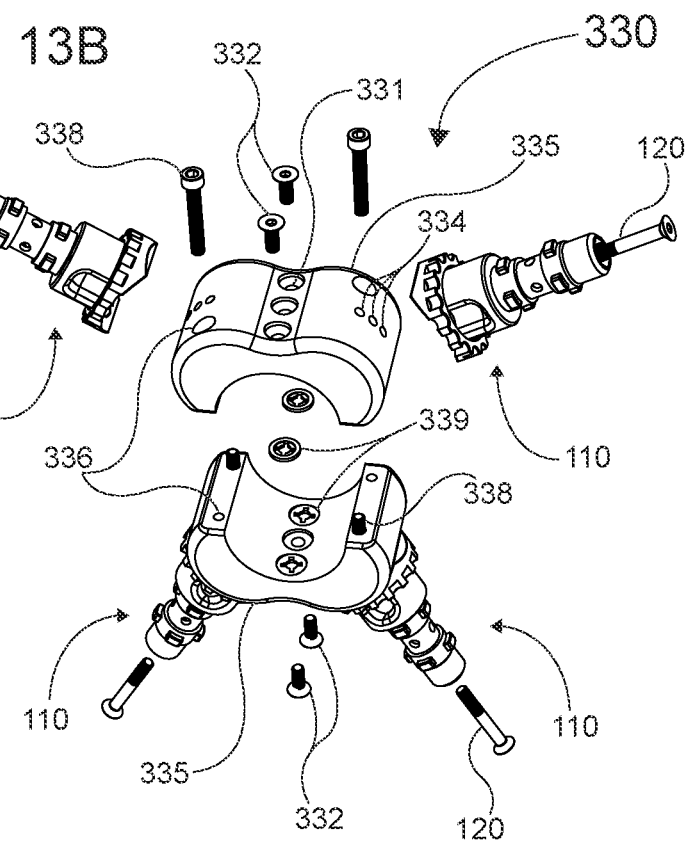

An example of a 4-way multi-angle side-mount bracket module 330 is shown in FIG. 13B and which comprises a pair of opposed multi-angle male member mount brackets 335 for encircling and clamping to an elongate tubular support element, such as an extension-tube housing, wherein each bracket 335 has a pair of opposed bracket screw bores 336 at each end of the bracket 335 for receiving therethrough and threadably engaging bracket screws 338 in the corresponding bores in the opposing bracket. At least one mount screw hole 331 is provided along the centre point of the longitudinal axis of each bracket 335 (three holes 331 are shown in FIG. 13B) for receiving therein a mount screw 332, and on the opposite side, a washer 339, for engagement of the bracket 335 on an elongate tubular support element.

Each multi-angle male member mount bracket 335 has two opposed sets of three spaced-apart threaded bores 334 for threadable engagement with a bolt 120 to demountably secure thereto two outwardly extending male member side-mount assemblies 110. Each set of three spaced-apart threaded bores 334 allows for mounting of a male member side-mount assembly 110 at an angle of 30° or 45° or 60° from the module's center, or at an angle of 60° or 90° or 120° between a pair of male member side-mount assemblies 110 mounted to the bracket 335. In this example, the two 45° bores 334 provide their mounting position at a unit scale extension, of for example 30 mm, from the bracket's 335 inner mounting circumference.

A single multi-angle male member mount bracket 335 may be used in isolation, if mounted to an extension-tube housing using one or more mount screws 332, or when used as a stand-alone special-angle hub.

Figure 13C:
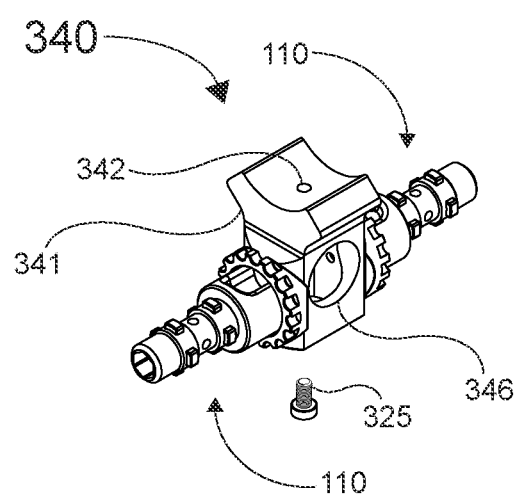

An example of a 2-way 90° offset side-mount bracket module 340 is shown in FIG. 13C and comprises a 90° angle offset male member mount bracket 341 having a mount screw hole 342 accessible by a mount screw 325 and a screwdriver (not shown) through a screw-access opening 346 to enable securing of the mount bracket 341 to an elongate tubular support element, such as an extension-tube housing (not shown), with a mount screw 325. This example of the 90° offset side-mount bracket module 340 has mounted two opposing male member side-mount assemblies 110 extending longitudinally that will be positioned in parallel to an elongate tubular support element to which the side-mount bracket module 340 may be demountably engaged. It is to be noted that the combination of any of the male member mount brackets 322, 341, 335, and the like with any of clamp brackets 328, 335, and the like, or with plate wedges 445 and the like, may be referred to as a "collar clamp".

Figure 13D:
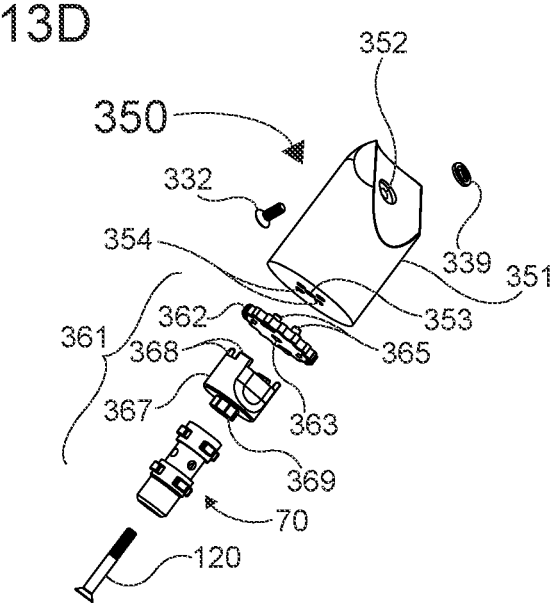

An example of a 1-way 45° offset side-mount bracket module is shown in FIG. 13D and comprises a cylindrical 45° offset male member mount bracket 351 demountably engaged with an example of a male member flat-mount assembly, which may be provided in a system assembly, as disclosed herein, to allow for demountable engagement of a male member to a flat surface. Male member flat-mount assembly 361 comprises (linked by a bolt 120) a male component 70, as previously described, mounted on another example of a wide pivot component 367, which at its other end is engaged with another example of a pivot-lock sprocket 362 for reversible locking with a pivot lock 60, which interfaces with a flat surface, described in further detail below.

There is a flat surface provided at one end of the cylindrical mount bracket 351 that has four peg holes 354 for positioning of and engagement with pivot-lock sprocket 362 by its four pegs 365. The wide pivot component 367 having four connector teeth 368 extending from one end, is inserted into slots 366 provided therefor in the pivot-lock sprocket 362 (best seen in FIG. 14A). The other end of the wide pivot component 367 has an octagonal boss 369 for extending into the octagonal recess provided therefor in the male component 70. The male assembly 361 is secured to the cylindrical mount bracket 351 by a bolt 120 inserted through bores provided therefor in the male component 70, the wide pivot component 367, and the pivot-lock sprocket 362 (through central bore 363), and then threadably engaged with a central bore 353 provided therefor in the end-face of the cylindrical mount bracket 351. At the opposite end of the bracket 351 there is an angled concave surface that is configured to matingly engage the outer surface of an elongate tubular support element, such as an extension-tube housing, not shown. Through the opposite side and out of the concave surface there is a mount screw hole 352 provided therefor to receive therein on the inside a washer 339, and from the other side, a mount screw 332 for demountable engagement of the bracket with an elongate tubular support element, such as an extension-tube housing having a square nut within a channel or housed by a middle-square nut holder within. According to further embodiments, a cylindrical mount bracket may have a concave surface at an angle other than 45° relative to the flat-mount surface. According to further embodiments, a cylindrical mount bracket may have side-mount bores around its circumference provided for sideways mounting of male member side-mount assemblies.

Figure 14A:
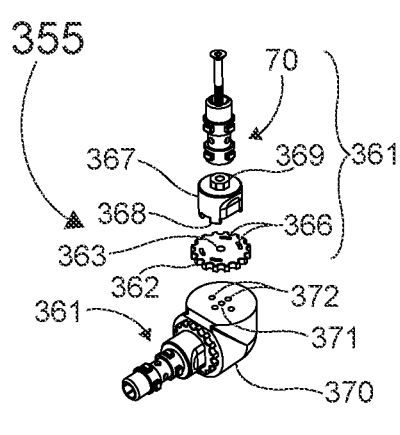

An example of an elbow male member mounting block module 355 is shown in FIG. 14A and comprises a 2-way elbow male member mounting block 370 having two end surfaces, in this example at 90° from each other, and a male member flat-mount assembly 361 engaged with each end surface. Each end surface of the mounting block 370 has four peg holes 372 for positioning of and engagement with a pivot-lock sprocket 362 of a male member flat-mount assembly 361. A male member flat-mount assembly 361 is engaged with an end surface of the mounting block 370 with a bolt 120 inserted through the bores of the assembly 361 and threadably engaged with a central bore 371 provided therefor in the end surface of the mounting block 370. According to further embodiments, a 2-way elbow male member mounting block may have an angle other than 90° between the end surfaces.

Figure 14B:
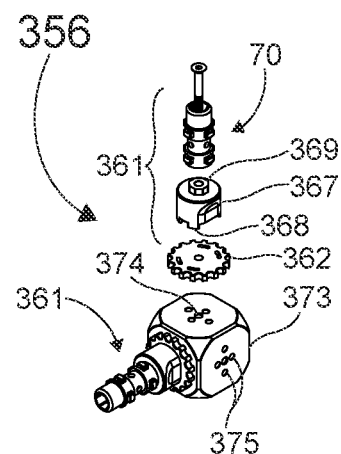

An example of a cube male member mounting block module 356 is shown in FIG. 14B. The 6-way cube male member mounting block 373 has six symmetrical out-facing surfaces for engagement with up to six male member flat-mount assemblies 361 (two male member flat-mount assemblies 361 are shown in FIG. 14B). Each out-facing surface of the mounting block 373 has four peg holes 375 for receiving and engaging therein the pegs 365 of a pivot-lock sprocket 362, and a central threaded bore 374 for threadable engagement with a bolt 120 to securely mount thereto a male member flat-mount assembly 361.

Figure 14C:
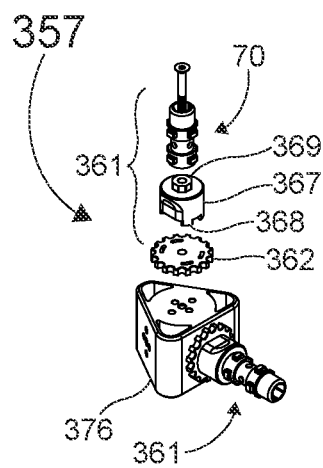

An example of a triangular male member mounting block module 357 is shown in FIG. 14C with a 5-way triangular mounting block 376 having five faces for demountable engagement with up to five male member flat-mount assemblies 361 (two male member flat-mount assemblies are shown in FIG. 14C). Each face of the triangular mounting block 376 has four peg holes and central threaded bore for receiving therein and engagement therewith a male member flat-mount assembly 361.

Figure 14D:
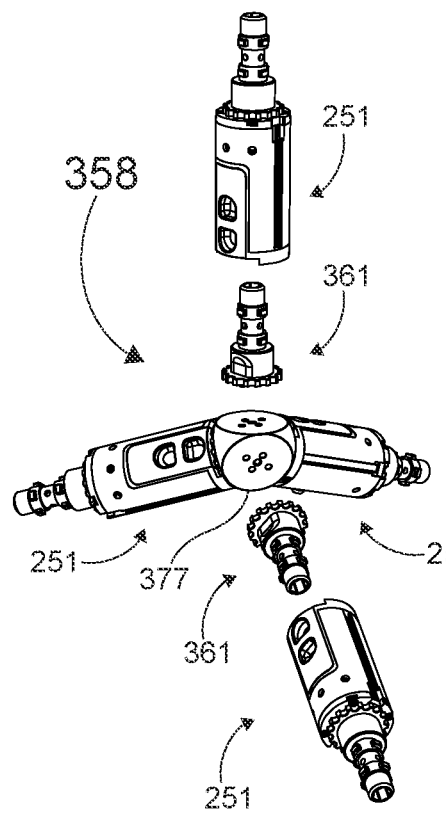

An example of a pyramidal male member mounting block module 358 is shown in FIG. 14D and comprises a 4-way pyramidal mounting block 377 with four symmetrical out-facing surfaces, each configured for demountable engagement with a male member flat-mount assembly 361 as described for the cube male member mounting block module 356 shown in FIG. 14B. The pyramidal male member mounting block module 358 is shown in FIG. 14D demountably engaged with two male/receptacle side-opening joiner modules 251 (shown in FIG. 8), and with two additional male/receptacle side-opening joiner modules 251 with two corresponding male member flat-mount assemblies 361 shown exploded in their alignment for demountable engagement.

Figure 14E:
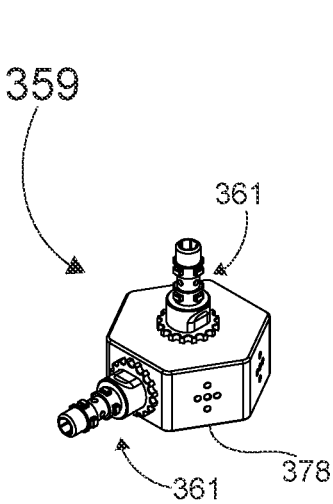

An example of a hexagonal male member mounting block module 359 is shown in FIG. 14E comprising an 8-way hexagonal mounting block 378 with six side faces configured for demountable engagement with up to six male member flat-mount assemblies 361, and a top-surface face and a bottom-surface face wherein each face is configured for demountable engagement with one male member flat-mount assemblies 361, with a bolt passing through the central bores of the assembly 361 and threadably engaged with a central bore in the mounting faces of the mounting block 378.

Figure 14F:
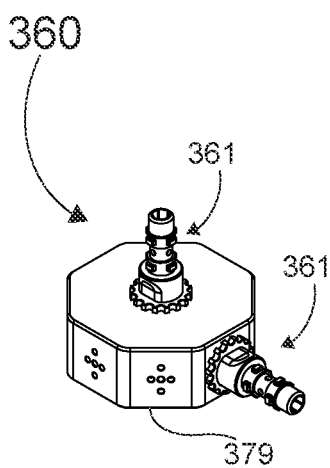

An example of an octagonal male member mounting block module 360 is shown in FIG. 14F comprising a 10-way octagonal mounting block 379 with eight side faces configured for demountable engagement with up to eight male member flat-mount assemblies 361, and a top-surface face and a bottom-surface face wherein each face is configured for demountable engagement with one male member flat-mount assembly 361.

Figure 15A:
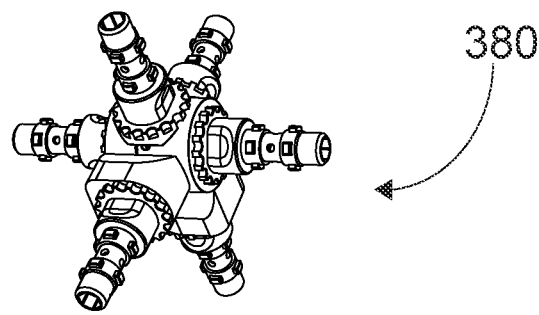
Figure 15B:
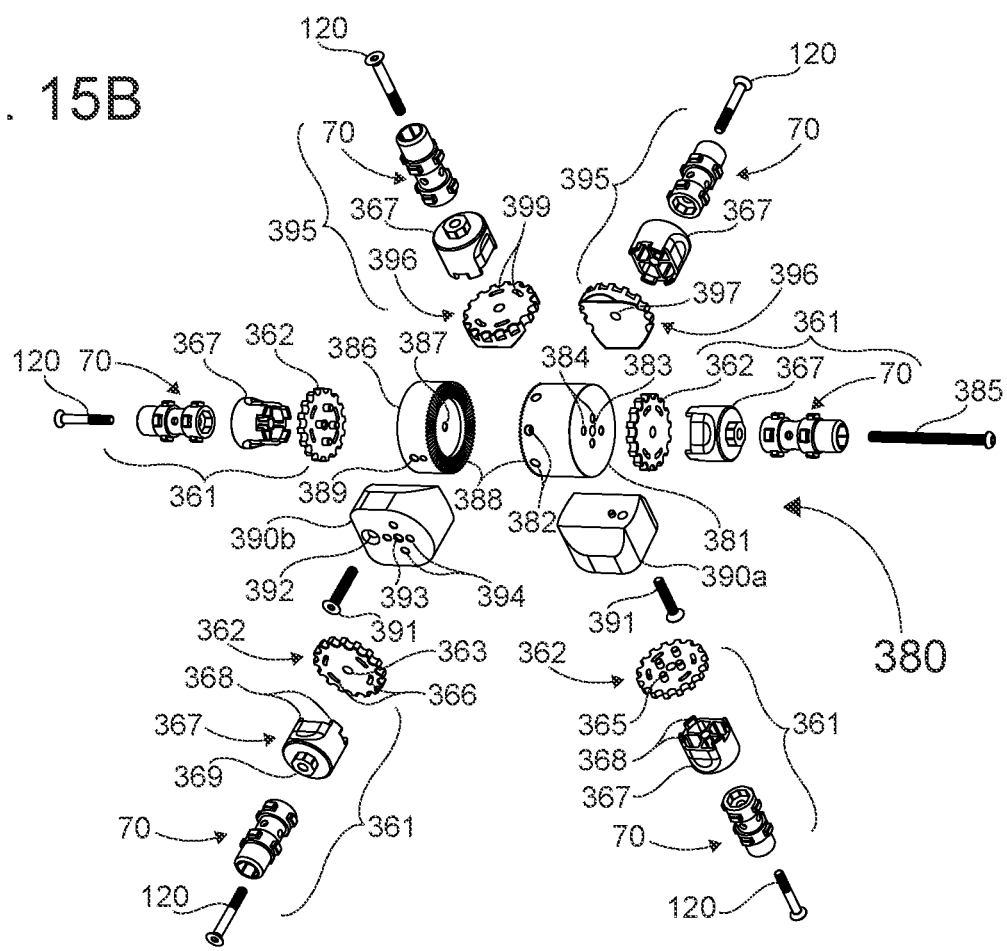

An example of a 5° increment adjustable male member mount module 380 is shown in FIGS. 15A, 15B comprising a male-mount half housing 381 and a rotation-adjustment half housing 386 whereon male member assemblies are demountably engaged. The inward-facing end surfaces of the male-mount half housing 381 and rotation-adjustment half housing 386 are provided with intermeshing teeth 388 that enable repositionable engagement of the rotation-adjustment half housing 386 in 5° increments relative to the male-mount half housing 381, allowing for the adjustment and setting, in precise 5° increments, of the angular separation between the two lower male member flat-mount assemblies 361 which are shown in FIG. 15B exploded from the brackets 390a, 390b, to which they are mounted at peg holes 394 with a connector bolt 120, threadably engaged with the central bore 393. Prior to engagement with the flat-mount assemblies 361, brackets 390a, 390b are mounted to male-mount half housing 381 and rotation-adjustment half housing 386, respectively, by a screw 391 through their bores 392 to be threadably engaged with a mounting bore 389 (in FIG. 15B, visible only on the rotation-adjustment half housing 386). Each of their male member flat-mount assemblies 361 can then be mounted. An adjustment screw 385 is then passed through a through-hole 383 in the male-mount half housing 381 and threadably engaged with a threaded bore 387 on the inward-facing end of the rotation-adjustment half housing 386. It is optional that a flat-mount assembly 361 is additionally mounted to the outward face of the male-mount half housing 381 at peg holes 384 and through-hole 383, but therefore requiring a longer version of adjustment screw 385 than if not included in the assembly. At this stage, an adjustable hub assembly has been created, which by loosening the adjustment screw 385, the teeth 388 of the housings 381, 386 can be disengaged, allowing the relative positions of the housings to be rotated and then re-engaged at one of the 5° increments by re-tightening the adjustment screw 385. As described above, the angular separation between the two male assemblies 361 mounted on the brackets 390a, 390b can be set in 5° increments, from a maximum of 180°, to a minimum of 60° where the two brackets will come to meet.

As shown in FIG. 15, an optional male member flat-mount assembly 361 can be mounted to the outward face of the rotation-adjustment half housing 386 with a bolt 120 threadably engaged with the outer excess of center bore 387. In addition, optionally, two of another example of, as disclosed herein, a male member side-mount assembly are shown mounted to side-mount bores 382 on the circumference of male-mount half housing 381. According to embodiments, male member side-mount assembly 395 comprises the previously described male component 70 mounted to the wide pivot component 367 mounted to another example of a pivot-lock sprocket 396 having wide pivot component slots 399 whereby component 367 may be engaged, at which time assembly 395 may be demountably engaged with a side-mount bore 382, or of another module, by a bolt 120 passing through the outer components 70, 367, and through central bore 397 in pivot-lock sprocket 396 to be threadably engaged with a side-mount bore. As mounted in FIG. 15, the side-mount assemblies 395 can provide for a variety of adjustable hub assemblies, however, it should be noted that in their use, they limit the extent to which the angular settings of the 5° increment adjustable male member mount module 380 may be adjusted, from where the bracket 390b on the rotation-adjustment half housing 386 meets bracket 390a, to where it comes to meet the nearest male member side-mount assembly 395 on the male-mount half housing 381.

Tool Support Modules and Load Support Modules:
Baseplate Modules

Some embodiments of the present disclosure relate to baseplate assemblies for incorporation into a utility support system to enable demountable engagement with a tool such as a camera or microphone or sound equipment and other types of tools into a utility support system. For example, the baseplate assemblies disclosed herein can be for mounting thereon camera-mount plates and camera accessories such as matte-box holders, focus-pull devices, and the like. The baseplate assemblies may comprise a screw mount or a clip or a dovetail plate or a box or a tray or a basket and the like for demountably engaging a variety of tools and loads.

Figure 16A:
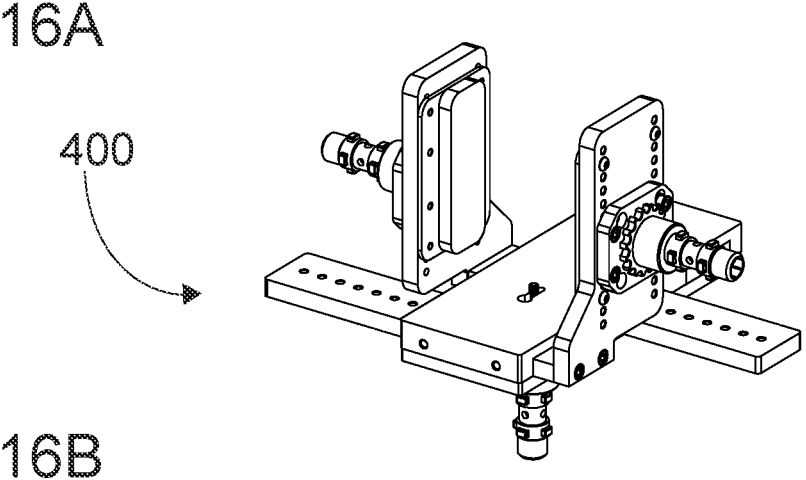
Figure 16B:
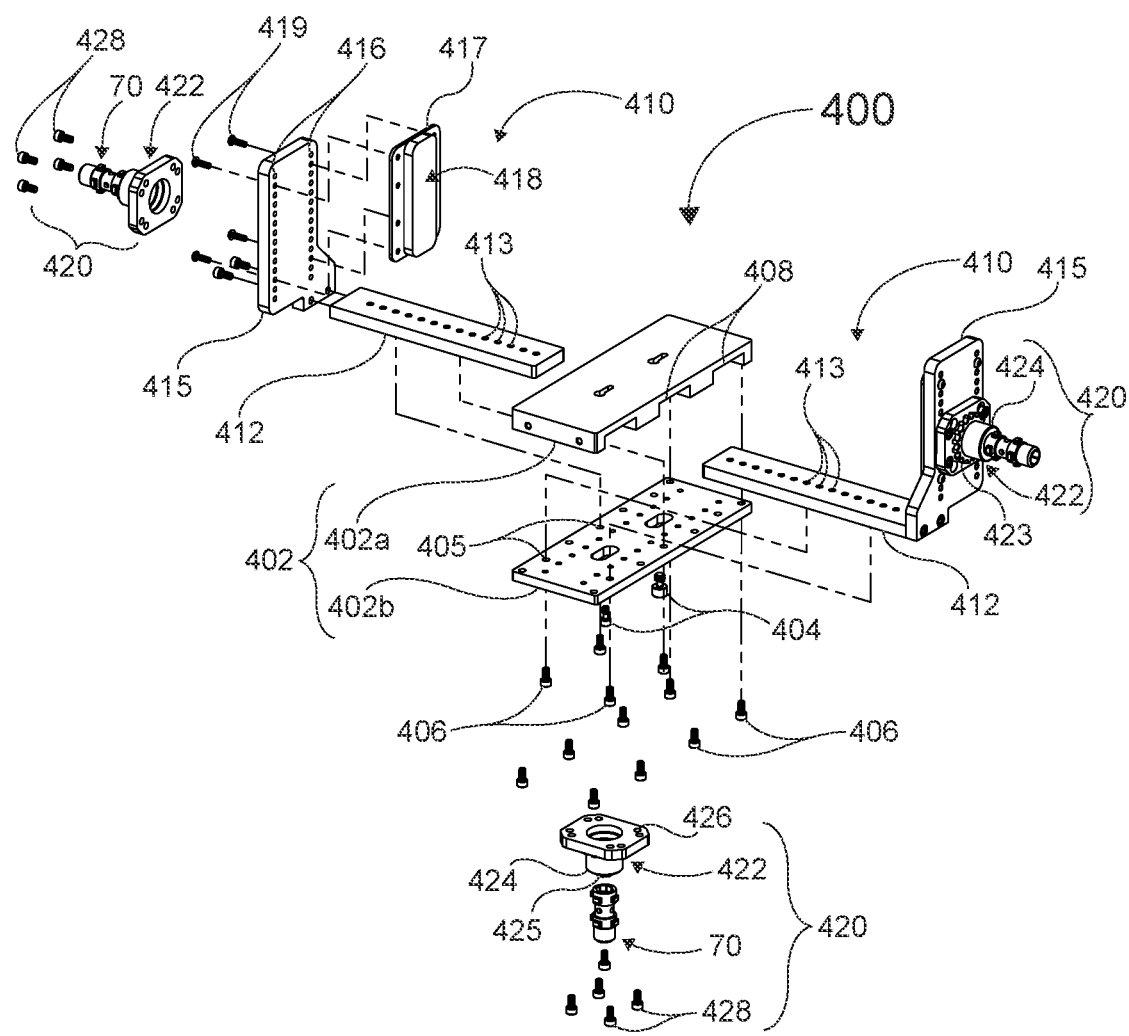

An example of a baseplate assembly 400 suitable for demountable engagement with a film camera, high-definition video camera, DSLR, other device, or additional interfacing mount-plate or dovetail plate, is shown in FIGS. 16A, 16B (perspective view, exploded perspective view, respectively). This example of a baseplate module 400 comprises a baseplate body assembly 402 having a baseplate top plate 402a secured to a baseplate bottom plate 402b by baseplate screws 406. One or more mounting screws 404 (sized as necessary) is/are provided through slots in the baseplate body assembly 402, to threadably engage one or more mounting bores provided therefor in the base of the camera or other device or mounted component.

In this example, the baseplate top plate 402a and bottom plate 402b together define three mounting bracket slots 408 which allow for one to three offset cooperating mounting brackets 410 to be secured to the body assembly 402 in selected positions to engage and support therein varying sizes of cameras or other suitable load. Each mounting bracket 410 comprises: (i) a bracket arm 412 that is configured for sliding engagement with a mounting bracket slot 408 in the baseplate body assembly 402, (ii) a bracket side plate 415 engaged with the bracket arm 412 and extending upward therefrom, and (iii) a male member plate assembly 420 that is demountably engaged with the outward-facing surface of the bracket side plate 415.

The male member plate assembly 420 comprises a male component 70 engaged with a mounting plate 422 having an outward-facing wide pivot segment 424, octagonal boss 425, pivot lock sprocket 423, and a flat inward-facing plate surface that can be demountably engaged with the outward-facing surface of the bracket side plate 415 at selected positions with screws 428 inserted through screw holes 426 in the mounting plate 422 and threadably engaged with threaded bores 416 provided therefor in the bracket side plate 415.

An inward-facing support plate 417 with a support pad 418 secured thereon is mounted to the inward-facing surface of the bracket side plate 415 with screws 419. The support pads 418 may be positioned directly against a camera or other load, positionable as described in further detail below, to secure the camera or other load in supplementation of, or instead of, the mounting screws 404.

The bracket arm 412 has a plurality of equidistantly spaced-apart threaded bores 413 therethrough along the longitudinal axis of the arm 412. A selection of threaded bores 413 are aligned by the operator to correspond with bores 405 in the baseplate bottom plate 402*b* for threadable engagement with baseplate screws 406 inserted through the bores 405. The distance of the secure outward extension of the bracket arm 412 can be adjusted by selection of the spaced-apart threaded bores 413 for threadable engagement with baseplate screws 406 inserted through the bores 405, in this example to produce varying sized system format unit scale widths across the total width of the modular assembly 400 between opposed male member plate assemblies 420.

It should be noted that the male member plate assemblies 420 shown in this example are demountably engageable with a receptacle component of a rotator module or a rotator assembly disclosed herein, or with a receptacle component of a joiner module or a joiner assembly disclosed herein, or with other assemblies as disclosed herein having a receptacle component. It should be noted that, in this example, the offset of the centers of the bracket side plates 415 from the centers of the bracket arms 412 may align, when using adjacent mounting bracket slots 408, the two opposed side plates 415 and mounted male member plate assemblies 420 to provide a single axis between opposed male member plate assemblies 420. As shown, a baseplate assembly may also include a male member plate assembly 420 demountably engaged with the underside of the baseplate body assembly 402 to provide an additional axis for pivotable or fixed engagement of the baseplate assembly 400 within a system assembly.

Figure 17A:
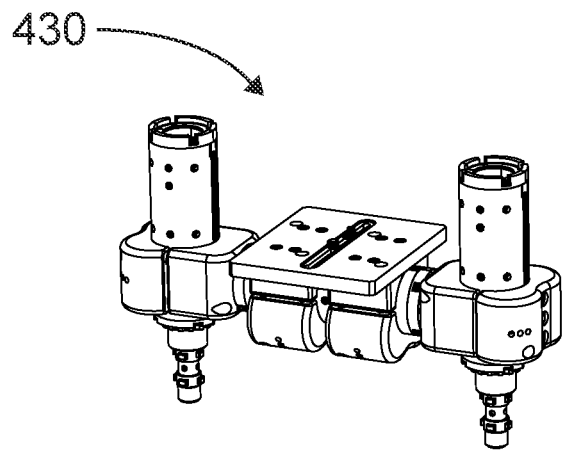
Figure 17B:
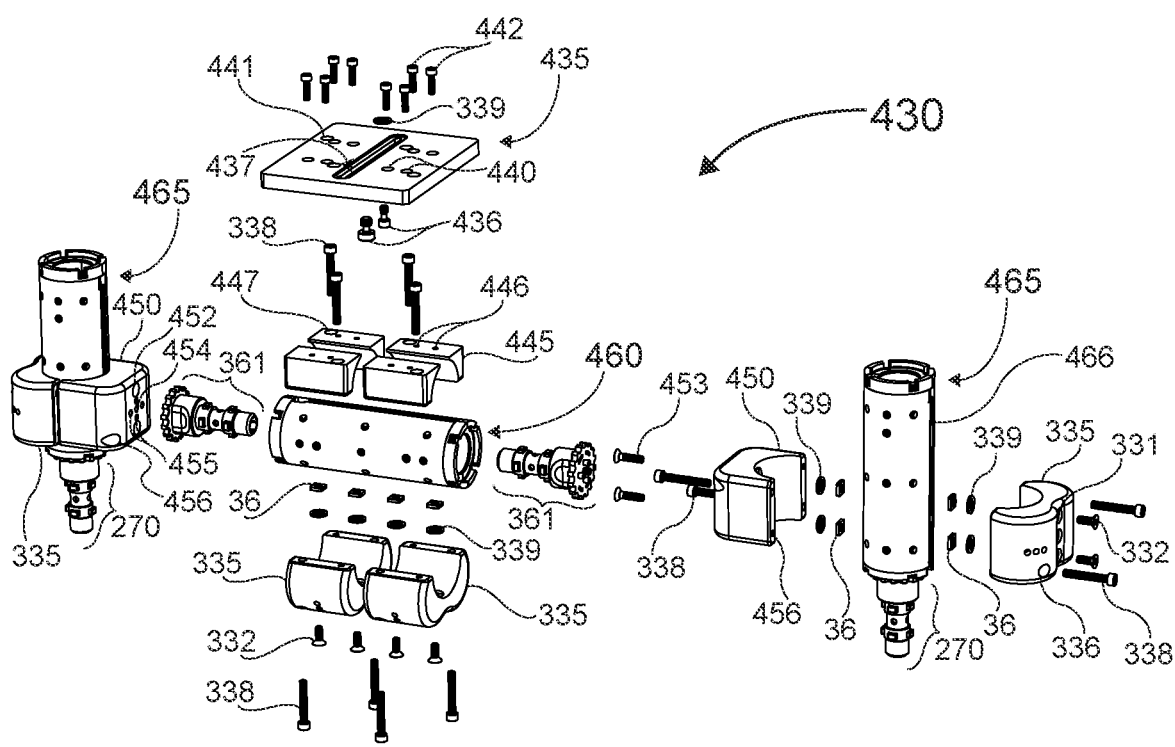

Another example of a baseplate module suitable for demountable engagement with, for example, a camera is shown in FIGS. 17A, 17B (perspective view, exploded perspective view, respectively). This example of a baseplate assembly 430 comprises a tool mount plate 435 engaged with a double-receptacle extension-tube joiner module 460 sandwiched between two male/receptacle extension-tube joiner modules 465. A pair of multi-angle male member mount brackets 335, as previously described in reference to FIG. 13B, are fitted side-by-side against the lower longitudinal section of the double-receptacle extension-tube joiner module 460 and engaged with two pairs of plate wedges 445 with four bracket screws 338 inserted through holes 447 in the plate wedges 445 and then, threadably engaged with bores provided therefor in the multi-angle brackets 335. In the opposite direction, four bracket screws 338 may be inserted through bores 336 and threadably engaged with bores in the undersides of plate wedges 445. When the bracket screws 338 are loosened, engagement with the joiner module 460 is slidable or pivotable on the given length of joiner module 460. For a secure hold, the bracket screws 338 can be tightened. Optionally, the multi-angle bracket(s) 335 can be engaged directly with a joiner module or rotator module with one or more mount screw(s) 332 threadably engaged with square nuts 36 slidably engaged within the corresponding module's square-nut channel.

The tool mount plate 435 is secured to the plate wedges 445 with screws 442 inserted through plate screw holes 440 and threadably engaged with threaded bores 446 in the plate wedges 445. A tool or other device, for example, a camera, or camera mount plate for supplementary interfacing with a camera or camera accessories, may be secured to the tool mount plate 435 with mounting screws 436 inserted into tool-mounting slot 437 and then threadably engaged with one or more mounting bores provided therefor in the base of the tool or device.

A male member flat-mount assembly 361 is engaged with a male mount slider component 450 which is then clamped to a male/receptacle extension-tube joiner module 465 by a multi-angle bracket 335 with bracket screws 338 inserted through bores 336 provided therefor in the multi-angle bracket 335 and then threadably engaged with bracket screw bores 456 in the male mount slider component 450, and through opposing bores 456 in the slider component 450 threadably engaged with a second pair of opposed bores 336 in the multi-angle bracket 335. The clamped-together slider component 450 and multi-angle bracket 335 may be repositioned on the joiner module 465 by loosening the bracket screws 338, selecting a new position, and then re-tightening the bracket screws 338.

The position of the clamped-together male mount slider component 450 and multi-angle bracket 335 along the male/receptacle extension-tube joiner module 465 may be additionally secured and adjusted as follows. A pair of square nuts 36 is inserted into each of the opposed longitudinal channels 466. Two mount screws 332 are inserted through mounting holes 331 provided therefor in the multi-angle bracket 335 and are threadably engaged with one of the pairs of square nuts 36 (a pair of washers 339 is interposed the inner face of the multi-angle bracket 335 and the extension-tube joiner module 465). Two mount screws 453 are inserted through mounting holes 452 provided therefor in the male mount slider component 450 and are threadably engaged with the other pair of square nuts 36 (a pair of washers 339 is interposed the inner face of the male mount slider component 450 and the extension-tube joiner module 465). The mount screws 453 and the mount screws 332 are loosened after which, the clamped-together male mount slider component 450 and multi-angle bracket 335 may be slid along the male/receptacle extension-tube joiner modules 465 to a selected position, after which, the screws 453 and 332 are re-tightened. Optionally, only one pair of screws 453, 332 may be used in conjunction with only one square-nut channel 466.

It should be noted that a baseplate assembly or other modular assembly may use a male mount slider component 450 in isolation, or clamped together in a pair in the same manner as described above in combination with a multi-angle bracket 335. It should also be noted that a male mount slider component 450 may by its width provide a unit scale extension, of for example 30 mm, of its central male member mounting bore 454 out from the circumference of the module to which it is mounted. In the example of baseplate assembly 430, this feature provides a unit scale width across the module.

Positioned with peg holes 455 and secured with a bolt threadably engaged with central bores 454, the male member flat-mount assemblies 361 extending toward the center of the baseplate assembly 430 from the male mount slider components 450, are demountably engaged with receptacles at the opposite ends of the double-receptacle extension-tube joiner module 460. In assemblies wherein screws 332 and square nuts 36 are not engaged with the longitudinal channel in the underside of joiner module 460, the supported tool mount plate 435 may be rotated about the double-receptacle extension-tube joiner module 460 to a desired position by slightly disengaging the bracket screws 338 with a tool inserted through access bores 441 provided therefor in the tool mount plate 435, and through bracket screw bores 336 provided therefor in the multi-angle brackets 335, and then rotating the tool mount plate 435 to a desired position and then reengaging the bracket screws 338. Alternatively, for an open and intermittently lockable 360° pivotable connection of the tool mount plate 435 to the outer assemblies, the joiner module 460 may be replaced with a double-receptacle rotator module such as the previously cited example rotator module 151 shown in FIG. 4.

The baseplate assembly 430 may be securely engaged within a larger utility or structural support assembly by one or both of the two joiner modules' 465 receptacles, or by one or both of the two joiner modules' 465 male member extension-tube end assemblies 270, or by the addition of male member side-mount assemblies 110, 395 (not shown) to one of the joiner modules 465 or multi-angle brackets 335.

Tray Modules

Figure 18A:
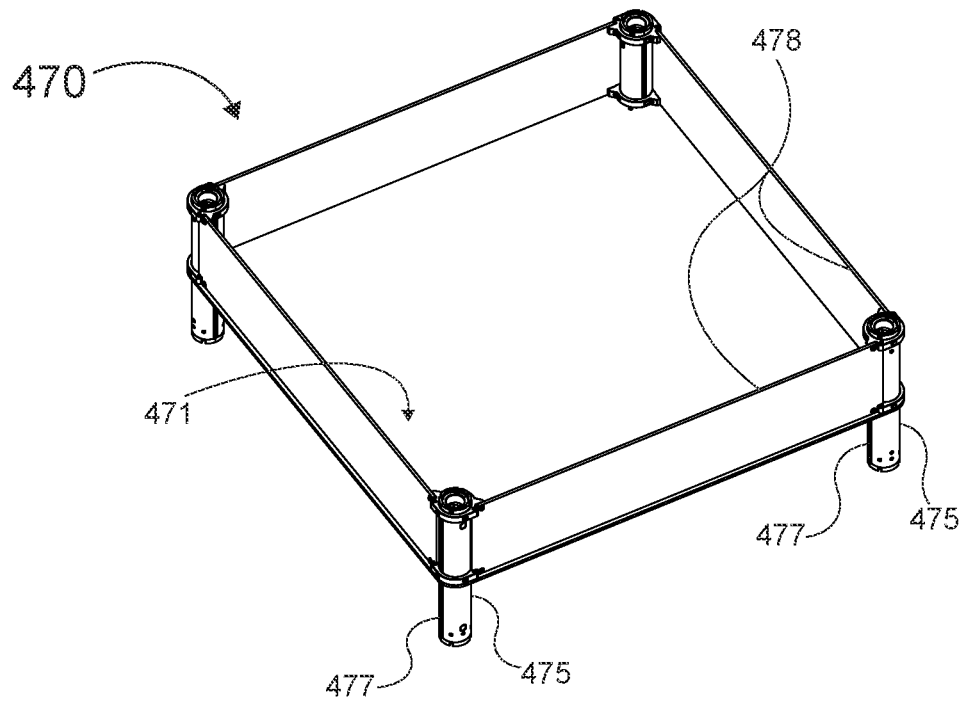
Figure 18B:
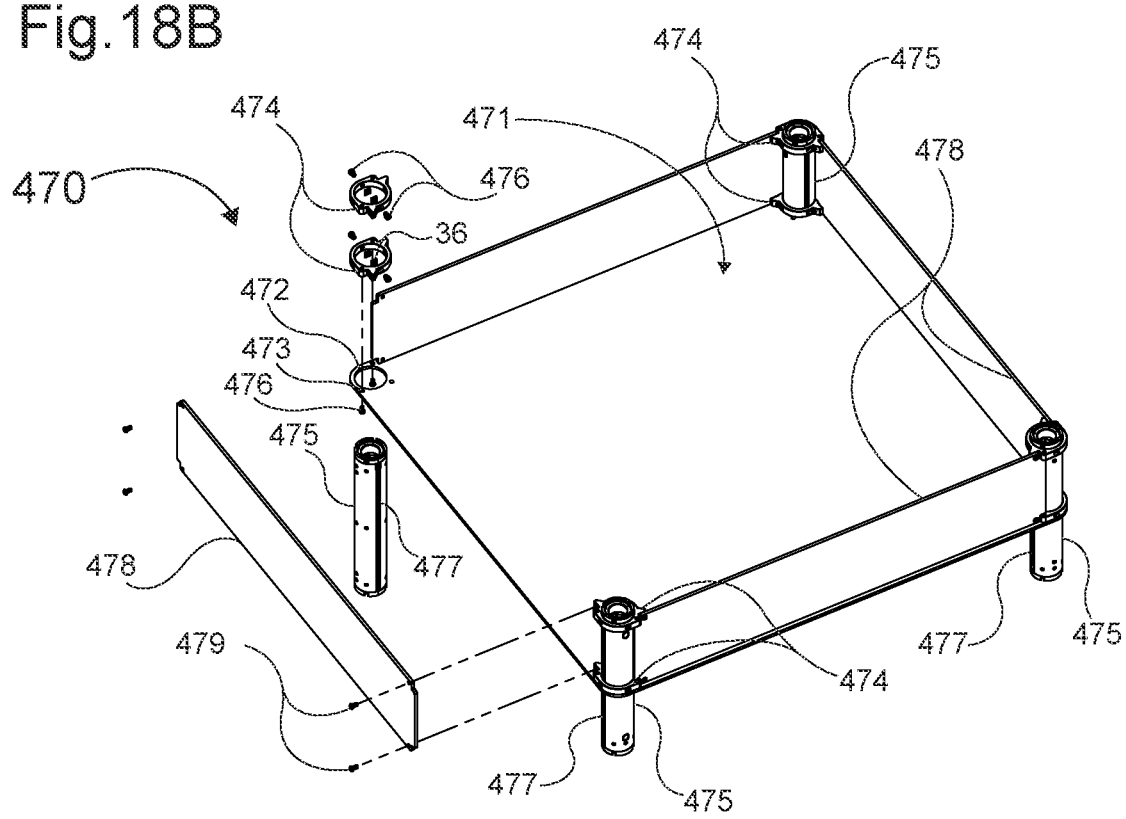

Some embodiments of the present disclosure relate to tray modules that can be incorporated into utility system assemblies. An example of a tray module assembly 470 is shown in FIGS. 18A, 18B (perspective view and partially exploded perspective view, respectively) comprising a tray bottom 471 which has an orifice 472 at each corner. It is to be noted that a tray bottom may be rectangular or square or trapezoidal or triangular or pentagonal or hexagonal or heptagonal or octagonal in shape. An example of a square-shaped tray bottom 471 is shown having four orifices 472 at each corner for insertion and reversible engagement of extension-tube joiner modules or extension-tube rotator modules of varying lengths, which may optionally act as a system assemblies' structural corner posts. Adjacent to each orifice 472, tray bottom 471 additionally comprises collar bores 473 whereby a collar 474 is demountably secured to the tray bottom 471 with collar screws 476 passed through the collar bores 473 into threaded bores in the collar 474.

In this example of a tray module 470, there is provided four of a second example of a double-receptacle extension-tube joiner module 475 (here longer than joiner module 460 shown previously in FIG. 17) passed through the combined four collars 474 and tray bottom 471. The extension-tube joiner modules 475 can be demountably secured therein within the center of each collar 474 by collar screws 476 passed through side-facing bores in the collar, and threadably engaged with square nuts 36 placed within the longitudinal square-nut channels 477, or alternatively, housed by a receptacle socket assembly or middle square-nut holder within a module's extension-tube housing. The collars 474 may additionally comprise side-facing threaded bores at which side panels 478 can be demountably secured with side panel screws 479 passed through bores in the side panels 478 to be threadably engaged with the collars 474. For added reinforcement, optionally the top ends of the extension-tube joiner modules 475 and side panels 478 are secured to four additional collars 474, as shown. Wherein an assembly in which the collars 474 are engaged along the square-nut channels 477 of the corner modules, a tray bottom 471 and side panels 478 assembly may be raised or lowered on its corner modules by loosening the collar screws 476, selecting a new position, and then retightening the collar screws. It is to be noted that tray bottoms and tray sides disclosed herein may also be referred to as "flat sheet stock".

Such tray modules can be incorporated into utility system assemblies for use to hold and transport equipment, tools, materials, supplies, and the like around a worksite or other location, or alternatively, for use in shelving systems or staging platforms. The tray modules may be pivotably engaged into a utility system assembly where mounted on rotator modules, thereby providing a load-dumping function, if so desired. The tray modules can also be incorporated into platform assemblies or table assemblies or workstation assemblies.

Table Modules

Some embodiments of the present disclosure relate to table and desk and shelf module assemblies that can be assembled using some of the modules disclosed herein, and may also be used to assemble staging platforms. An example of a desk assembly 480 is shown in FIG. 19A and comprises a desk top 481 with an example of a double-receptacle side-opening joiner module 488 engaged at each corner. It is to be noted that a desk top or a table top may be rectangular or square or trapezoidal or triangular or pentagonal or hexagonal or heptagonal or octagonal or circular or oval in shape. If so desired, a shelf 482 may be provided engagement with, for example, a pair of a second example of double-receptacle side-opening joiner modules 489 mounted to the desk top 481. An example of how a double-receptacle side-opening joiner module 488 may be engaged with a desk top 481 is shown in FIG. 19B. A recess, not visible in FIG. 19B but identical to recess 483 on the top surface of the desk top 481, is provided on the bottom surface of the desk top 481 at each corner. A mounting plate 484 with a central threaded bore 485 is inserted into the recess and securely mounted to the desk top 481 with, for example, five screws 487 inserted through bores 486 provided therefor in the mounting plate 484. It should be noted that a mounting plate may be circular or oblong or triangular or square or rectangular or trapezoidal or hexagonal or octagonal in shape and providing varying numbers of screw bores 486.

A male member flat-mount assembly 361 is mounted to the plate 484 with a mounting bolt threadably engaged with the threaded bore 485. Then, the male member flat-mount assembly 361 is inserted into the receptacle in the end of a double-receptacle side-opening joiner module 488 and secured in place as described for side-opening joiner module 251 in reference to FIG. 8B. Alternatively, there may be provided for mounting one or more of a rotator module, or one or more of a joiner module as described, for example, double-receptacle extension-tube joiner module 460 in reference to FIG. 17B. If a shelf 482 is to be added, then a plate 484 is inserted into a recess 483 provided therefor in the desk top surface and secured in place with screws 487 inserted through bores 486. A male member flat-mount assembly 361 is mounted to the plate 484 with a mounting bolt threadably engaged with the threaded bore 485, after which, the male member flat-mount assembly 361 is inserted into a receptacle in the end of a double-receptacle side-opening joiner module 489, or alternatively, a receptacle of another double-receptacle module. A pair of plates 484 and male member flat-mount assemblies 361 are mounted to the bottom of the shelf 482 and secured into, as shown, receptacles in the other ends of double-receptacle side-opening joiner modules 489.

Lighting Mount Modules

Figure 20A:
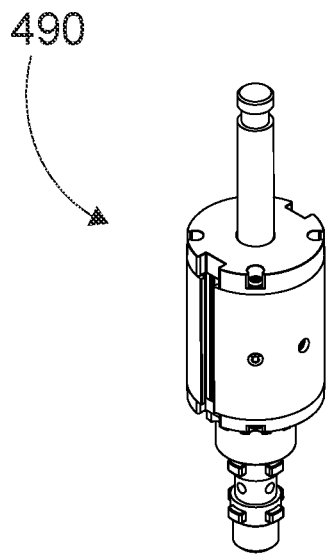
Figure 20B:
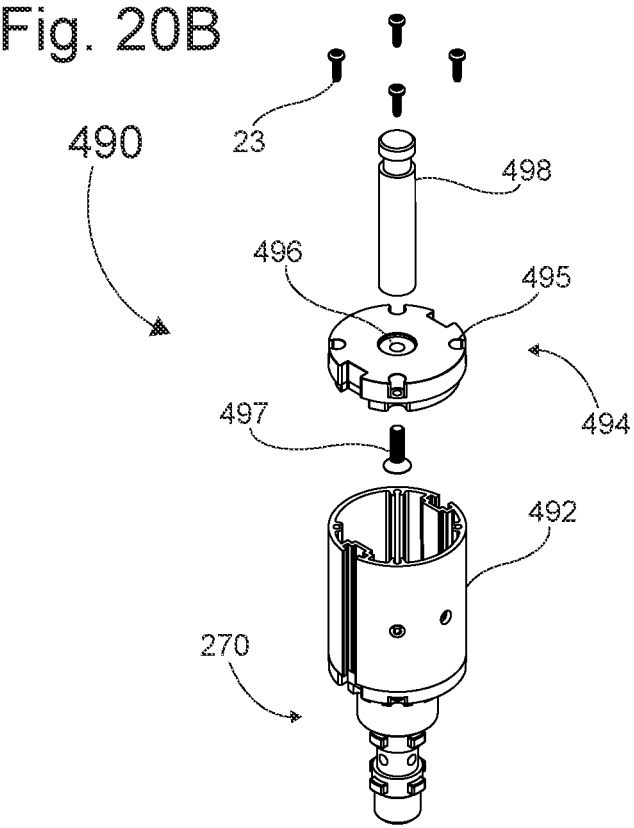

Some embodiments of lighting mount modules that provide attachment means for demountable engagement of lighting equipment or other similar types of equipment into some utility system assemblies, are shown in FIGS. 20A to 20D. One example of a lighting mount module 490 is shown in FIGS. 20A, 20B and comprises an extension-tube housing 492 having a male member extension-tube end assembly 270 secured at one end. A spigot 498 is threadably engaged with a spigot mount plate 494 by a screw 497 inserted through a threaded bore 496 in the spigot mount plate 494. The spigot assembly is then mounted to the other end of the extension-tube housing 492 with screws threadably engaged with screw bores provided therefor in the extension-tube housing 492.

Figure 20C:
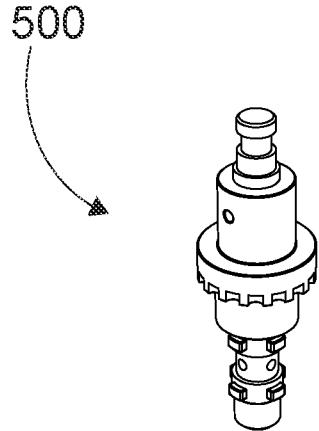
Figure 20D:
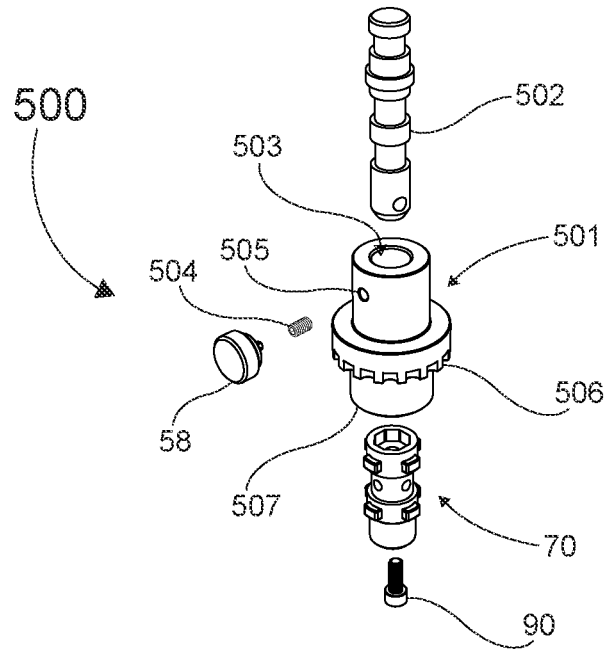

Another example of a lighting mount module 500 is shown in FIGS. 20C, 20D and comprises a spigot-adapter male member component 501 comprising a wide pivot segment 507 at one end to which is secured a male component 70 with a screw 90 threadably engaged with a bore in the octagonal boss of the wide pivot segment 507. The spigot-adapter male member component 501 has a pivot-lock sprocket 506 situated about its midpoint, and a spigot receptacle 503 at its other end. A spigot 502 is inserted into the spigot receptacle 503 and secured in place with a set screw 504 inserted through screw bore 505 and then tightened with a tension-adjustment screw knob 58 or other screwdriver.

Base Modules:
Rail-Rolling Modules

Figure 21A:
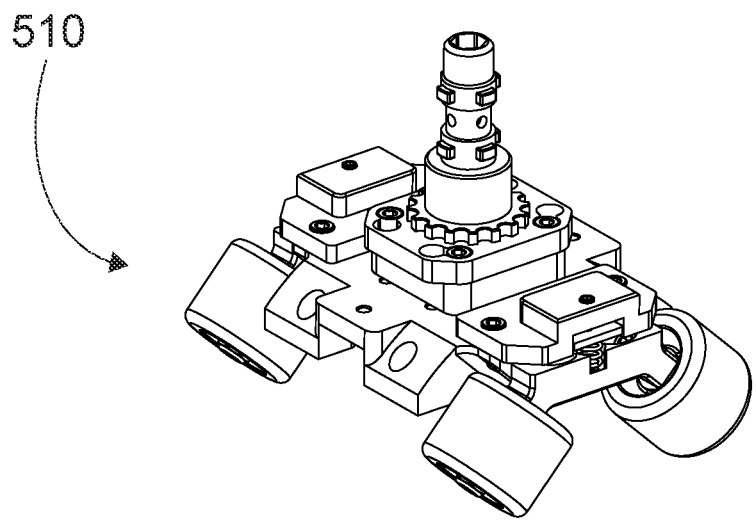
FIG. 21A is a perspective view of an example of a rail-rolling module.
Figure 21B:
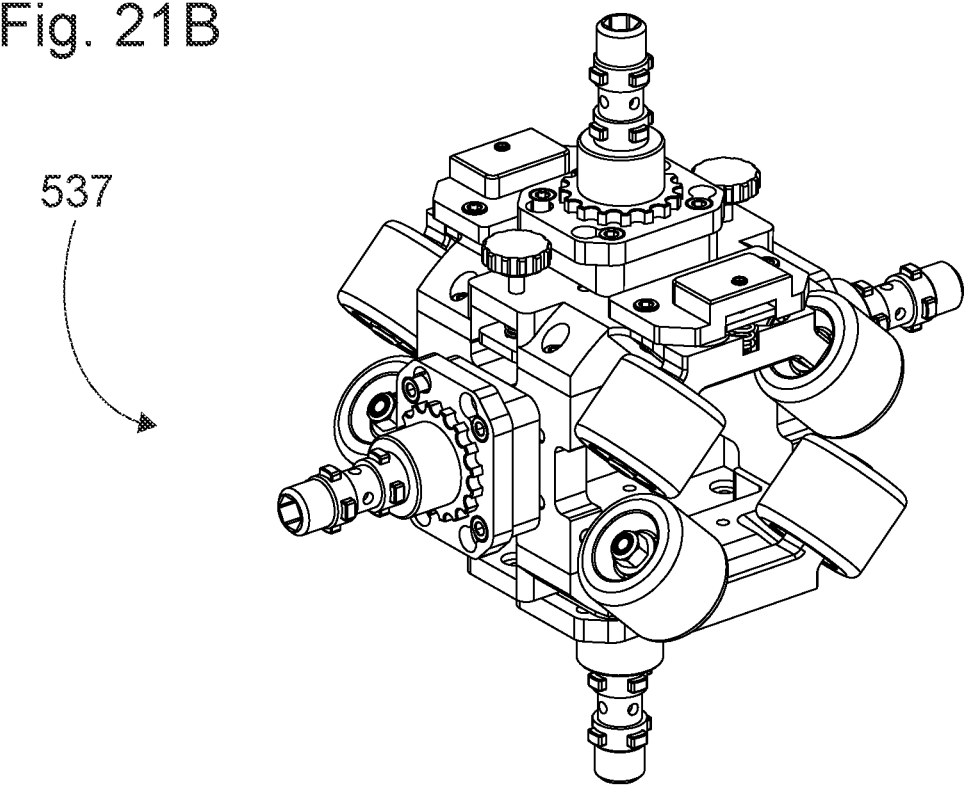
FIG. 21B is a perspective view of an example of a rail-surround rolling module.
Figure 22:
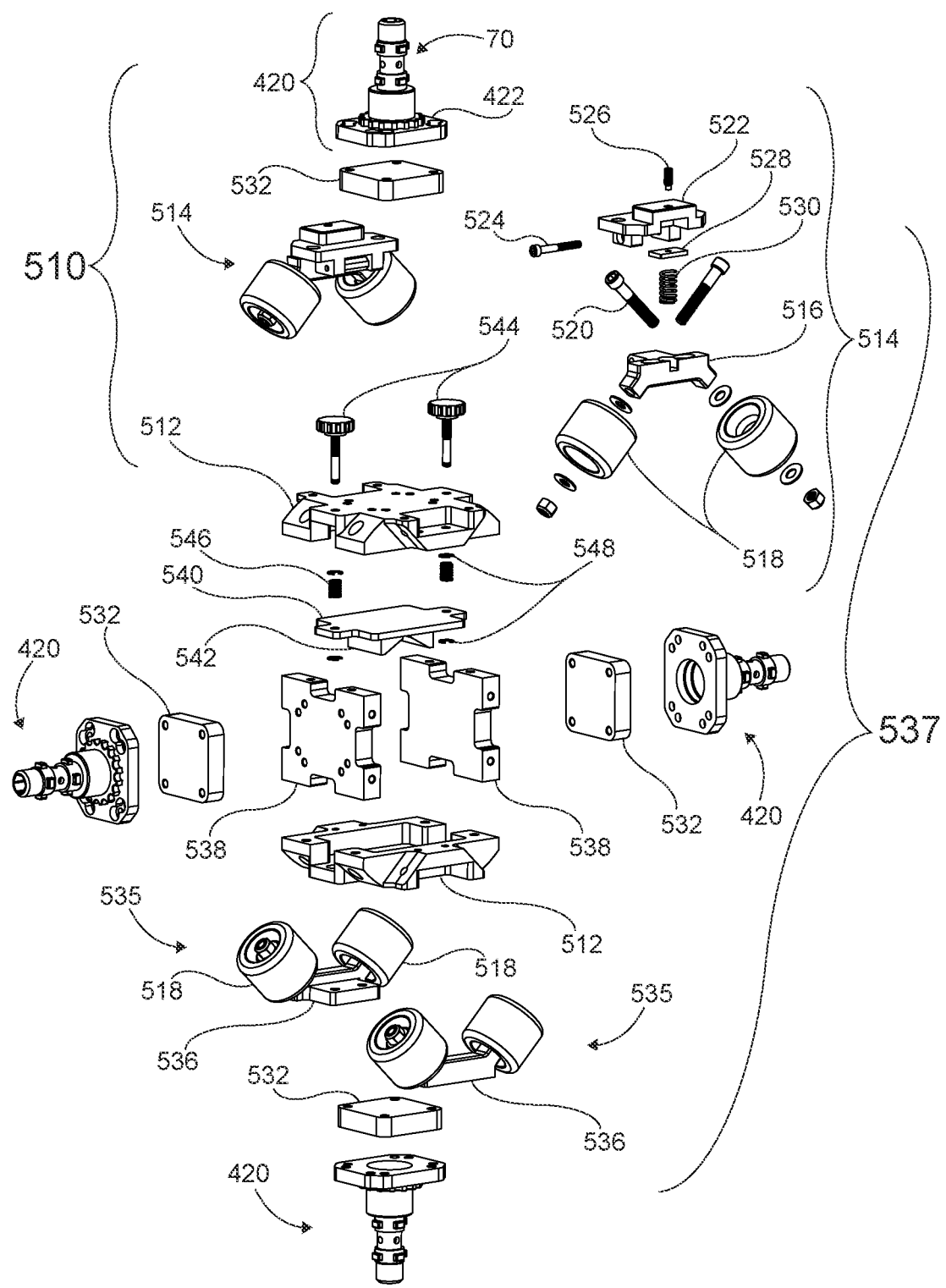
FIG. 22 is an exploded perspective view of the rail-rolling modules shown in FIG. 21.

Some embodiments of the present disclosure pertain to rail-rolling modules and assemblies that are configured for demountable engagement of, for example, a motion-picture camera that can be conveyed along a rail track system in filmmaking or videography. Similar assemblies may be used to convey along a rail track system other devices, tools, equipment, materials, properties, and the like around a worksite or other location. Some examples of rail-rolling modules and assemblies are shown in FIGS. 21A, 21B, and 22.

An example of a rail-rolling module 510 (FIGS. 21A, 22) comprises two pairs of spring-suspension roller assemblies 514 engaged with a carriage plate 512 and has an upward-extending male member plate assembly 420. Each roller assembly 514 comprises an axle block 516 with downward-extending ends with bores therethrough for receiving axle bolts 520. A washer is placed onto each axle bolt 520, then a roller 518, another washer, and then a lock nut which rotationally secures the roller 518 to the axle block 516. One end of a spring block 522 is rotationally attached approximate one end of the axle block 516 with a suspension bolt 524. The other end of the spring block 522 has a recess for receiving therein a spring tension plate 528 and a spring 530 biased against the other end of the axle block 516. The tension of the spring can be adjusted by tightening or loosening a spring tension set-screw 526 provided therefor in the spring block 522. The pair of spring-suspension roller assemblies 514 are mounted to opposing ends of the carriage plate by screws (not shown) through bores in the spring block 522 into threaded bores provided therefor in the top of the carriage plate 512. Approximate the center of the carriage plate, a spacer plate 532 is optionally mounted by screws (not shown) whereon a male member plate assembly 420 comprising a male component 70 engaged with a mounting plate 422, is mounted to the top surface of the spacer plate 532, completing the rail-rolling module 510. It is optional to additionally attach to the rail-facing surface of the carriage plate 512, a friction-pad plate 540 with a rail-facing friction pad 542 to modulate the speed of motion of the rail-rolling module 510 along a rail track system, if so desired. The friction-pad plate 540 is attached to the carriage plate 512 with a pair of partially-threaded tension adjustment knobs 544 threadably engaged at their upper section with bores provided therefor in the carriage plate 512. Around each knob's 544 unthreaded lower section (which is passed partially through an unthreaded bore in the friction pad plate 540), there is provided, from top to bottom, an upper retaining ring 548 held within an upper neck (adjacent below the threaded section) in the knob shaft, and interposed that ring and the plate 540 a spring 546 which, when the knob 544 is extended downward by turning, the upper retaining ring 548 applies pressure on the spring against the plate 540, thereby increasing the tension of the friction pad 542 against a rail (not shown). The remaining section of the knob shaft passes through the plate 540 whereby a second lower retaining ring 548, held within a lower neck of the shaft, prevents separation of the plate 540 from the knobs 544.

A rail-rolling module may alternatively comprise, in place of the two spring-suspension roller assemblies 514, two fixed roller assemblies 535 (described in further detail below), when spring-loaded suspension of the module upon a rail is not desired.

An example of a rail-surround rolling module assembly 537 (FIG. 21B, 22) comprises a second carriage plate 512 (having engaged at each end a fixed roller assembly 535), mounted to a rail-rolling module 510 by at least one side plate 538, and optionally, using two side plates 538. The fixed roller assemblies 535 each comprise an axle block 536 to which is secured a pair of rollers 518 as described for the spring-suspension roller assemblies 514. The two axle blocks 536 are mounted with screws (not shown) onto the second carriage plate 512, which is then mounted with screws (not shown) to one end of the side plate(s) 538. A rail-rolling module 510 is engaged with the opposite end of the side plate(s) 538 thereby forming a rail-surround rolling module assembly 537. The rail-surround rolling module assembly 537 is particularly useful for safely and securely conveying camera equipment, or other device, tool, equipment or supported load, along rail track systems that are not horizontally flat, including vertical or inclined rails, and one or more curved rails. It is optional to modify a rail-surround rolling module assembly 537 by mounting a male member plate assembly 420 to a second spacer plate 532 and/or to the one or two side plates 538, for up to four outwardly extending male member assemblies provided for interconnection of the modular assembly within a structural support system. It is optional to exclude the from one to four spacer plates 532 and engage the male member plate assemblies 420 directly to the carriage plates 512 and side plates 538, if so desired, resulting in varying widths between opposed male member plate assemblies 420, allowing optionally for modular unit scale widths or other total widths.

Additional rail-surround rolling modules may alternatively comprise assemblies with four spring-suspension roller assemblies 514 or four fixed roller assemblies 535. Also, additional rail-surround rolling modules may alternatively comprise assemblies with one, two, or no friction pad plates 540 and friction pads 542. Additionally, a rail-surround rolling module may be assembled in a configuration of the inverse of assembly 537 wherein the carriage plates 512 and roller assemblies 514 or 535 are faced outward, connected centrally by one of a double-receptacle module demountably engaged with the now inward-facing male member plate assemblies 420, and engaged upon two opposed rails.

Wheel Modules

Other embodiments of the present disclosure relate to wheel modules which may provide a transporting or mobility feature within a utility system assembly. The various wheel modules and wheel module assemblies include steerable assemblies or open 360° pivotable caster assemblies or caster-style assemblies.

Figure 23A:
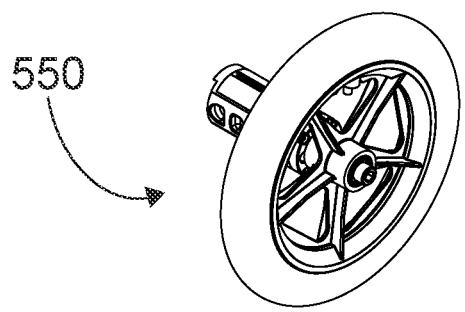
Figure 23B:
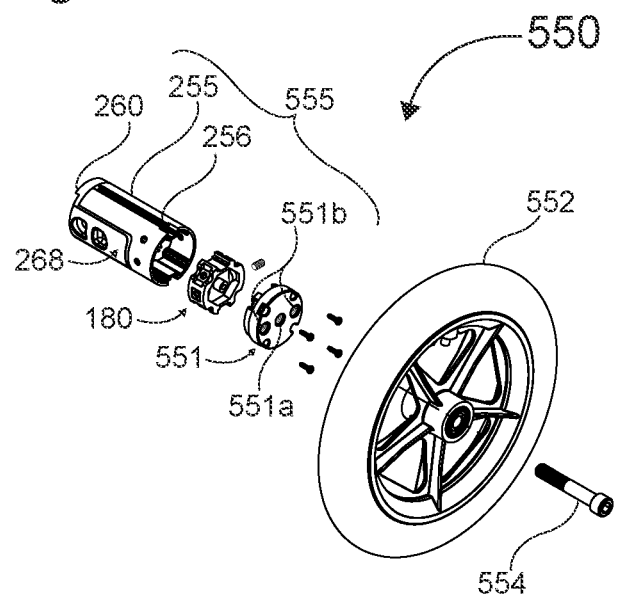

One example of a wheel module assembly 550 is shown in FIGS. 23A, 23B and comprises a wheel-axle/receptacle side-opening joiner module 555 to which a wheel 552 is rotationally engaged with an axle bolt 554. The side-opening joiner module 555 comprises an extension-tube housing 255 with opposed longitudinal square-nut channels 256 and a middle square-nut holder 180 housed therein, a side-opening receptacle component 260 with a side-opening receptacle cover 268, and a wheel-axle tube-end component 551 engaged with mounting screws. The wheel-axle tube-end component 551 has a central threaded bore 551a and two offset threaded bores 551b. The axle bolt 554 may be threadably engaged with the central threaded bore 551a or alternatively, one of the two offset threaded bores 551b, wherein the offset bores 551b allow for a wheel module assembly to act as a caster.

Figure 23C:
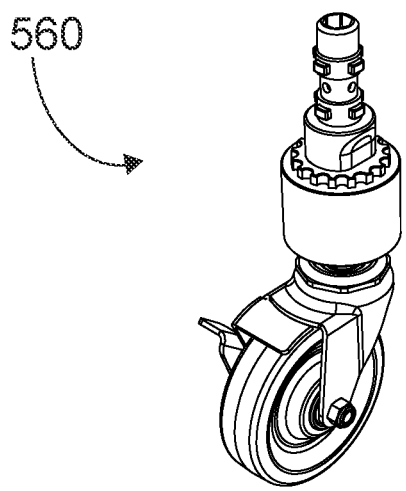
Figure 23D:
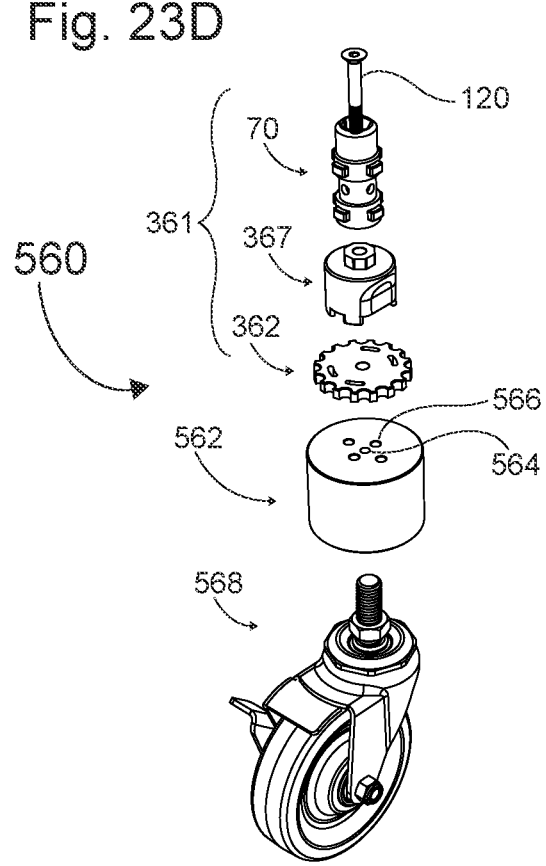

Another example of a wheel module according to the present disclosure is a caster wheel module assembly 560 illustrated in FIGS. 23C, 23D wherein a pivoting or fixed caster wheel 568 is threadably engaged with a bore provided therefor in a mount component 562. A male member flat-mount assembly 361 is engaged with the mount component 562 by its pivot-lock sprocket's 362 pegs within the peg holes 566 and the threaded engagement of a bolt 120 with threaded bore 564.

Foot Modules

Figure 24A:
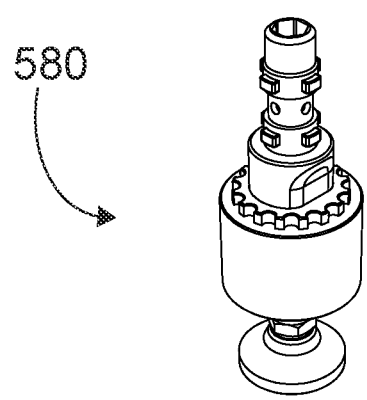
Figure 24B:
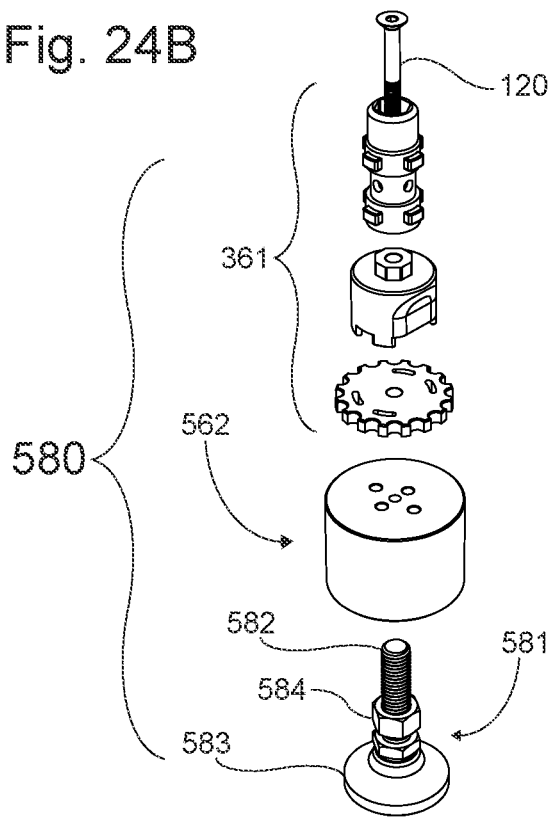

An example of a leveling foot module 580 is illustrated in FIGS. 24A and 24B (perspective and exploded perspective views, respectively) and comprises a male member flat-mount assembly 361 engaged with a mount component 562 in the same manner as described for caster assembly 560 in reference to FIG. 23D. An adjustable foot component 581 has a foot end 583 from which extends a threaded leveling rod 582 with which a nut 584 is threadably engaged. The adjustable foot component 581 is threadably engaged with a bore provided therefor in the mount component 562 until the nut 584 abuts the base of the component and may be tightened. The distance that the foot end 583 stably extends from the mount component 562 is adjustable by threading nut 584 along the threaded leveling rod 582 toward or away from the foot end 583 prior to threadably engaging the threaded leveling rod 582 with the bore in the mount component 562.

Figure 24C:
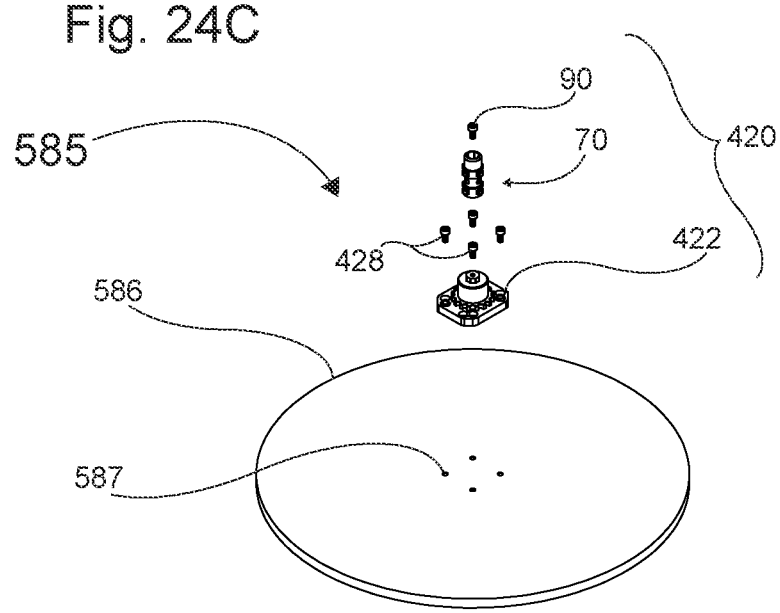
FIG. 24C is an exploded perspective view of an example of a foot plate module.

An example of a foot plate module 585 is shown in FIG. 24C and comprises a foot plate 586 having threaded bores 587 about the centre of the foot plate 586 to which, a male member plate assembly 420 is mounted by threadable engagement of screws 428 inserted through bores in the mounting plate 422 into bores 587.

Pivotable Support Modules

Figure 25A:
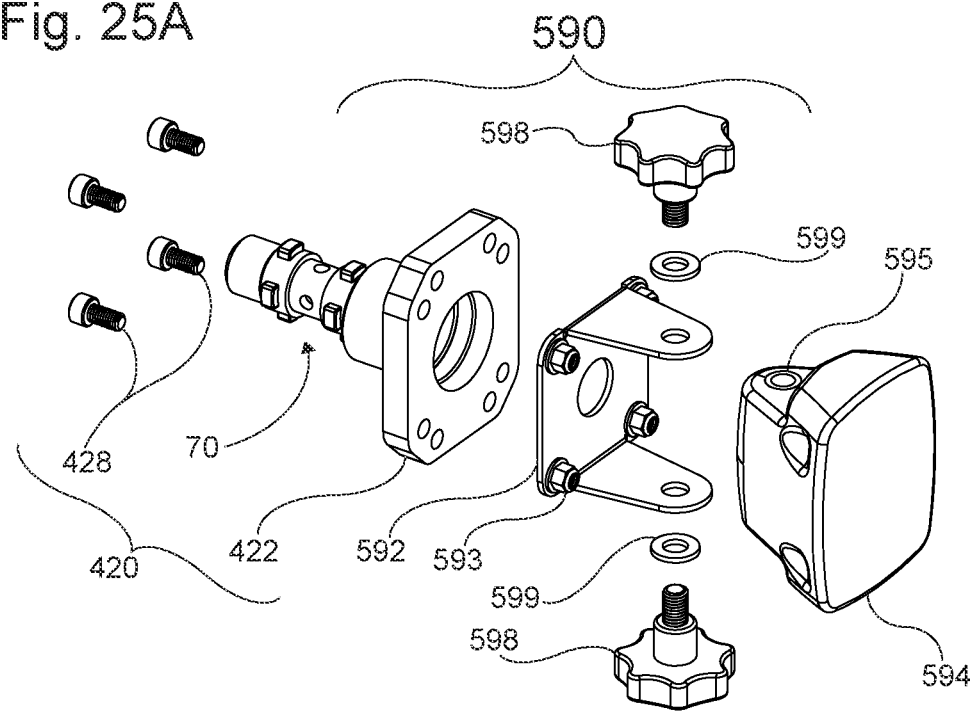
Figure 25B:
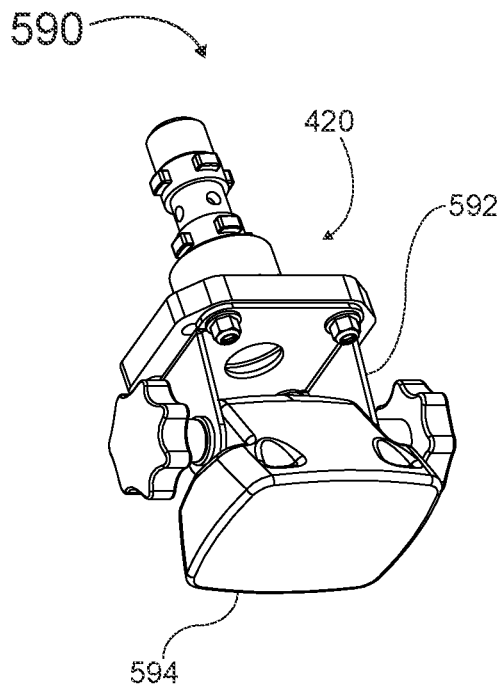
Figure 25C:
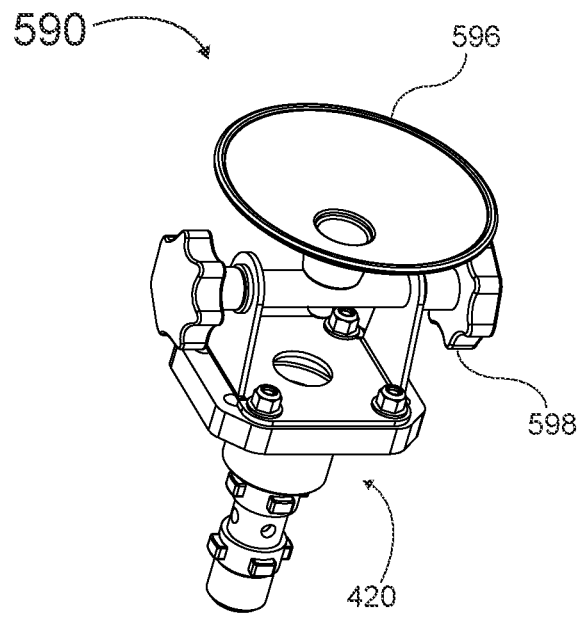
FIG. 25C is a whole view of the pivotable support module demountably engaged with an example of a suction-cup component.

An example of a pivotable support module 590 is shown in FIGS. 25A to 25C and comprises a male member plate assembly 420 secured to a pivot bracket 592 with mounting plate screws 428 inserted through bores provided therefor in the mounting plate 422 and the pivot bracket 592 and then threadably engaged with lock nuts 593. A pivotable pad component 594 with opposing threaded bores 595 is inserted into the pivot bracket 592, and secured in a desired position by threadable engagement of knobs 598 with the threaded bores 595 (FIGS. 25A, 25B). Washers 599 may be slipped over the threaded portions of knobs 598 before they are threadably engaged with threaded bores 595 to facilitate ease of loosening and tightening the knobs into and out of the pad component 594 when rotatable adjustment of the position of the pad component 594 is desired. The pivotable support module 590 is shown rotatably engaged with a suction-cup component 596 in FIG. 25C for demountable engagement with glass or another smooth surface.

Weight Modules

Figure 26A:
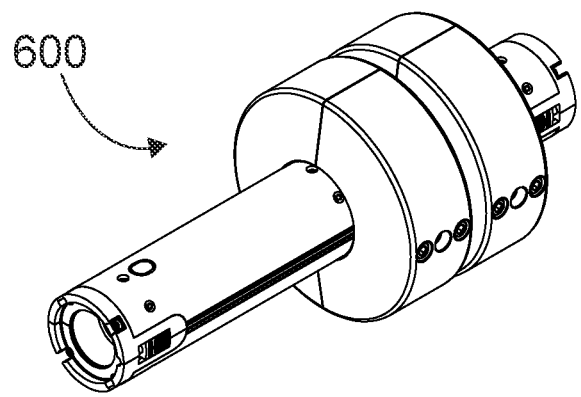
Figure 26B:
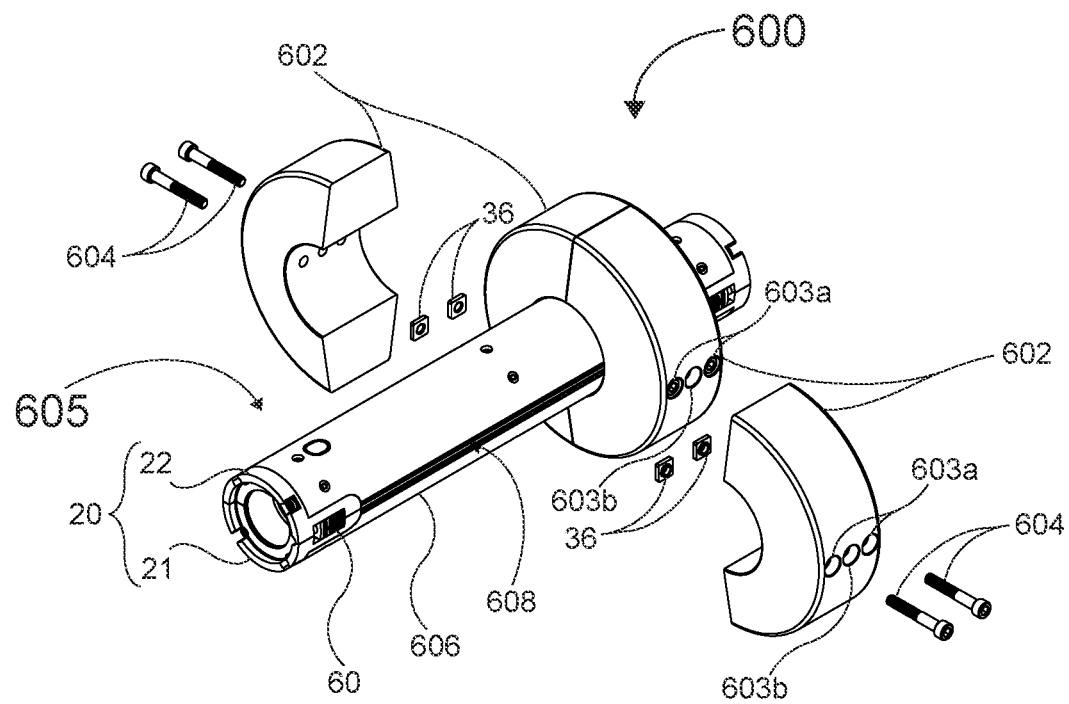

An example of a weight module assembly 600 is shown in FIGS. 26A, 26B and comprises weight components 602 demountably engaged with another example of a double-receptacle extension-tube rotator module 605 with an extension-tube housing 606 having a pair of opposing longitudinal square-nut channels 608 for slidable engagement therein of a plurality of square nuts 36, as described for double-receptacle extension-tube rotator modules 151 and 152 in reference to FIGS. 4 and 5. The inner surface of a first weight component 602 is abutted to the extension-tube housing 606 and a bolt 604 is inserted into an outer bore 603a provided therefor in the weight component 602 and then threadably engaged with a square nut 36 housed within the square-nut channel 608. A second bolt 604 is inserted into the other outer bore 603a provided therefor in the first weight component 602 and then threadably engaged with a second square nut 36 housed within the square-nut channel 608. A second weight component 602 is abutted to the extension-tube housing 606 opposite the first weight component 602 and threadably engaged with square nuts 36 housed in the opposite square-nut channel 608 with two bolts 604 inserted through bores 603a in the second weight component 602. Alternatively, one or a pair of weight components 602 may be mounted through center bore 603b with a bolt 604 passed through a side-mount bore of an extension-tube housing to be threadably engaged with a square nut held by that module's receptacle assembly or middle square-nut holder. It is optional to similarly threadably engage one or more additional weight components 602 to the extension-tube housing 606 if a heavier counter-balance or base weight is desired for the weight module assembly 600.

Telescoping Extension Modules

Figure 27A:
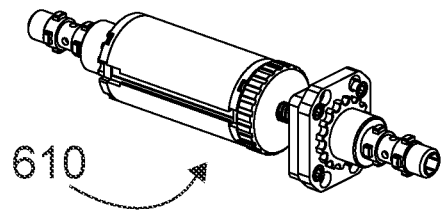
Figure 27B:
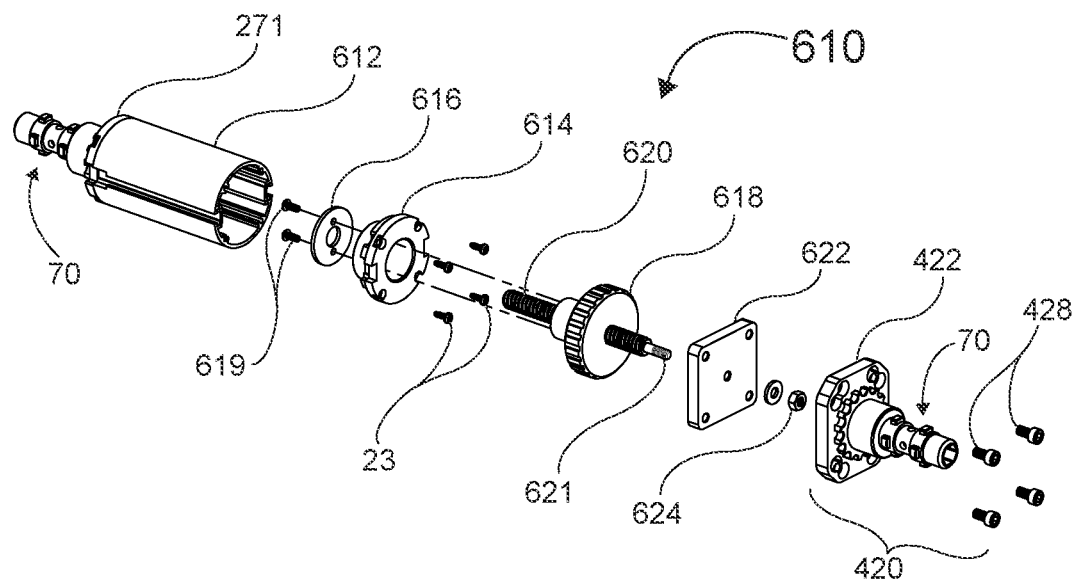
Figure 27C:
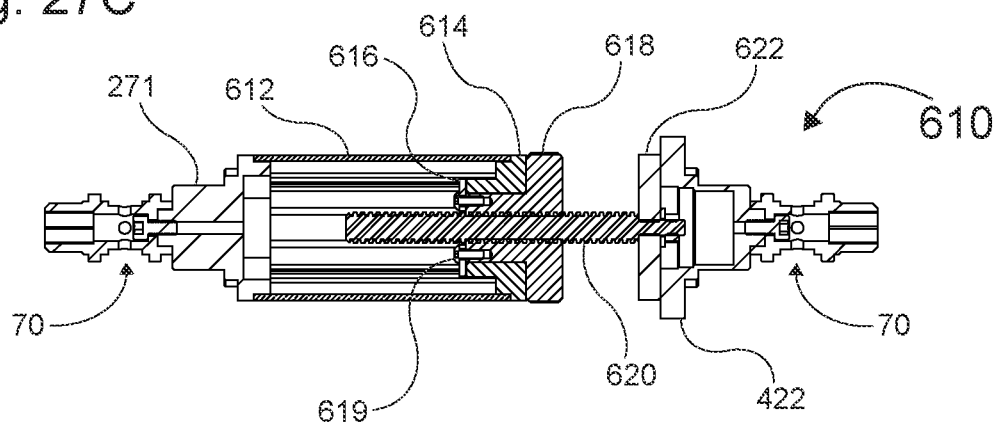

An exemplary telescoping extension module 610 is illustrated in FIGS. 27A, 27B, and 27C (perspective, exploded perspective, and longitudinal cross-sectional view, respectively) and generally comprises an extension-tube housing 612 having a male member tube-end plate 271 to which is mounted a male component 70. The other end of the extension-tube housing 612 is fitted with a telescoping assembly comprising a rod-retaining component 614 which is mounted to the end of the extension-tube housing 612 with four screws 23. A rod-retaining plate 616, with a center bore for receiving therethrough a threaded rod 620, is mounted against the inner-facing surface of the rod-retaining component 614 and to, with screws 619, the inner-facing surface of an adjustment collar component 618, the inner section of which passes through the center of the rod-retaining component 614. The collar component 618 and plate 616 securely but rotationally sandwich the rod-retaining component 614 which secures the assembly within the extension-tube housing with the screws 23. The adjustment collar component 618 has a threaded bore therethrough which threadably engages the threaded rod 620. The distal end of the threaded rod 620 has a narrower diameter threaded portion 621 that is inserted through a bore provided therefor in a spacer plate 622 and secured thereto by threadable engagement with a washer and lock nut 624. A male member plate assembly 420 (See FIG. 16B and related description for reference) is mounted to the spacer plate 622 by screws 428 inserted through bores provided therefor in the mounting plate 422 and threadably engaged with threaded bores provided therefor in the spacer plate 622.

An operator may extend the male member plate assembly 420 away from the extension-tube housing 612 by rotating clockwise the adjustment collar component 618, which advances outwardly the threaded rod 620 and mounted male member plate assembly 420 until a desired outward extension of the male member plate assembly 420 is achieved. An operator may reversely retract the male member plate assembly 420 by rotating the adjustment collar component 618 in a counter-clockwise direction. When an approximate desired length of the rod extension is achieved, the male member plate assembly 420 and threaded rod 620 may be rotated a small amount in either direction to properly orient the mounted male component 70 and corresponding receptacle module (not shown) where required.

End-Cap Modules:

The following examples of end-cap modules, shown in FIGS. 28 to 33, provide a variety of structural end component functionalities for uses including as hand grips or feet or bumpers or landing pads or general protective closures of a system assembly's exposed male assemblies or receptacle assemblies.

Figure 28A:
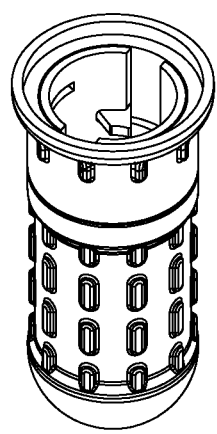
Figure 28B:
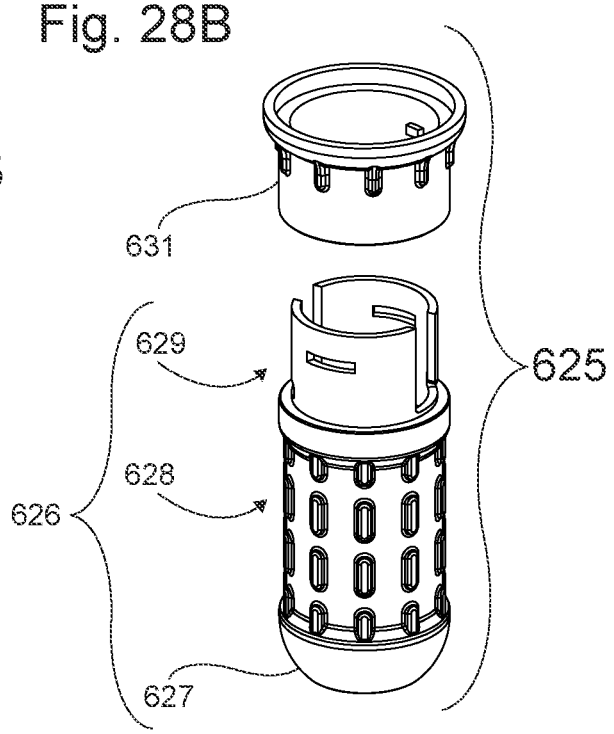
Figure 28C:
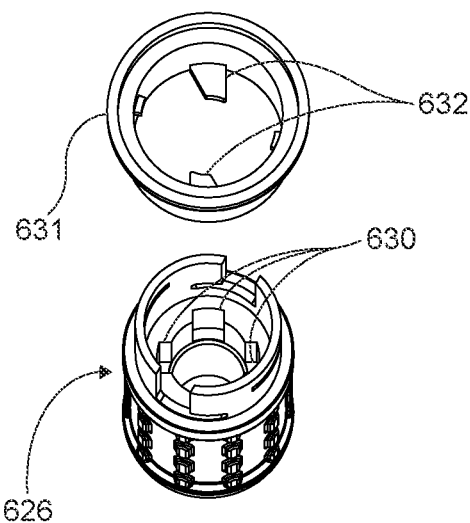
Figure 28D:
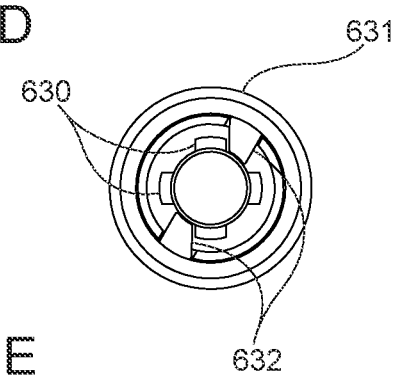
Figure 28E:
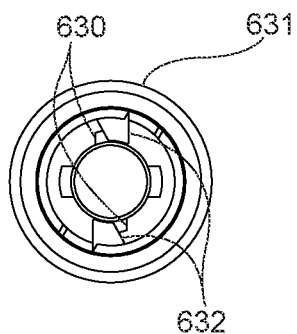

An example of a grip end-cap module 625 that may be optionally used as a hand grip or a foot or a bumper is illustrated in FIGS. 28A to 28E, and comprises a handle grip component 626 and an outer sleeve 631 that rotationally cooperates with the handle grip component 626. The handle grip component 626 comprises at one end a semi-circular end-cap portion 627, a middle elongate hand grip portion 628, and at the other end an inner sleeve 629. In this example, four prong-retaining slots 630 are provided in the form of recesses within a cavity within the hand grip portion 628 that may receive and secure a corresponding number of linear sets of prongs of a co-operating module's male component 70 (not shown). When in an open position as shown in FIG. 28D, a co-operating module's male member assembly including male component 70 can be inserted into the grip end-cap module 625 after which, the outer sleeve 631 can be rotated into the closed position as shown in FIG. 28E, whereby its retainer tabs 632 overlap the prong-retaining slots 630 thereby securing the male component 70 by securing its prongs 82 (shown for example in FIGS. 1, 2) within the prong-retaining slots 630.

Figure 29A:
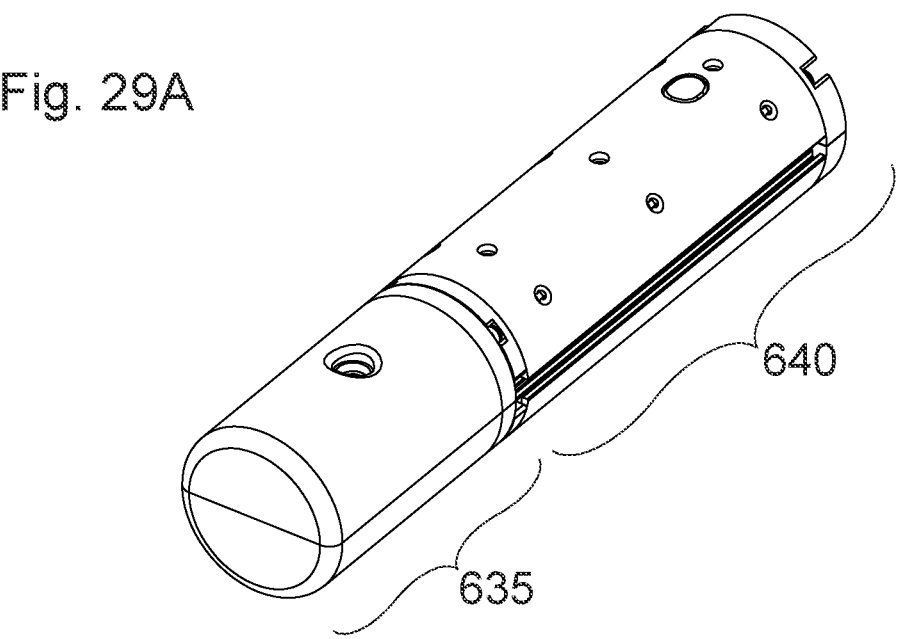
Figure 29B:
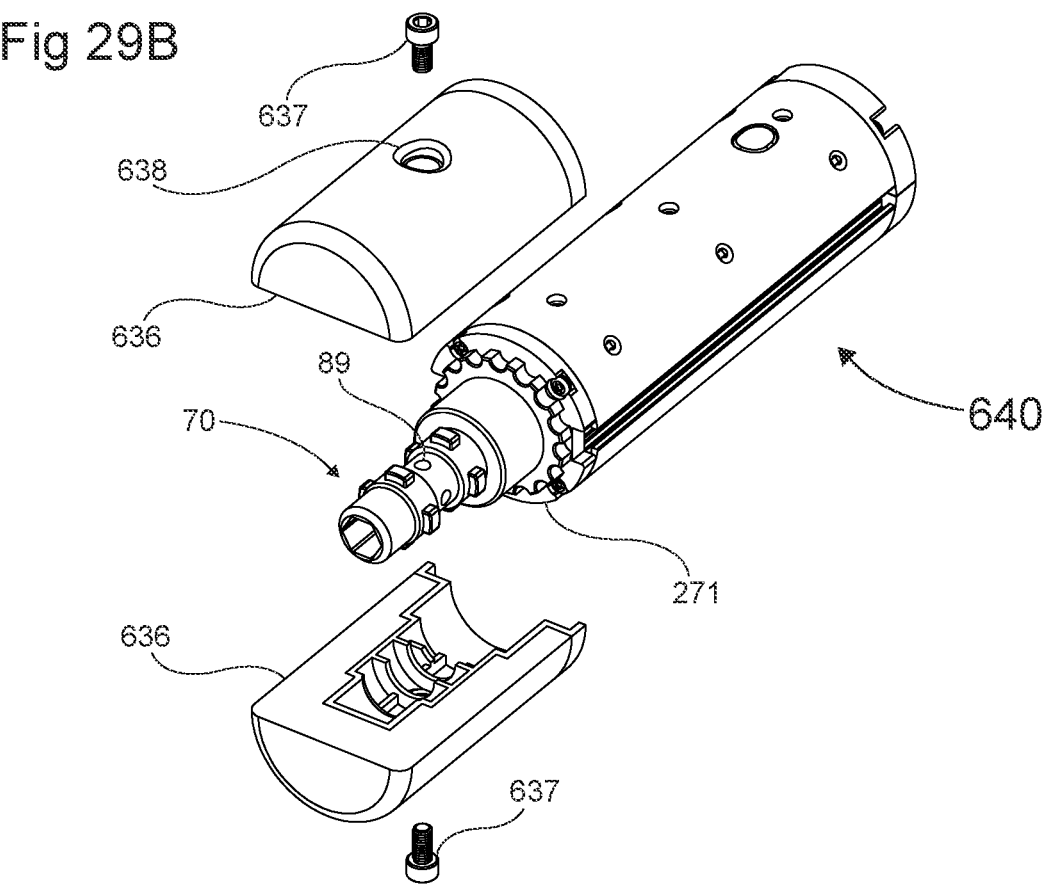

Another example of an end-cap module is a shell end-cap module 635 illustrated in FIGS. 29A, 29B that is mounted on a male/receptacle extension-tube rotator module 640. The shell end-cap module 635 comprises a pair of matching half-shell caps 636 that are demountably engaged with the male component 70 of the male/receptacle extension-tube rotator module 640 with screws 637 inserted through bores 638 provided therefor in the half-shell caps and threadably engaged with threaded bores 89 in the neck of male component 70.

Figure 30A:
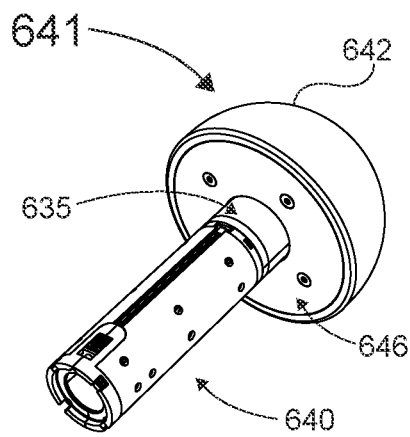
Figure 30B:
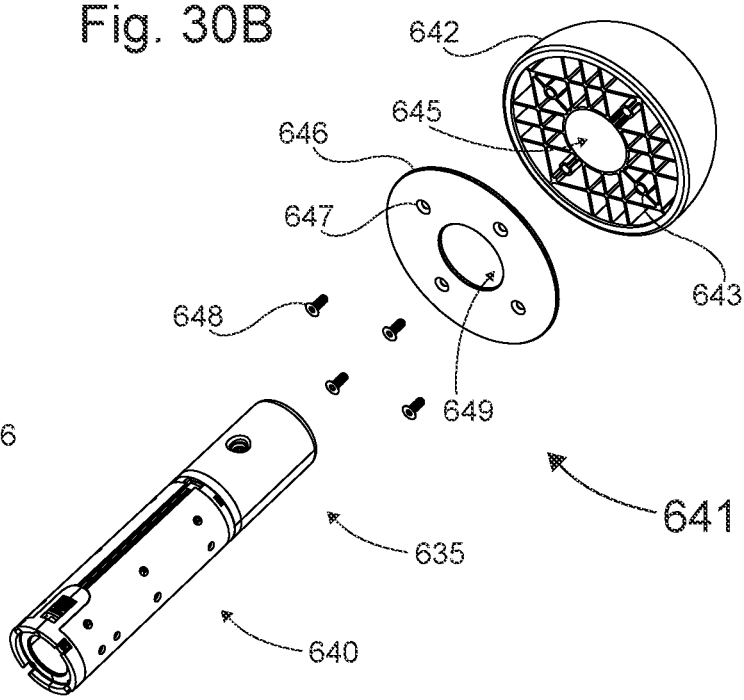

An example of a female dome pad end-cap module 641 is illustrated in FIGS. 30A and 30B, and comprises a female dome pad 642 having a collapsible framework 643 with a central orifice 645. A female dome mounting plate 646 is mounted to the framework 643 with screws 648 inserted through bores 647 provided therefor in the mounting plate 646 and threadably engaged with threaded channels or threaded inserts provided therefor in the framework 643. The female dome mounting plate 646 has an orifice 649 that is aligned with the orifice 645 in the framework 643. The orifices 649, 645 are sized to slidingly but frictionally engage the shell end-cap module 635 that is engaged with male/receptacle extension-tube rotator module 640 (shown in FIG. 29) or another module.

Figure 30C:
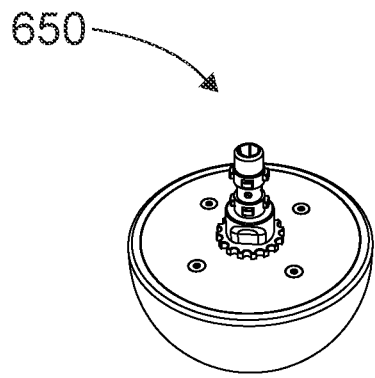
FIGS. 30C and 30D are a whole perspective view and an exploded perspective view of an example of a male dome pad end-cap module fitted with a male member flat-mount assembly.
Figure 30D:
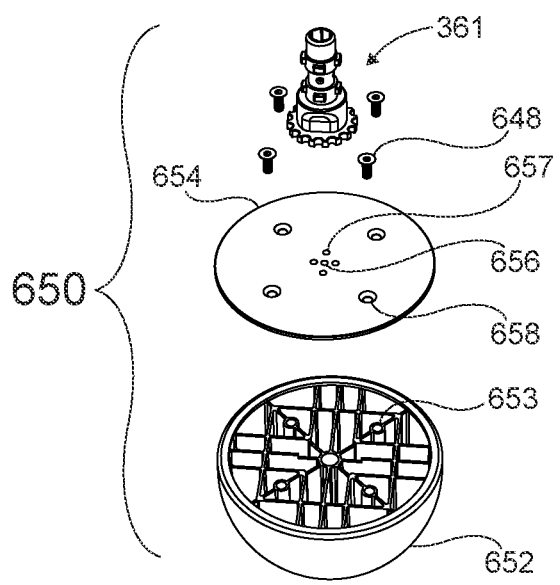

An example of a male dome pad end-cap module 650 is shown in FIGS. 30C, 30D and comprises a male dome pad 652 having a collapsible framework 653. A male member flat-mount assembly 361 is mounted with a bolt to a male dome mounting plate 654 at a threaded bore 656 and peg holes 657. The male dome mounting plate 654 is mounted to the framework 653 with screws 648 inserted through bores 658 in the mounting plate 654, and then threadably engaged with threaded channels or threaded inserts provided therefor in the collapsible framework 653.

Figure 31A:
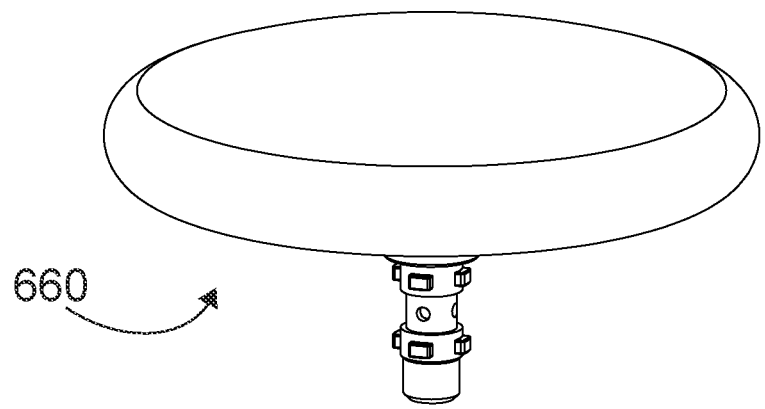
FIGS. 31A and 31B are a whole perspective view and an exploded perspective view of an example of a seat module fitted with a male member plate assembly.
Figure 31B:
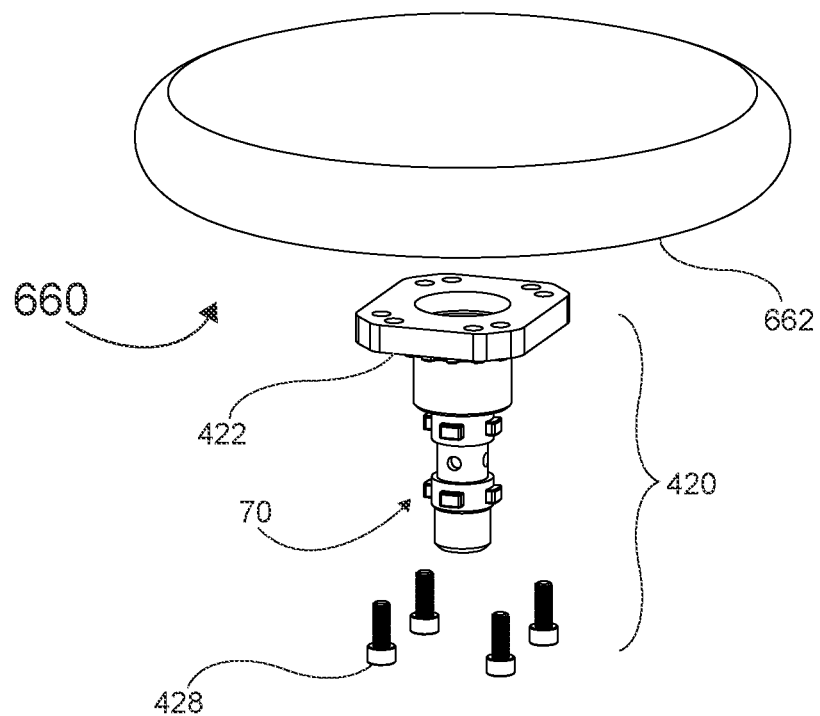

Some embodiments of the modules disclosed herein include seat end-cap modules that can be incorporated into a utility system apparatus configured for a ride-along dolly setup, or alternatively, in stool or bench assemblies. An example of a seat module 660 is shown in FIGS. 31A and 31B, and comprises a seat pad 662 to which a male member plate assembly 420 is mounted by screws 428 inserted through bores provided therefor in the mounting plate 422, and then threadably engaged with threaded bores (not visible in FIG. 31) provided therefor in the seat pad 662.

Figure 32A:
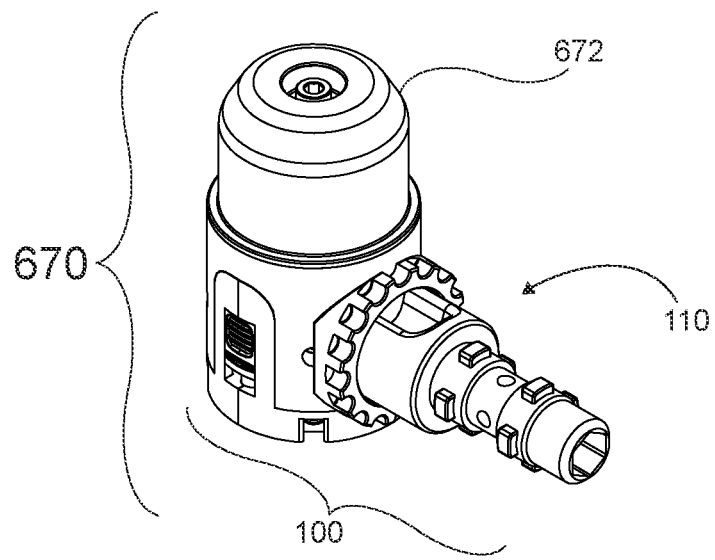
FIGS. 32A and 32B are a whole perspective view and an exploded perspective view of an example of a bumper end-cap module.
Figure 32B:
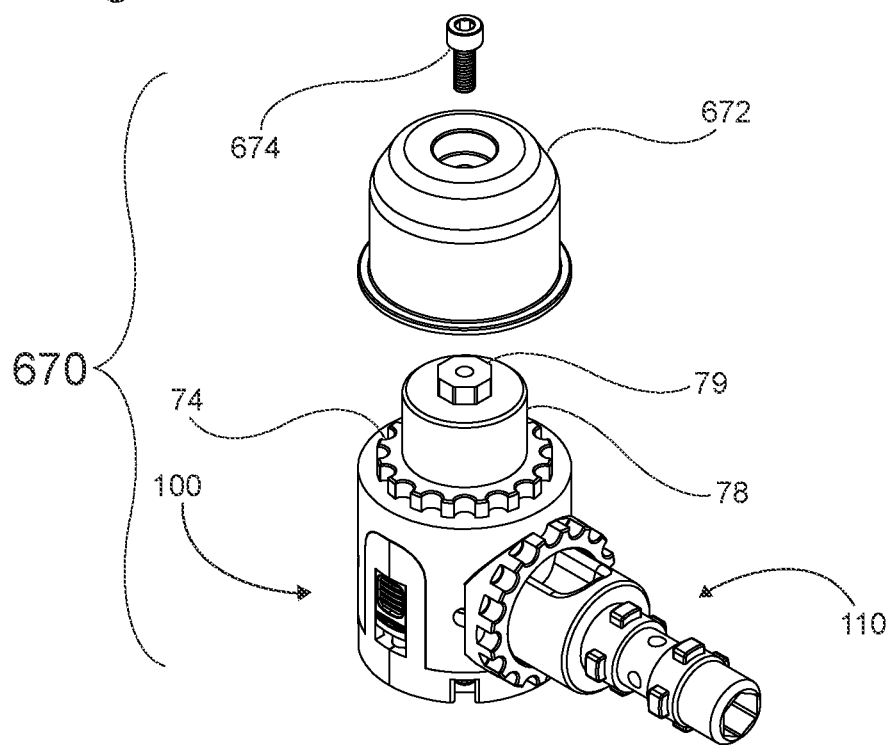

An example of a bumper end-cap module 670 is shown in FIGS. 32A, 32B mounted on a closed-tube rotator hub assembly 100 with a laterally extending male member side-mount assembly 110 (first seen in FIG. 3A). A bumper component 672 is slipped over the wide pivot segment 78 of the rotator hub assembly 100 and secured in place by a screw 674 inserted through an orifice provided therefor in the bumper component 672 and then threadably engaged with the threaded bore of the octagonal boss 79 extending upward from the wide pivot segment 78.

Figure 33A:
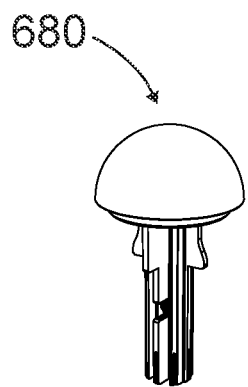
FIGS. 33A and 33B are a whole perspective view and an exploded perspective view of a soft end-cap component.
Figure 33B:
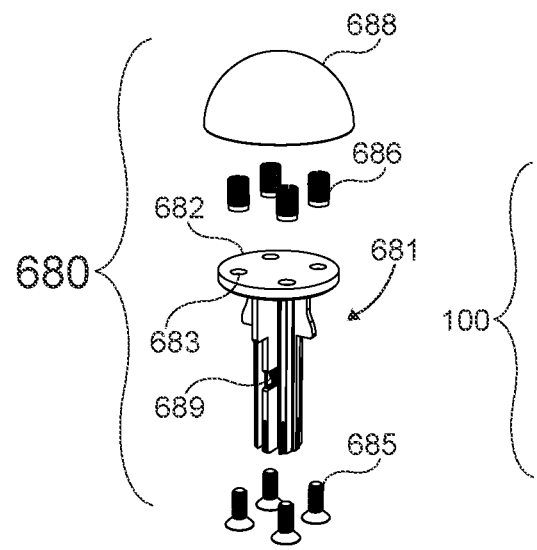
Figure 33C:
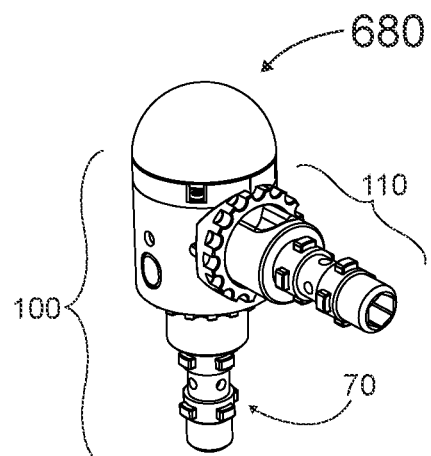
FIG. 33C is a perspective view of the soft end-cap component mounted into a closed-tube rotator hub assembly.

A variety of additional end-cap components according to some embodiments of the present disclosure are illustrated in FIGS. 33A to 33F. One example of a soft end-cap component 680 is shown in FIGS. 33A to 33C and comprises a soft semi-spherical dome component 688 into which are engaged four inserts 686 with threaded bores. An elongate leg component 681 with an integral mount plate 682 having four bores 683 therethrough is mounted to the dome component 688 with four screws 685 inserted through the four bores 683 and then treadably engaged with the four inserts 686 within the dome component 688. The soft end-cap component 680 may be engaged, for example, with the receptacle component of a closed-tube rotator hub assembly 100, as shown in FIG. 33C. When in use in a side-opening receptacle, the component 680 may be securely engaged by a screw threadably engaged with threaded bore 689.

Figure 33D:
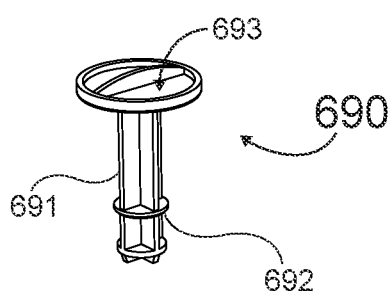
FIG. 33D is a perspective view of a hard end-cap component and FIG. 33E is a perspective view of the hard end-cap component mounted into a closed-tube rotator hub assembly.
Figure 33E:
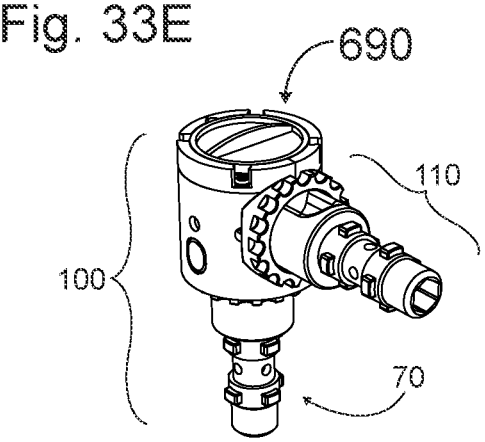

An example of a hard end-cap component 690 useful for covering and protecting any unused receptacle in a rotator module or joiner module incorporated into any utility system assembly according to the present disclosure, is shown in FIGS. 33D, 33E. This example of a hard end-cap component 690 has a flat outward-facing surface 693 with a pull-tab extending across the surface 693 and an elongate downward-extending leg component 691 with a radial retaining-lock chamfer 692 which, when the hard end-cap component 690 is inserted into a receptacle of a rotator receptacle assembly 20 or joiner receptacle assembly 220, presses back a co-operating retaining half-lock with spring receptacles 52 until passed through the half-lock whereby the hard end-cap component 690 is secured within the receptacle until the retaining lock 50 is released. FIG. 33E shows the hard end-cap component 690 engaged with the rotator receptacle assembly of a closed-tube rotator hub assembly 100.

Figure 33F:
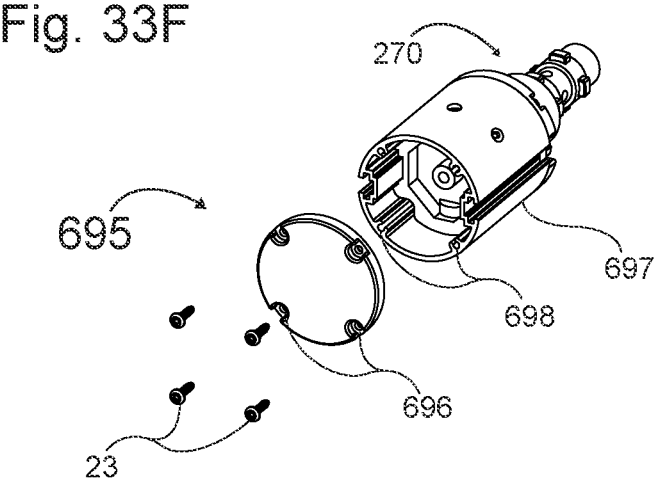
FIG. 33F is an exploded perspective view of a flat end-cap component shown with an extension-tube housing.

A simple flat end-cap component 695 shown in FIG. 33F can be secured to an open end of any type of extension-tube housing disclosed herein. The flat end-cap component 695 has four bores 696 around its periphery through which screws 23 may be inserted and threadably engaged with threaded screw slots 698 provided at one end of an exemplary extension-tube housing 697 engaged with a male member extension-tube end assembly 270 at its other end.

Unit Scale

The exemplary modules disclosed herein may be configured with various materials over a range of sizes to facilitate assembly of the utility systems and support structures for use in a variety of applications. For ease-of-use and system-wide modular interconnectivity and cross-compatibility, a modular unit scale can be used across all modules of a system format. In the construction of various embodiments, the unit scale can have varying sizes depending on the intended use of the modular system. The sizing and proportions as stated and illustrated is for descriptive purposes only, informing the relative function and compatibility of the interconnecting modules between one another, and not to be intended to limit any modules of the present disclosure to these values or proportions.

According to some embodiments of the present disclosure, a suitable system format has tube modules with a unit scale standard of a 2-unit diameter, where a unit may equal, for example, 30 millimeters. Although receptacles 11, 211 and a complimentary male member assembly 71, 110, 270, 361, 395, 420 may be longer than 2 units, closed-tube modules 10/201 comprise the closed-tube housings 15/215 which provide for a 2-unit modular unit scale length facilitating hub assemblies having a 2 unit by 2 unit cubed modular unit scale, wherein the receptacle assemblies 20, 220 overlap within the hollow center of the wide pivot segments of the closed-tube housings 15/215. According to some embodiments, exemplary rail-rolling modules 510 and rail-surround rolling module assemblies 537 can provide up to a 2-way or a 4-way unit scale configuration, respectively, wherein male member plate assemblies 420 attached to co-operatively sized spacer plates 532 combine to give, for example, a 6-unit modular width between the male member plate assemblies 420 across the rail-rolling modules 510, 537 allowing for their parallel configurability with other modules of the same system format.

By use of a unit scale across the modules of a system format, calculating and configuring the parts needed to reach an end-use assembly is facilitated. Also in the instance of a series of extension-tube modules, for example, providing the length upon which a rail-rolling module 510, 537 may travel, the unit scale lengths may provide to the operator a visual guide of distance travelled, whether by the points of connection, or the modules' side-mount bores that may be included along the length of their extension-tubes, and which may also provide connection points for an end-cap module, for example, to be positioned as a stopper, for example, at a desired position along an extension-tube module rail track assembly.

Kits

According to some embodiments disclosed herein, a group of one or more of the various types of modules disclosed herein may be provided together in a kit for assembly into specified types of modular utility system assemblies or support structures for various functional requirements. Irrespective of the end-use system assembly or the type or number of modules, kits of the present disclosure may additionally comprise, or be packaged with, instruments or tools for assisting with the assembly of the system, and/or hard copy or software based instructions for assembling the same.

Customizable Assemblies

The modular units of the present disclosure can be interconnected into a wide variety of utility system assemblies and support structure assemblies that can be designed for a wide variety of applications. In this way, a utility system or support structure can be customized for a particular application using a selected combination of interconnected modules of a given system format, or, using an adapter joiner module 311 or other fastener, modules of multiple system formats. The broad range of configurability allows systems to be assembled in a wide range of sizes and functional design for a broad range of end-user requirements. For example, it is contemplated that the modules of the present disclosure can be interconnected to form utility systems or support structures that include, without limitation, carts, dollies, tracks, cranes, lifts, stands, racks, tables, workstations, seating, bed-frames, shelving, storage, staging, railings, partitions, toy systems, and the like. Optionally, a system assembly may be combined with third party tools, mechanisms, and systems for varying end-use requirements.

According to embodiments, the modules disclosed herein can be selected and interconnected to assemble a plurality of customized tool/load support assemblies which can be configured for use in, for example, filmmaking and/or videography and/or still photography applications, including but not limited to, camera, microphone, and lighting positioning and mobility support systems, and in other embodiments, as carts and stands for other equipment and properties, in variety of industries or household applications.

To gain a better understanding of the embodiments disclosed herein, the following examples of utility system assemblies and support structure assemblies are described.

EXAMPLES

Figure 44:
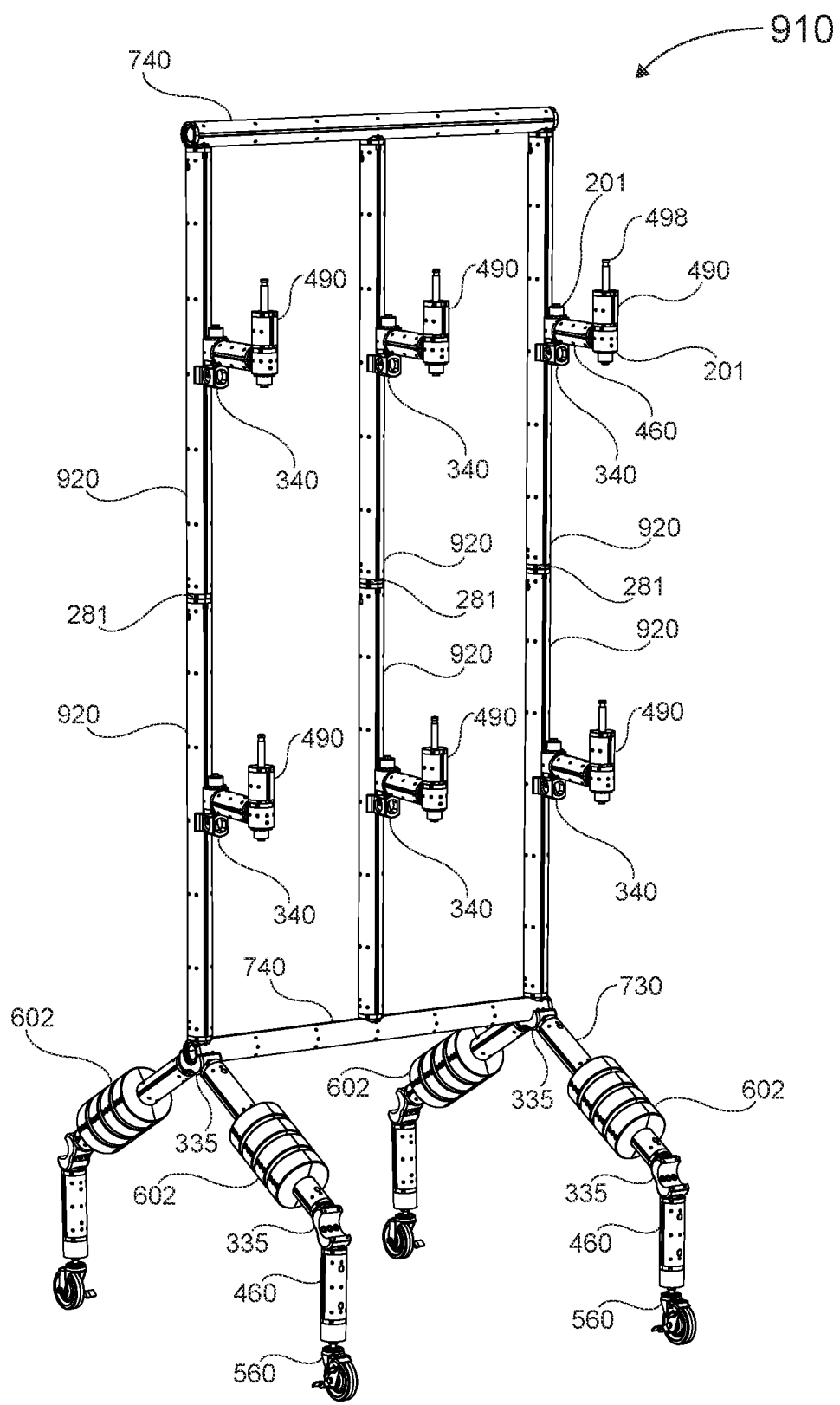
FIG. 44 is a perspective view of an example of a lighting support rack system assembled with some of the modular components disclosed herein.
Figure 45:
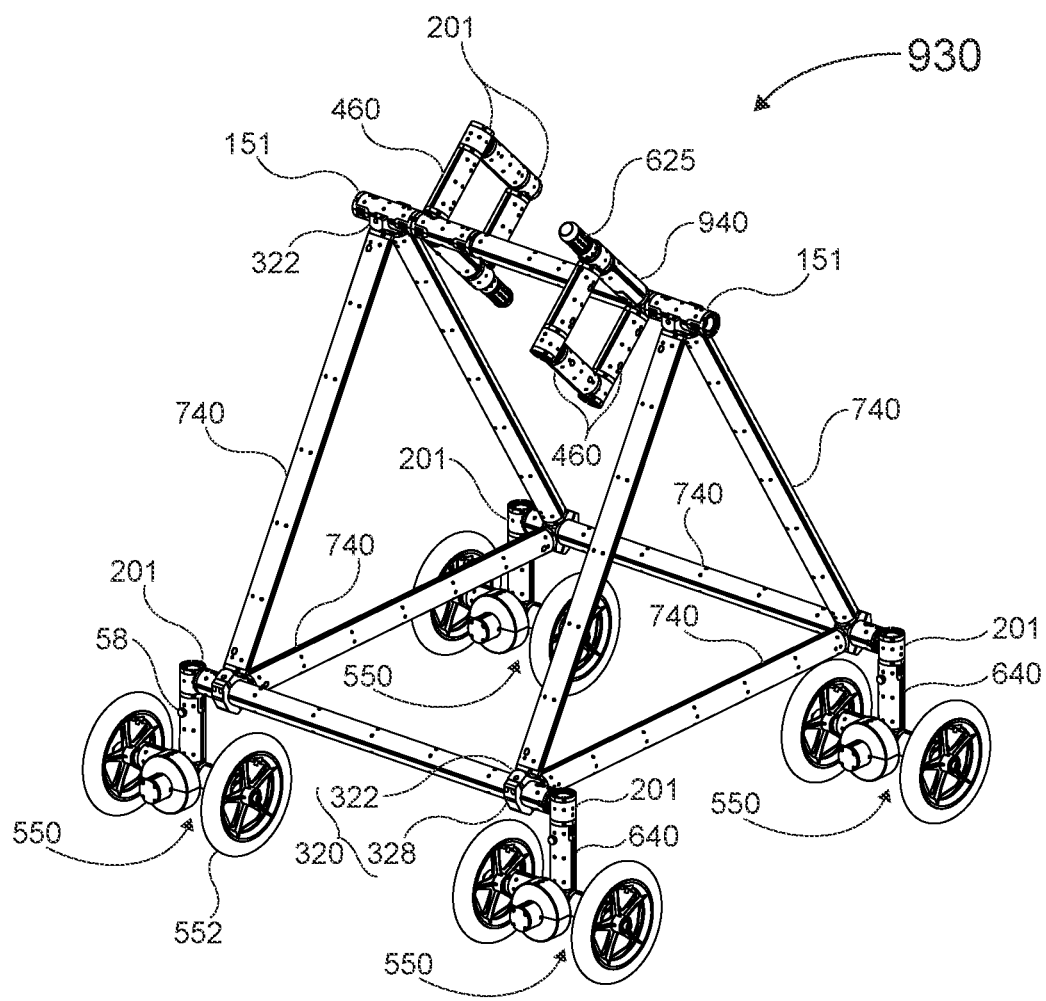
FIG. 45 is a perspective view of an example of an A-frame spooling cart system assembled with some of the modular components disclosed herein.
Figure 46:
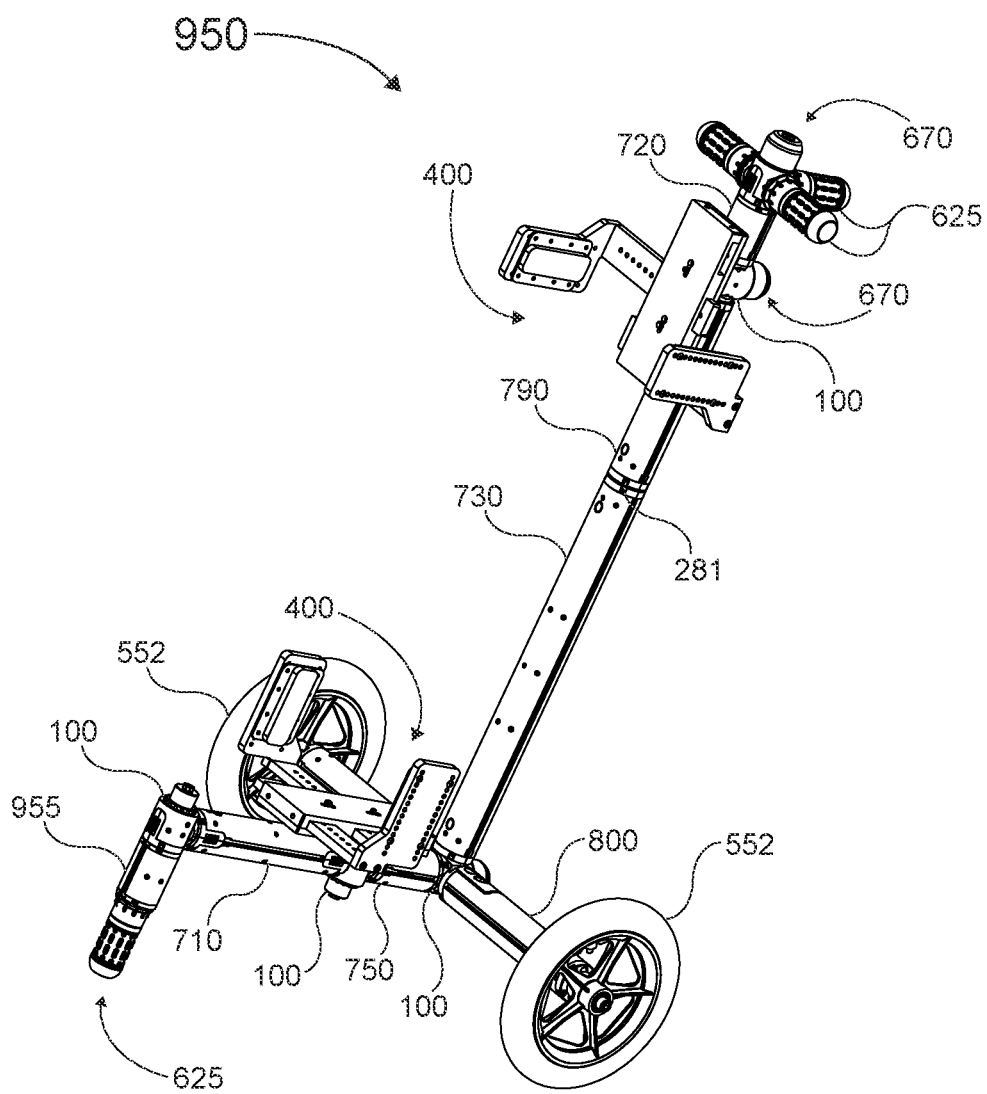
FIG. 46 is a perspective view of an example of a pull cart system assembled with some of the modular components disclosed herein.
Figure 47:
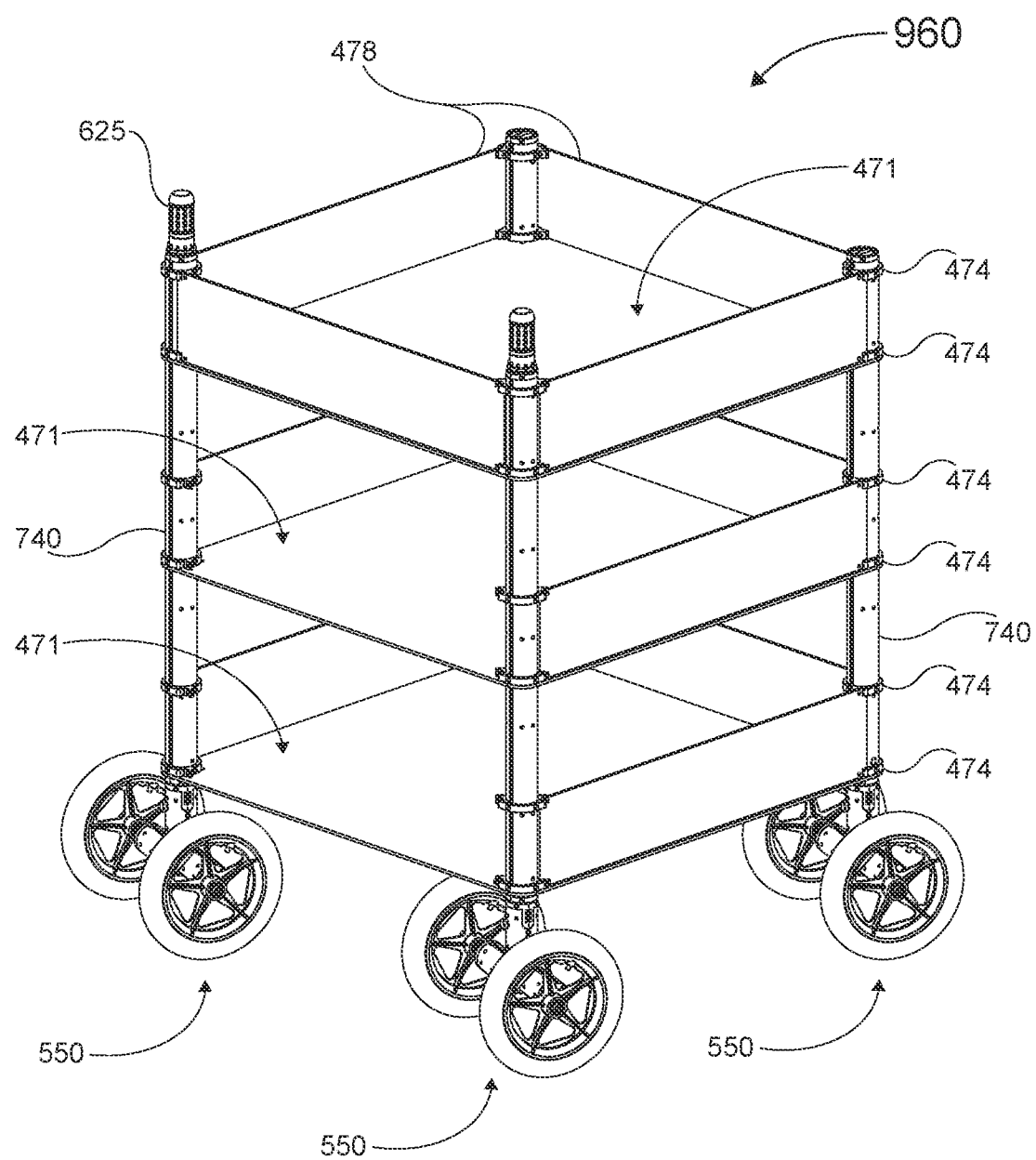
FIG. 47 is a perspective view of an example of a utility cart system assembled with some of the modular components disclosed herein.
Figure 48:
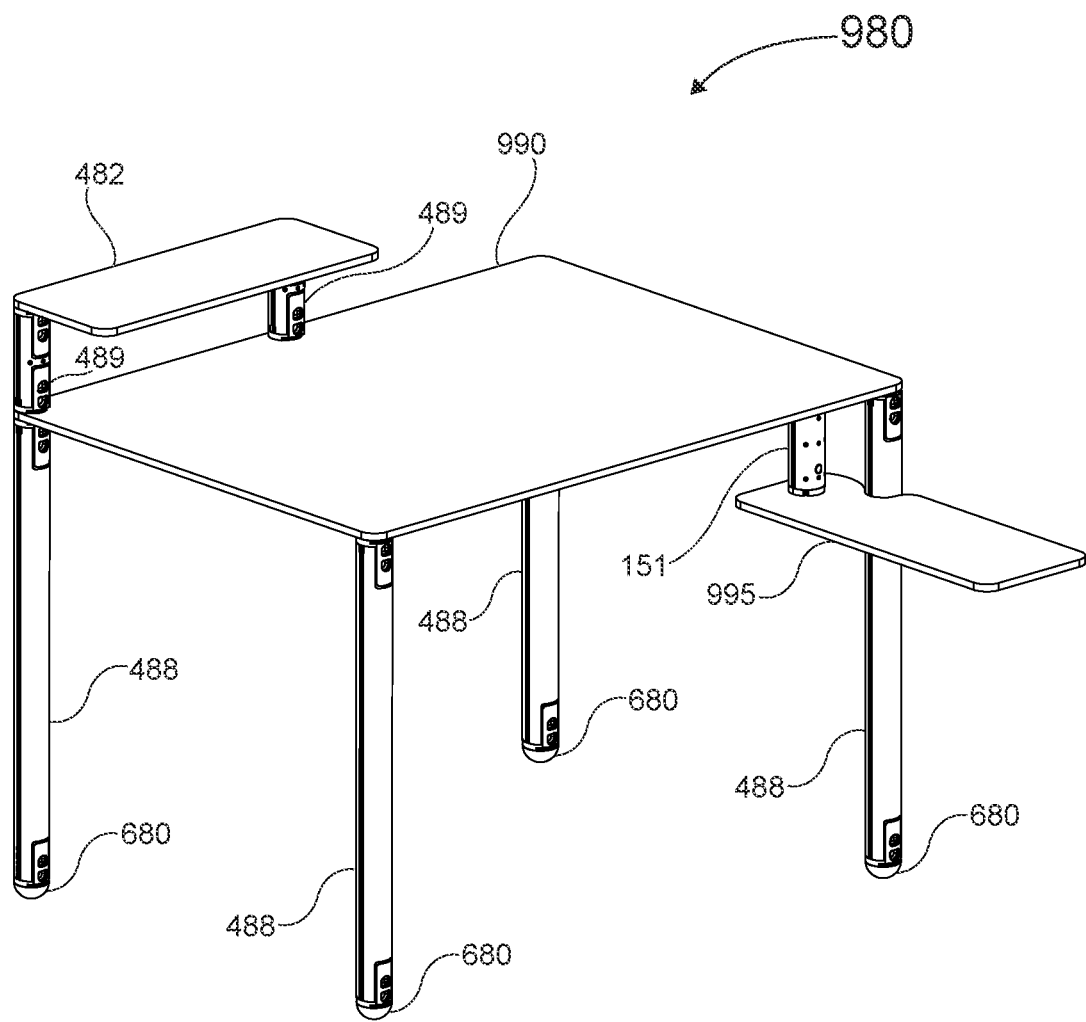
FIG. 48 is a perspective view of an example of a modular workstation assembled with some of the modular components disclosed herein.

To further illustrate the versatility of the modules in assembling a variety of utility system assemblies and support assemblies such as carts, dollies, tracks, cranes, lifts, stands, racks, tables, workstations, seating, bed-frames, shelving, storage, staging, railings, partitions, toy systems, and the like, examples of assemblies are provided to demonstrate the various multifunctional aspects of the modular components described herein. Examples 1 through 10 as illustrated in FIGS. 34 to 43, are configured for use with various types of cameras. However, the illustrated assemblies may be alternatively used for other types of devices such as microphones, lighting, telescopes, lasers, measuring and surveying tools, and the like. Example 11 shown in FIG. 44, is configured for use with industrial lighting. Examples 12 through 14 shown in FIGS. 45 to 47, are configured for use as various types of utility carts for transportation of various types of materials, supplies, equipment, and the like. The modules disclosed herein may also be configured into assemblies for use as furniture or for storage as shown in FIG. 48.

Example 1: Crab-Steering Dolly System

Figure 34:
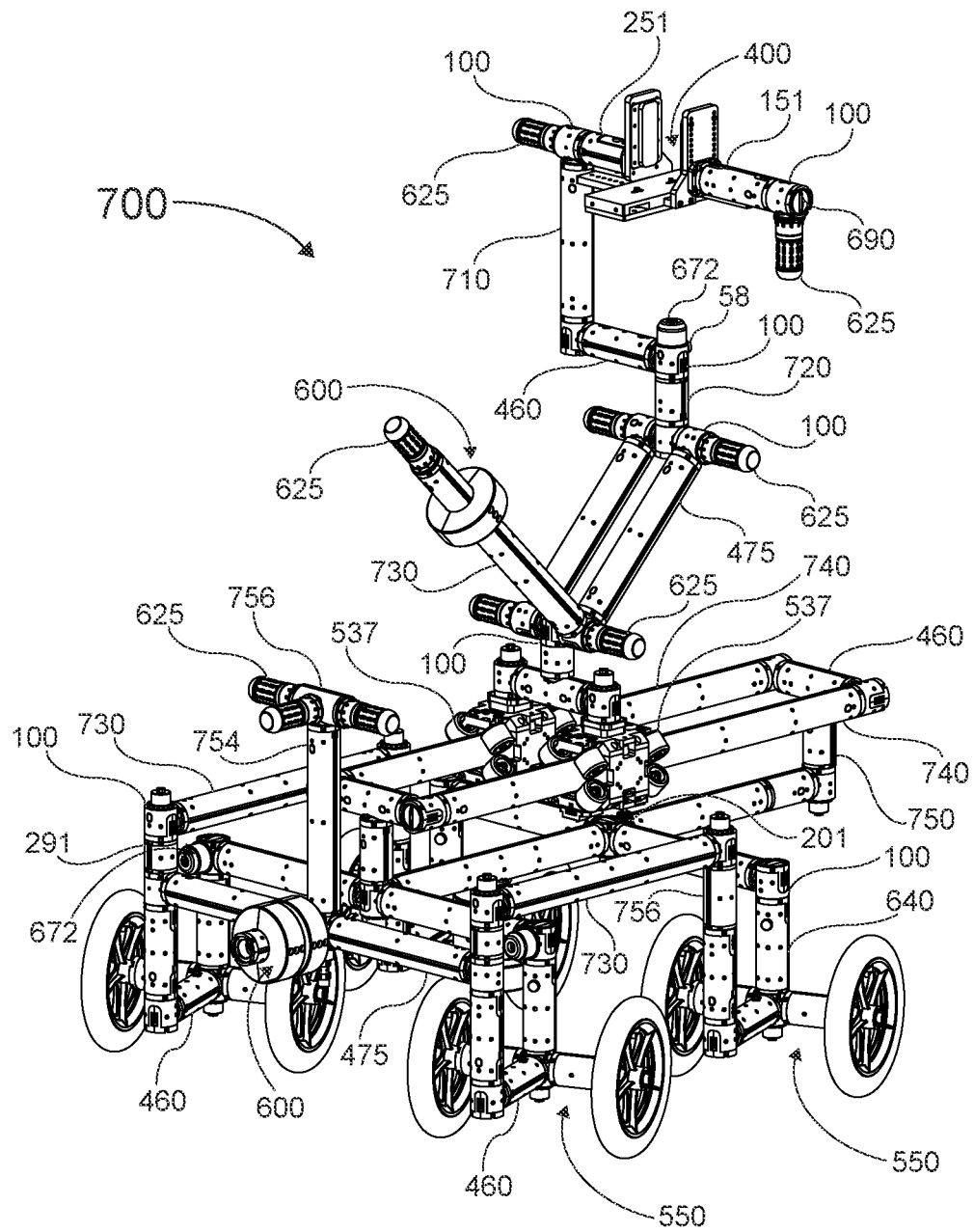
FIG. 34 is a perspective view of an example of a crab-steering dolly system assembled with some of the modular components disclosed herein.

FIG. 34 shows a perspective view of an example of a crab-steering dolly system 700 configured with some of the modules and assemblies disclosed herein, and is designed to provide a trackless operator-controlled crab-steering assembly for conveyance of a camera or other device about a film set or other location. It should be noted that, in this example, referring to the "back" or "rear" means the side of the assembly facing toward in the drawing view, where an operator steering the dolly system would stand, and "front" or "forward" means the side of the assembly facing away in the drawing view. The crab-steering dolly 700 comprises two sub-assemblies wherein the first sub-assembly is a pivotable and rotatable device support structure supported by a pair of rail-surround rolling module assemblies 537, and the second sub-assembly is a steerable dolly framework provided with: (i) an elongate rail assembly on which the rail-surround rolling modules 537 may travel, (ii) a pair of crab-steering wheel modules 550 at each corner, and (iii) a steering assembly for pivotable control of the wheel modules.

The device support sub-assembly comprises a baseplate assembly 400 to which a camera or other screw-mounted device can be mounted. To the right side of the baseplate assembly 400 is engaged a pan/tilt/jib operating handlebar assembly comprising a 6-unit length double-receptacle extension-tube rotator module 151 and a closed-tube rotator hub assembly 100 capped with a hard end-cap component 690 and with a downwardly extending grip end-cap module 625 to enable an operator's hand control of the baseplate's direction and position. Extending from the left side of the baseplate module 400 is a 4-unit length male/receptacle side-opening joiner module 251 which attaches to a closed-tube rotator hub assembly 100 to provide an intermittently lockable adjustable-tension 360° device-tilt pivot point controllable with the handlebar assembly to the right of the baseplate. A grip end-cap module 625 is engaged with the hub assembly's 100 left-facing male member for an additional handgrip. Downwardly extending from the rotator hub assembly 100 is a 10-unit double-receptacle extension-tube rotator module 710, which can be locked or provide an off-center 360° device-pan pivot point where met by another rotator hub assembly 100, to which is mounted a 6-unit length double-receptacle extension-tube joiner module 460 followed by another closed-tube rotator hub assembly 100, having a bumper component 672 engaged with its upward-facing wide pivot segment, and where met below by a 3-unit male/receptacle extension-tube joiner module 720, provides an intermittently lockable adjustable-tension 360° device-pan pivot point centered below the camera or other pointed device, with the ability to adjust the pivot tension using a tension-adjustment screw knob 58.

Under joiner module 720, a closed-tube rotator hub assembly 100 has engaged on both sides two additional of the same (each having mounted a grip end-cap module 625) where from two 12-unit length double-receptacle extension-tube joiner modules 475 extend down to each a rotator hub assembly 100 (there inwardly providing a jib-tilt pivot point for the assembly above) engaged centrally to a stack of two additional rotator hubs 100 (there providing a jib-pan pivot point for the assembly above). The jib-tilt and jib-pan may be controlled using the grip end-cap module 625 mounted to the end of an 18-unit double-receptacle extension-tube joiner module 730 by a zero-unit length double-male joiner module 281 (not visible). The joiner module 730 also has mounted a counterbalancing weight module assembly 600.

Below the two above cited stacked rotator hubs 100, the device support structure is mounted to the rail-surround rolling module assemblies 537 via a 6-unit length double-receptacle extension-tube joiner module where from each side a closed-tube rotator hub assembly is each mounted atop a rail-surround rolling module assembly 537, thereby allowing for small tracking movements relative to the lower dolly assembly, in this example, running along two parallel 36-unit double-receptacle extension-tube joiner modules 740 which are engaged centrally at each end via closed-tube rotator hub assemblies and a 6-unit double-receptacle extension-tube joiner module 460, where from downwardly a side-mounted 4-unit male/receptacle extension-tube joiner module 750 followed by a closed-tube rotator hub assembly engage the above device support structure and rail assembly to the steerable dolly sub-assembly.

The steerable dolly sub-assembly provides a chassis structure upon which the device support sub-assembly is supported and engaged by the rail-surround rolling module assemblies 537 with the rail assembly. The chassis assembly has at its center a 4-way closed-tube joiner hub assembly 201 from where extends in all four directions four extension-tube joiner modules, the longest being an 18-unit double-receptacle extension-tube joiner module 730 at the center to the back of the assembly, where here a 4-way closed-tube rotator hub assembly 100 attaches upwardly to the rail assembly and to each side a 12-unit double-receptacle extension-tube joiner module 475, leading to the two back corners of the chassis. Extending from the central 4-way closed-tube joiner hub assembly 201 toward the front is a 12-unit joiner module followed by a 4-unit joiner module which engages the rail assembly at the front. Extending from each of the sideward faces of the central joiner hub assembly 201 are two 12-unit joiner modules leading to the front two corners of the chassis assembly.

At each corner of the chassis assembly is engaged a closed-tube rotator hub assembly 100, where on each downwardly is engaged a 6-unit male/receptacle extension-tube rotator module 640 providing the corresponding wheel module assemblies 550 with a directional pivot point. Engaged below each of these rotators 640 is a 4-way closed-tube rotator hub assembly 100 at the center of the pairs of wheel modules 550. Extending off the back of each of these hub assemblies is a 6-unit double-receptacle extension-tube joiner module 460, met by another rotator hub assembly 100, wherefrom extends upwardly a 6-unit double-receptacle extension-tube rotator module 151, which provide pivot points of the steering assembly.

To each of the upward-extending back rotator modules 640 are attached in series, a rotator hub assembly 100, a 2-unit double-male joiner module 291, and another hub assembly 100. To each of the upward-extending front rotator modules 640 are attached a 4-unit double-male extension-tube joiner module 756 and a rotator hub assembly 100. On the left and right side of the dolly, an 18-unit double-receptacle extension-tube joiner module 730 interconnects the steering assembly's top rotator hub assemblies for the forward and the rear rotator modules that are interconnected to the wheel modules 550. A pair of 12-unit double-receptacle extension-tube joiner modules 475 extend inward from the lower rotator hub assemblies 100 atop the rear upward-extending rotator modules 640 and are engaged with a another configuration of a 4-way closed-tube joiner hub assembly. Extending back from the joiner hub assembly is a weight module assembly 600 on a 6-unit double-receptacle joiner module. Extending upward from the joiner hub assembly is a 12-unit male/receptacle extension-tube joiner module 754 that is engaged with a 4-unit double-male extension-tube joiner module 756 that has three grip end-cap modules 625. The sub-assembly described in this paragraph comprises the steering assembly by which an operator can steer the crab-steering dolly 700 while pushing or pulling by the grip end-cap modules 625. In this example, there is enabled an approximate 140° turning radius of the wheels, by the force applied by an operator to the steering assembly, where pushing the assembly forward and to the left will point the wheel modules 550 toward the right, and vice versa, forward and to the right redirecting them to point towards the left.

Example 2: Vertical Rail-Tracking Dolly System

Figure 35:
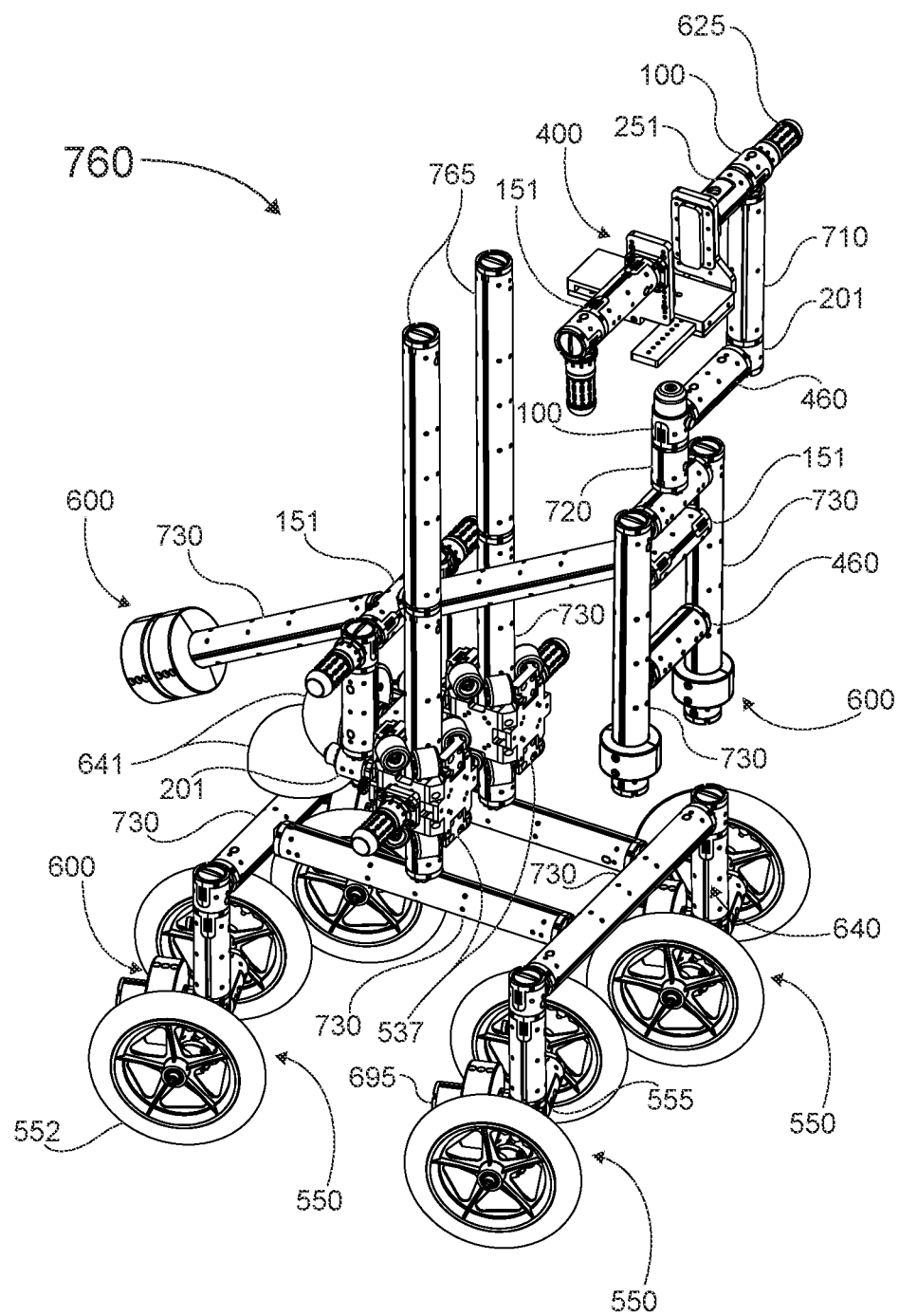
FIG. 35 is a perspective view of an example of a vertical rail-tracking dolly system assembled with some of the modular components disclosed herein.

An example of a vertical rail-tracking dolly system 760 is shown in FIG. 35, and may be used to provide a stable support for controllably moving a mounted device such as a still camera or a video camera or a film camera in vertically upward and downward motions during moving or still image captures. The wheel modules enable an operator to push or pull the vertical rail-tracking dolly system 760 as desired while operating the mounted device.

The vertical rail-tracking dolly system 760 comprises two sub-assemblies wherein the first sub-assembly is a dolly framework provided with a pair of wheel modules 550 at each corner and a vertical elongate rail structure on which rail-surround rolling module assemblies 537 may travel, and the second sub-assembly is a pivotable and rotatable camera support structure with a pair of rail-surround rolling module assemblies 537 for travelling up and down along the vertical elongate rail structure provided therefor on the dolly framework.

The dolly framework sub-assembly is configured with a first pair of spaced-apart 18-unit double-receptacle extension-tube joiner modules 730 that are side-mounted at their ends to a second pair of spaced-apart 18-unit double-receptacle extension-tube joiner modules 730 that are engaged at their ends with a closed-tube rotator hub assembly 100 fitted with a hard socket-cap component 690. Extending downward from each rotator hub assembly 100 is a 6-unit male/receptacle extension-tube rotator module 640, providing the directional pivot point of the dolly system's wheel modules 550 that are side-mounted on two sides of a rotator hub assembly 100 at the base of each extension-tube rotator module 640. In this example, the wheels 552 are bolted to the wheel module's 550 wheel-axle/receptacle side-opening joiner module 555 at corresponding axle offset threaded bores 551*b* (not visible), so that these wheel module assemblies will act as large casters and rotate naturally into directional alignment with the directional force exerted by the operator to the dolly assembly. As shown in FIG. 35, extending from a central third side of the rotator hub assembly, the wheel module assemblies include a weight module assembly 600 side-mounted to a joiner module having a flat end-cap component 695.

The vertical elongate rail structure comprises two rails wherein each rail consists of, at the lower end, an 18-unit double-receptacle extension-tube joiner module 730 engaged with an upper 18-unit male/receptacle extension-tube joiner module 765. The lower ends of the rail structure are side-mounted at the longitudinal square-nut channels of the first pair of joiner modules 730 provided horizontally. The upper ends of the rail structure have inserted hard socket-cap components 690 for protective enclosure of there the two receptacles.

The second sub-assembly, i.e., the pivotable and rotatable camera support structure, comprises a baseplate assembly 400 to which a camera or other screw-mounted device can be mounted. To the left side of the baseplate assembly 400 (in the view shown in FIG. 35) is engaged a pan/tilt/jib operating handlebar assembly comprising a first double-receptacle extension-tube rotator module 151 and a closed-tube rotator hub assembly 100 capped with a hard socket-cap component 690 and with a downwardly extending grip end-cap module 625 to enable an operator's hand control of the baseplate's direction and position. Extending from the right side of the baseplate assembly 400 is a male/receptacle side-opening joiner module 251 which is engaged with a closed-tube rotator hub assembly 100 to provide an intermittently lockable adjustable-tension 360° tilt-axis whereby the baseplate assembly 400 is controllable by the handlebar assembly to the left side of the baseplate assembly. A grip end-cap module 625 is mounted to the outward male member assembly of the rotator hub assembly 100 for a supplementary grip point. Extending downward from the rotator hub assembly 100 is a 10-unit double-receptacle extension-tube rotator module 710, which may provide an off-center pan-axis where met at its base by a closed-tube joiner hub assembly 201, from which is side-mounted a first double-receptacle extension-tube joiner module 460 which in turn is engaged with a closed-tube rotator hub assembly 100 having a bumper component 672 engaged with its upward-facing wide pivot segment, for protection of the camera or other device where it may inadvertently come to meet the hub assembly by rotation upon its 360° tilt-axis. The rotator hub assembly 100 provides the baseplate assembly's intermittently lockable adjustable-tension pan-axis where met by a 3-unit male/receptacle extension-tube joiner module 720 which extends downward from the rotator hub assembly and is side-mounted to a second double-receptacle extension-tube joiner module 460. A pair of 18-unit double-receptacle extension-tube joiner modules 730 is engaged with the opposite ends of the second joiner module 460, and rotationally engaged with the opposite ends of a second rotator module 151, and engaged with a third joiner module 460. A counterbalancing weight module assembly 600 is side-mounted near the bottom end of each of the pair of double-receptacle extension-tube joiner modules 730. One end of another 18-unit double-receptacle extension-tube joiner module 730 is side-mounted to the rotationally engaged second rotator module 151 and its other end is side-mounted to a third rotator module 151. Another extension-tube joiner module 730 is side-mounted to the opposite side of the third rotator module 151 by one end, and has a counterbalancing weight module assembly 600 mounted to its opposite end. A pair of rotator hub assemblies 100, with hard end-cap components 690 and outward grip end-cap modules 625, are engaged with receptacles in the opposite ends of the third rotator module 151, whereby the upper section of the support assembly may pivot up and down, and the extended vertical section of the assembly may remain vertical if so desired by rotation upon the second rotator module 151. Below the pair of rotator hub assemblies 100, a pair of double-receptacle extension-tube joiner modules 460 are engaged and then mounted upon a pair of joiner hub assemblies 201 interconnected by another double-receptacle extension-tube joiner module 460. The rail-facing receptacles of the pair of joiner hub assemblies 201 have mounted therein rail-surround rolling module assemblies 537.

The rail-surround rolling module assemblies 537 are slipped around the vertical elongate rail structure configured on the dolly framework sub-assembly, and can be moved upward and downward therealong by an operator using the grip end-cap modules 625 provided therefor mounted to the sides of the pair of rotator hub assemblies 100 engaged with the third rotator module 151, and mounted to the sides of the rolling module assemblies 537. A pair of female dome pad end-cap modules 641 may be side-mounted to the middle horizontal double-receptacle extension-tube joiner module 460 of the second sub-assembly and to the corresponding 18-unit extension-tube joiner module 730 of the first sub-assembly to cushion camera movement as the rail-surround rolling module assemblies 537 travel to the bottom of the vertical elongate rail structure.

Example 3: Lateral Mounted Rail-Tracking Dolly System

Figure 36:
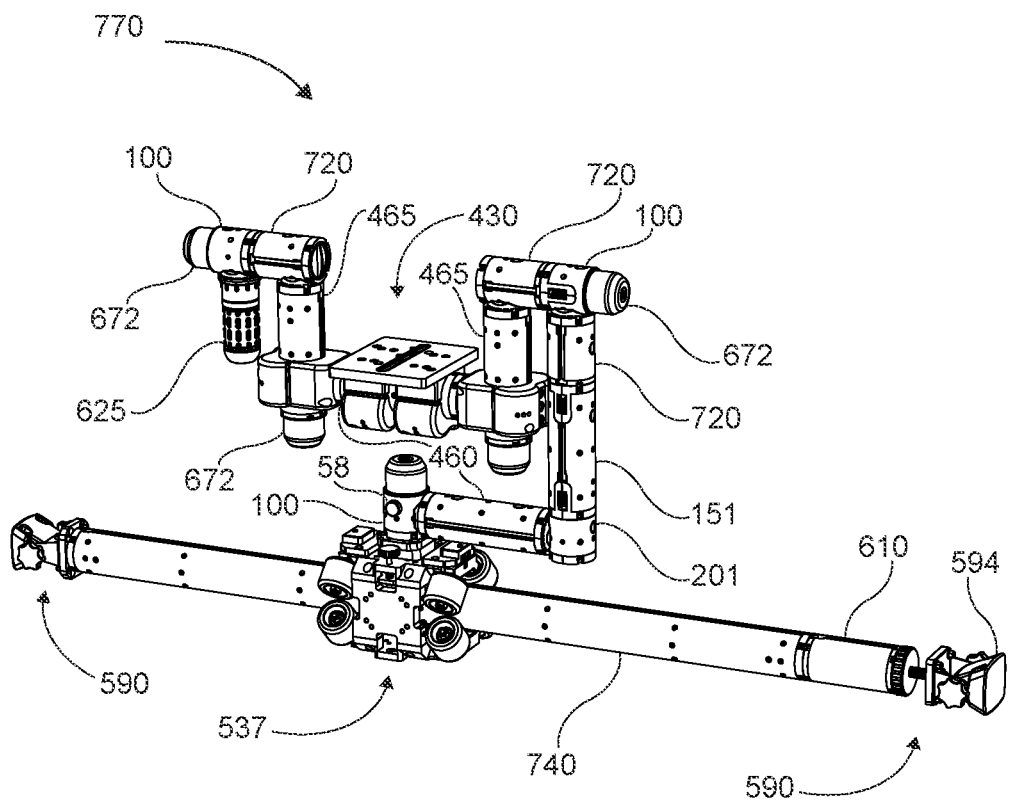
FIG. 36 is a perspective view of an example of a lateral mounted rail-tracking dolly system assembled with some of the modular components disclosed herein.

An example of a lateral mounted rail-tracking dolly system 770 is shown in FIG. 36. This type of assembly configuration can be used to provide a horizontal rail system that can be securely fixed in between two opposite stable vertical supports such as two walls or alternatively, for example, inside a vehicle between two of its doors or windows. A device support assembly engaged with one or more rail-surround rolling module assemblies 537 (or optionally, rail-rolling modules 510), can be controllably moved back and forth along the horizontal rail system by an operator.

In this example, the horizontal rail system comprises a 36-unit double-receptacle extension-tube joiner module 740 demountably engaged at one end with a pivotable support module 590 having mounted therein a pad component 594. The other end of the joiner module 740 is engaged with a telescoping extension module 610 that is mounted to a pivotable support module 590 having mounted therein a pad component 594. The horizontal rail system can be securely mounted in place between two vertical support surfaces with the extendable or retractable engagement by the telescoping extension module 610 with the two surfaces. A similar alternative assembly, not shown, may be engaged vertically between two horizontal support surfaces, where may be required.

In this example, the baseplate assembly 430 illustrated in FIG. 17 is side-mounted to a 3-unit male/receptacle extension-tube joiner module 720 at the upper end of each 6-unit male/receptacle extension-tube joiner module 465. The downward-facing wide pivot segment of each of the joiner module's 465 male member tube-end assembly 270 is engaged with a bumper component 672 (the male components 70 there shown in FIG. 17 are here excluded). The outer male ends of the 3-unit joiner module's 720 are each engaged with a closed-tube rotator hub assembly 100. A downward-extending grip end-cap module 625 and left-facing bumper component 672 is engaged with the rotator hub assembly 100 on the left side of the baseplate assembly 430 while the rotator hub assembly 100 on the right side of the baseplate assembly 430 is engaged with a right-facing bumper component 672 and with a downward-extending assembly of a 3-unit male/receptacle extension-tube joiner module 720 engaged with a 6-unit double-receptacle rotator module 151 which in turn is engaged with a closed-tube joiner hub assembly 201. The corresponding end of a 6-unit double-receptacle extension-tube joiner module 460 is engaged with a side-mounted male member assembly extending from the joiner hub assembly 201, while the other end of joiner module 460 is engaged with a rotator hub assembly 100 having a tension-adjustment screw knob 58 for adjusting the pivot-tension of the intermittently lockable 360° pan-axis there provided by the rotator hub assembly 100 rotationally engaged upon the male member plate assembly atop the rail-surround rolling module assembly 537. A bumper component 672 is engaged with the upward-facing wide pivot segment of the pan-axis rotator hub assembly 100 for protection of the camera or other device where it may inadvertently come to meet the hub assembly 100 by rotation of the baseplate assembly 430 upon its 360° tilt-axis provided where the right-side horizontal 3-unit male/receptacle joiner module 720 is rotationally engaged within the corresponding rotator receptacle 11 of the hub assembly 100.

Example 4: Rolling Jib System

Figure 37:
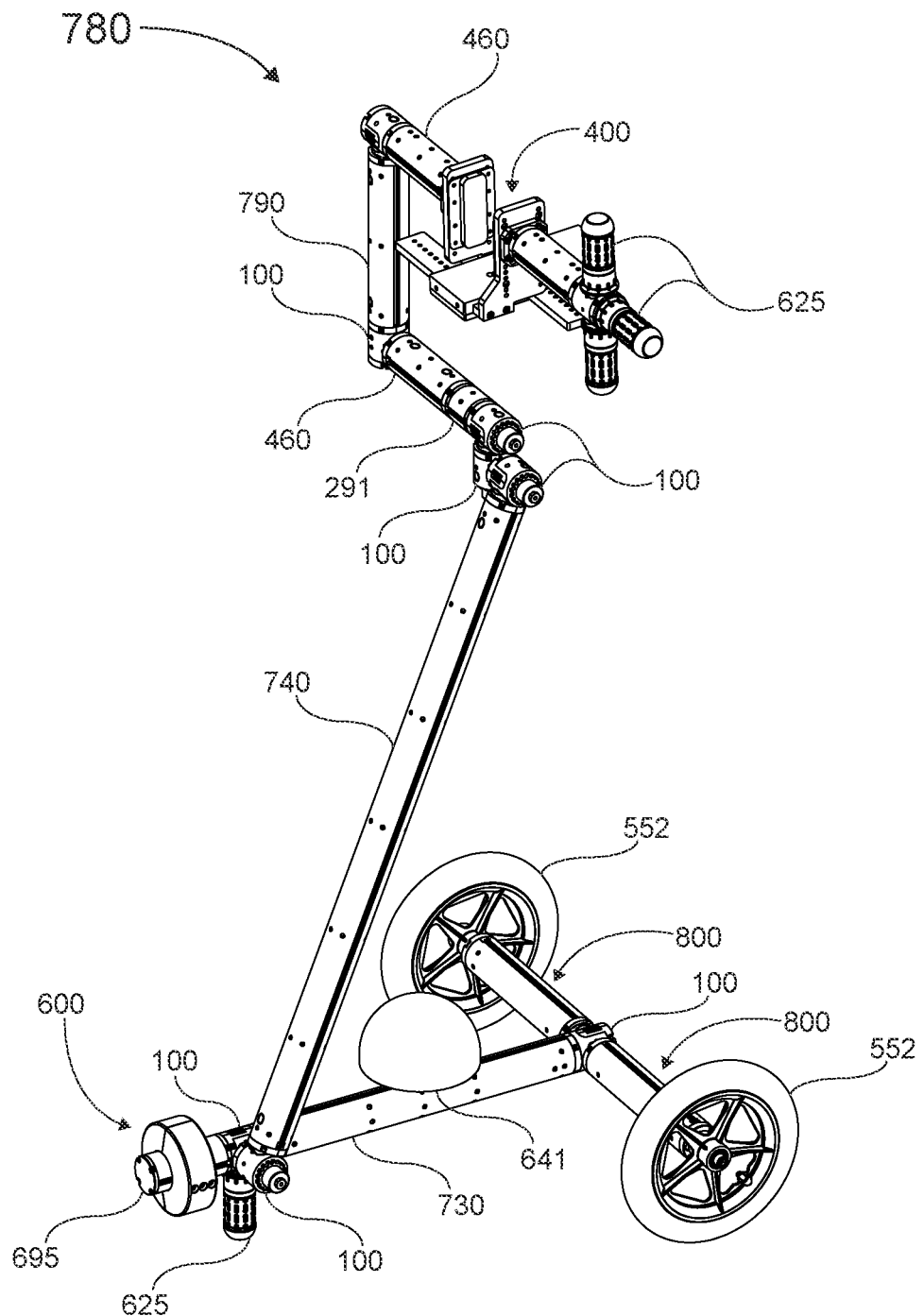
FIG. 37 is a perspective view of an example of a rolling jib system assembled with some of the modular components disclosed herein.

An example of a rolling jib system 780 is illustrated in FIG. 37, and is configured to provide a compact and light-weight rolling stand system for supporting a load or device such as a still camera or a video camera or a film camera. Such jib assemblies can be configured, for example, to outwardly extend a microphone or a lighting fixture and the like.

In this example, each of a pair of 10-unit wheel-axle/receptacle side-opening joiner modules 800 are side-mounted at one end to opposite sides of a first closed-tube rotator hub assembly 100. At the other end, a wheel 552 is rotationally engaged with the center bore of each wheel-axle tube-end component 551. One end of an 18-unit double-receptacle extension-tube joiner module 730 is engaged with the male member assembly extending outward from the first rotator hub assembly 100. The other end of the joiner module 730 is mounted with the male member assembly of a second closed-tube rotator hub assembly 100. The outward-extending receptacle of the second rotator hub assembly 100 is engaged with a weight module assembly 600 on a male joiner fitted with a flat end-cap component 695. A downward-extending grip end-cap module 625 is side-mounted to the second rotator hub assembly 100. A third rotator hub assembly 100 is side-mounted at a 90° spacing from the grip end-cap module 625. An upward-extending 36-unit double-receptacle extension-tube joiner module 740 is side-mounted to the third rotator hub assembly 100.

In this example, a baseplate assembly 400 is engaged with a first double-receptacle extension-tube joiner module 460 extending to the right (in the view shown in FIG. 37) to which is engaged a fourth rotator hub assembly 100 to which are mounted three grip end-cap modules 625 spaced apart at 90° intervals for handling of the baseplate assembly's tilt and pan operations. One end of a second double-receptacle extension-tube joiner module 460 is mounted to the left side of the baseplate assembly 400 while the other end is engaged with a fifth rotator hub assembly 100 which in turn, is engaged with a downward-extending 10-unit double-receptacle extension-tube joiner module 790. A sixth rotator hub assembly 100 is engaged with the other end of joiner module 790. One end of a third double-receptacle extension-tube joiner module 460 is side-mounted to the sixth rotator hub assembly 100. The other end of the third joiner module 460 is engaged with a double-male extension-tube joiner module 291 that is engaged at its other end with a seventh rotator hub assembly 100 whereby the above baseplate assembly 400 is provided its tilt-axis. Adjacent below, the upward-facing rotator receptacle 11 of an eighth rotator hub assembly 100 provides the above baseplate assembly 400 with a centered 360° pan-axis where it is rotationally engaged with the male member side-mount assembly 110 or 395 extending downward from the seventh rotator hub assembly 100. A ninth rotator hub assembly 100 is side-mounted to the eighth rotator hub assembly 100 where, on a high-tension setting or intermittently lockable rotation using the pivot lock 60, the pan-axis rotator hub assembly 100 and modules above can be re-leveled should the jib-arm joiner module 740 engaged with the ninth rotator hub assembly 100 be moved up or down, from where the third rotator hub assembly 100 engaged with the lower end of the jib-arm joiner module 740 is rotationally engaged with the second rotator hub assembly 100.

A female dome pad end-cap module 641 is side-mounted to the joiner module 730 to cushion the above jib-arm assembly in the event that it is desired to lower it to a position adjacent to the joiner module 730. The three grip end-cap modules 625 attached to the fourth rotator hub assembly 100 are provided for an operator's hand-control of the tilt and pan rotation of the support assembly. By holding this handgrip assembly, and optionally by also gripping the jib-arm (i.e., the joiner module 740), the rolling jib assembly 780 can be rolled by the operator by lifting the jib-arm to raise the downward-extending grip end-cap module 625 and then pushing or pulling the rolling jib assembly 780.

Example 5: Low-Angle Baseplate Support System

Figure 38:
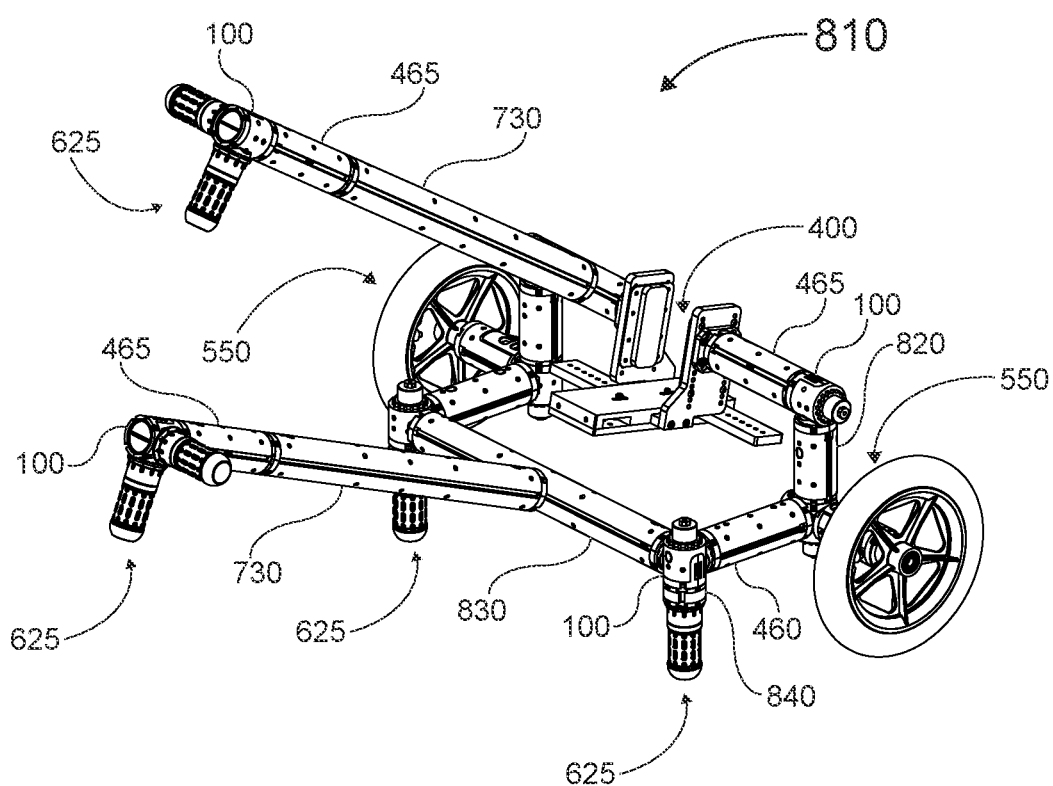
FIG. 38 is a perspective view of an example of a low-angle baseplate support system assembled with some of the modular components disclosed herein.

An example of a low-angle baseplate support system 810 is shown in FIG. 38, and is configured to provide a compact low-rolling baseplate system wherein drive and turning movements are performed with a push or pull by an operator gripping two handle attachments which extend upwardly from two sub-assemblies to within the reach of the operator while they are standing or walking. The assembly can be rolled by the operator when lifting a chassis steering bar assembly comprising a closed-tube rotator hub assembly 100 (with two side-mounted grip end-cap modules 625), met by a male/receptacle extension-tube joiner module 465, followed by an 18-unit double-receptacle extension-tube joiner module 730, which is side-mounted amid an 18-unit double-receptacle extension-tube rotator module 830, which forms the back of a chassis assembly which when lifted removes two back corner grip end-cap modules 625 from the ground allowing the system assembly to advance.

Below two rear corner rotator hub assemblies 100, the length of extension of the grip end-cap modules 625 is combined with at each a 1-unit double-male extension-tube joiner module 840, which align approximately the chassis assembly to rest horizontally relative to the radius of the two wheel modules 550. Extending forward from each of the two rear corner rotator hub assemblies 100 is a 6-unit double-receptacle extension-tube joiner module 460 met by two front rotator hub assemblies 100 where on each is attached outwardly a wheel module assembly 550. Extending upward from the front two rotator hub assemblies 100 are two 4-unit male/receptacle extension-tube rotator modules 820 with engaged atop two rotator hub assemblies 100 each with their rotator receptacles 11 facing inward thereby providing a baseplate assembly 400 its tilt-axis where engaged between two male/receptacle extension-tube joiner modules 465 which are rotationally engaged within the rotator hub assemblies on each side. Side-mounted from the left-side joiner module 465 is a tilt-axis steering bar assembly comprising the same modules as the lower chassis steering bar assembly, with the direction of the horizontal grip end-cap module 625 reversed, and here configured for the operation of the baseplate assembly's 400 tilt-motion as well as to grip for steering and rolling advancement of the system.

Example 6: Lateral Ground Rail-Tracking Dolly System

Figure 39:
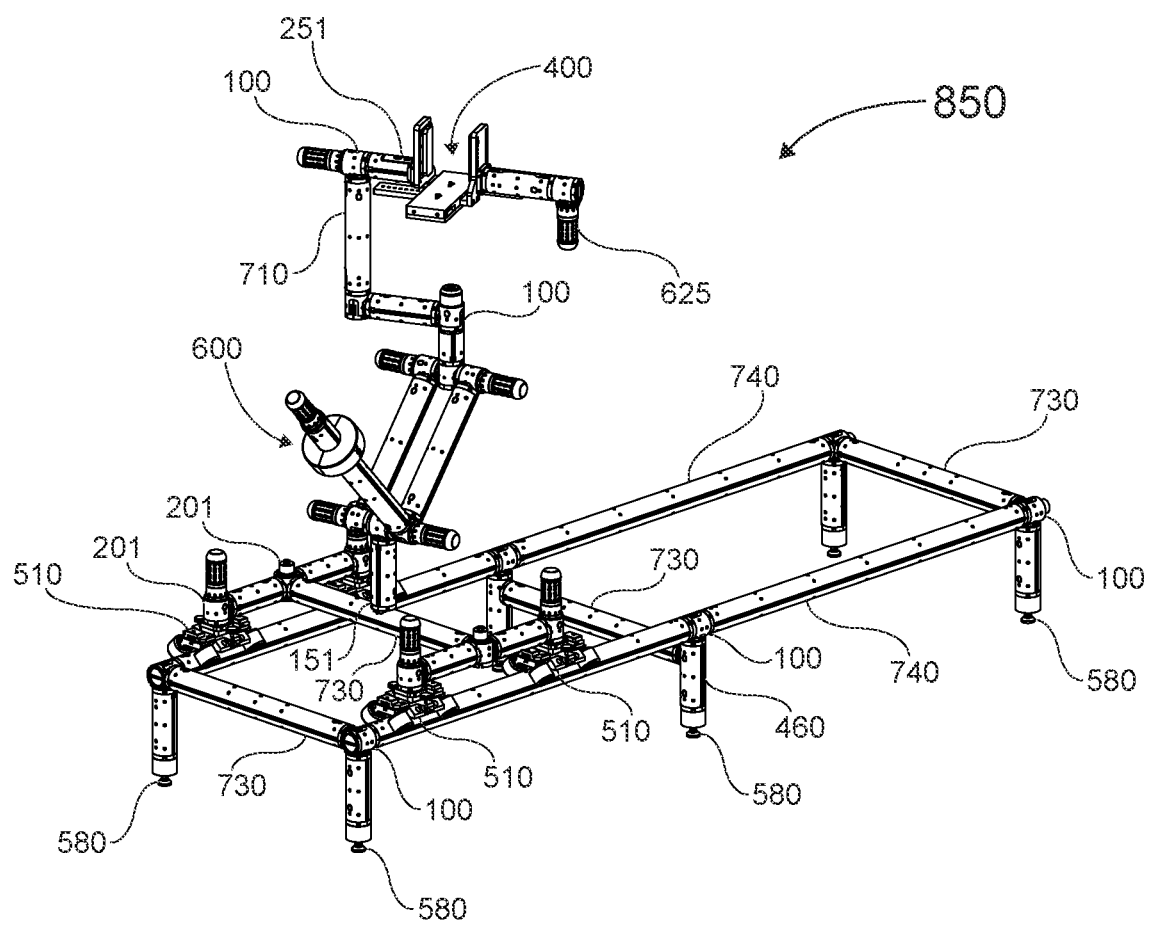
FIG. 39 is a perspective view of an example of a lateral ground rail-tracking dolly system assembled with some of the modular components disclosed herein.

An example of a lateral ground rail-tracking dolly system 850 is shown in FIG. 39, and is configured to provide a stationary rail track system for rolling a camera or other device therealong during filmmaking or other end-use requirements of a similar nature.

This example comprises three sub-assemblies wherein the first sub-assembly is a stationary rail track system, the second sub-assembly is a pivotable and rotatable camera support structure, and the third sub-assembly is a support framework for the second sub-assembly, comprising two pairs of rail-rolling modules 510.

The first sub-assembly comprises a pair of rail tracks wherein each rail track is configured with two 36-unit double-receptacle extension-tube joiner modules 740 interconnected with a rotator hub assembly 100 and having a rotator hub assembly 100 engaged with the outward-facing ends of the joiner modules 740. An 18-unit extension-tube joiner module 730 is side-mounted to the rotator hub assemblies 100 at each end of the rail tracks. Each of the six rotator hub assemblies in the first sub-assembly is side-mounted to one end of a downward-extending double-receptacle extension-tube joiner module 460 which is engaged at its other end with a leveling foot module 580. A joiner module 730 is side-mounted to the two middle downward-extending joiner modules 460 to provide structural support to the rail track sub-assembly.

The second sub-assembly comprises a baseplate assembly 400 to which a camera or other screw-mounted device can be mounted. To the right side of the baseplate assembly 400 is engaged a pan/tilt/jib operating handlebar assembly comprising a 6-unit length double-receptacle extension-tube rotator module 151 and a closed-tube rotator hub assembly 100 capped with a hard end-cap component 690 and with a downwardly extending grip end-cap module 625 to enable an operator's hand control of the baseplate's direction and position. Extending from the left side of the baseplate module 400 is a 4-unit length male/receptacle side-opening joiner module 251 which attaches to a closed-tube rotator hub assembly 100 to provide an intermittently lockable adjustable-tension 360° device-tilt pivot point controllable with the handlebar assembly to the right of the baseplate. A grip end-cap module 625 is engaged with the hub assembly's 100 left-facing male member for an additional handgrip. Downwardly extending from the rotator hub assembly 100 is a 10-unit double-receptacle extension-tube rotator module 710, which can be locked or provide an off-center 360° device-pan pivot point where met by another rotator hub assembly 100, to which is mounted a 6-unit length double-receptacle extension-tube joiner module 460 followed by another closed-tube rotator hub assembly 100, having a bumper component 672 engaged with its upward-facing wide pivot segment, and where met below by a 3-unit male/receptacle extension-tube joiner module 720, provides an intermittently lockable adjustable-tension 360° device-pan pivot point centered below the camera or other pointed device's center, with the ability to adjust the pivot tension using a tension-adjustment screw knob 58.

Under joiner module 720, a closed-tube rotator hub assembly 100 has engaged on both sides two additional of the same (each having mounted a grip end-cap module 625) where from two 12-unit length double-receptacle extension-tube joiner modules 475 extend down to each a rotator hub assembly 100 (there inwardly providing a jib-tilt pivot point for the assembly above) engaged centrally to a closed-tube joiner hub assembly 201 from which is side-mounted downwardly a double-receptacle rotator module 151 providing a jib-pan pivot point for the assembly above where it is rotationally engaged with the third sub-assembly. The jib-tilt and jib-pan may be controlled using the grip end-cap module 625 mounted to the end of an 18-unit double-receptacle extension-tube joiner module 730 by a zero-unit length double-male joiner module 281 (not visible). The joiner module 730 also has mounted a counterbalancing weight module assembly 600.

The third sub-assembly comprises a rolling framework that is configured with a joiner module 730 engaged with a closed-tube joiner hub assembly 201 at each end. Extending laterally from each joiner module 201 is a double-receptacle joiner module 460. To the outward-facing end of each joiner module 460 is engaged another closed-tube joiner hub assembly 201. The upward-facing male member plate assembly 420 of a rail-rolling module 510 is engaged with the receptacle of the closed-tube joiner hub assembly 201. The upward-facing male end of the closed-tube joiner hub assembly 201 is provided with a grip end-cap module 625. As mentioned in the paragraph above, one end of a double-receptacle extension-tube rotator module 151 is side mounted to the joiner module 730, and the other end is rotationally engaged with the closed-tube joiner hub assembly 201 that interconnects the lower pair of rotator hub assemblies 100 in the second sub-assembly.

Example 7: Double-Baseplate A-Frame Dolly System

Figure 40:
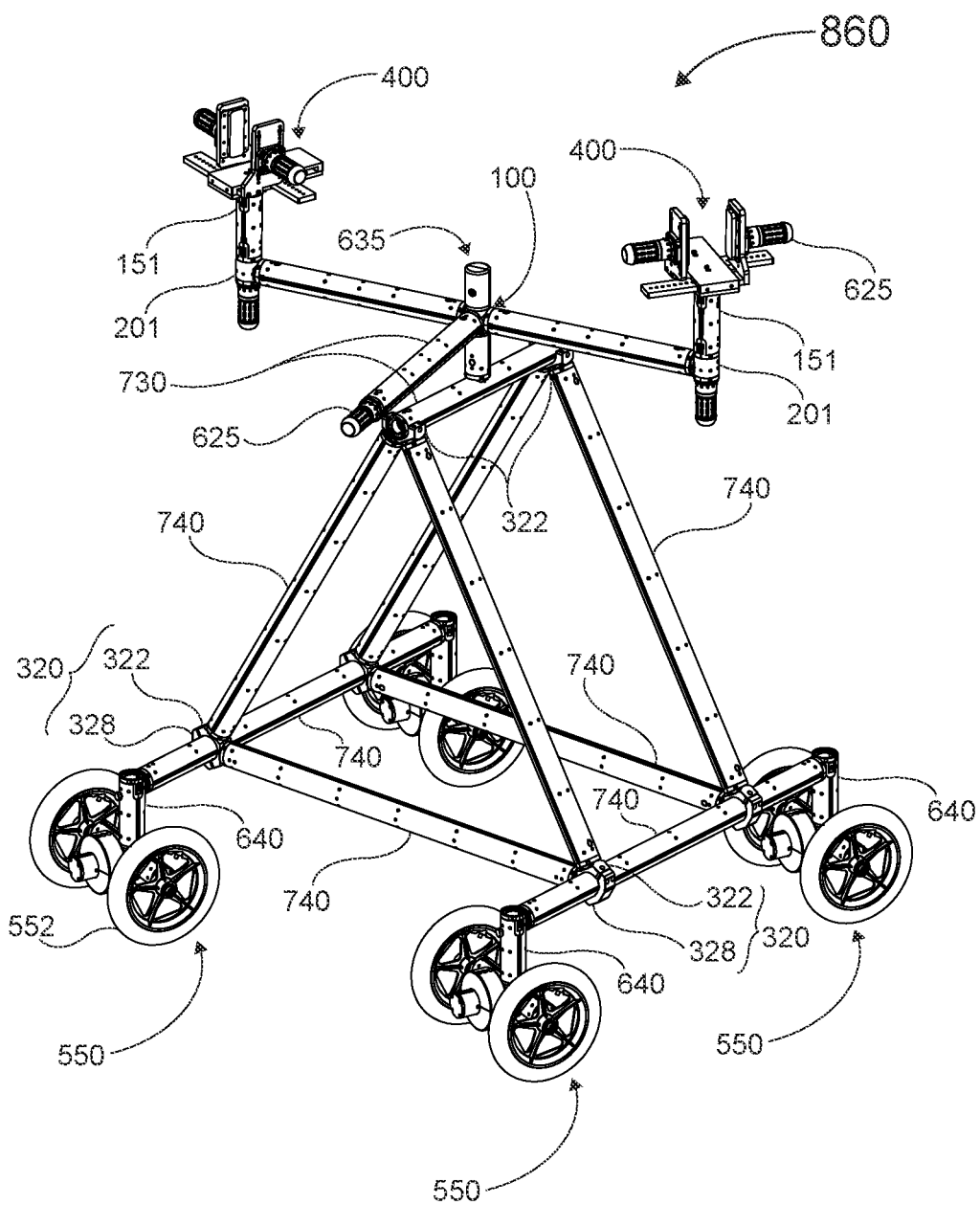
FIG. 40 is a perspective view of an example of a double-baseplate A-frame dolly system assembled with some of the modular components disclosed herein.

An example of a double-baseplate A-frame dolly system 860 is shown in FIG. 40, and is configured for use in applications such as filmmaking that may require a combined movement of two cameras or other such devices in tandem. This example comprises two sub-assemblies wherein the first sub-assembly is a rolling A-frame dolly structure, and the second sub-assembly is a rotational support structure for two cameras or other such devices.

The first sub-assembly has an A-framework configured with two A-frames each configured by interconnecting three 36-unit double-receptacle extension-tube joiner modules 740 with two 2-way 30° side-mount bracket modules 320 (refer to FIG. 13A) at the lower two joints and a 30° angle male member mount bracket 322 at the top joint. The two A-frames are interconnected: (i) at the bottom clamped slidably or securely to two 36-unit double-receptacle extension-tube joiner modules 740, and (ii) at the top with an 18-unit extension-tube joiner module 730 to which the mount bracket 322 is mounted with two mount screws 325 each threadably engaged with a square nut provided therefor in the opposing longitudinal channels of the joiner module 730. The first sub-assembly has four sets of wheel assemblies wherein each set comprises a pair of wheel modules 550 which are mounted to opposite sides of a rotator hub assembly 100. In this example, each wheel 552 is bolted to the corresponding wheel-axle/receptacle side-opening joiner module 555 at the corresponding axle offset threaded bore 551b (not visible), so that they act as large casters and rotate naturally into directional alignment with the directional force exerted by the operator to the dolly assembly. Extending from a central third side of the rotator hub assembly 100, the assemblies include a weight module assembly 600 side-mounted to a joiner module having a flat end-cap component 695. Rotatable 360° within the upward-facing rotator receptacle 11 of the rotator hub assembly 100, an upward-extending male/receptacle extension-tube rotator module 640 is rotationally engaged by its male end with the rotator hub assembly 100, while the other end of the rotator module 640 is securely engaged by a male member side-mount assembly 110 or 395 within the corresponding outward-facing joiner receptacle 211 of its corresponding 36-unit double-receptacle joiner module 740.

The second sub-assembly has two spaced-apart baseplate modules 400, each having an individual 360° pan-axis pivot point, and which also may be rotated 360° together at the central pan-axis pivot point. Each baseplate module 400 has a pair of grip end-cap modules 625 mounted to the male member plate assembly 420 on the left side and the right side of the module 400. One end of a double-receptacle extension-tube rotator module 151 is mounted to the downward extending male member plate assembly 420 of the module 400, and the other end of the rotator module 151 is interconnected with the male end of a closed-tube joiner hub assembly 201. A downward-extending grip end-cap module 625 is engaged with each joiner receptacle 211 by a zero-unit double-male joiner module 281 (not visible, refer to FIG. 9). A joiner module 730 engaged with a male member side-mount assembly extending inward from each joiner hub assembly 201 is interconnected with opposite sides of a rotator hub assembly 100 that provides the central 360° pan-axis point. A shell end-cap module 635 is engaged with the top of the rotator hub assembly 100, while the bottom female end of the rotator hub assembly 100 is rotationally engaged with the male end of a 4-unit male/receptacle joiner module 750. The female end of the joiner module 750 is side-mounted to the joiner module 730 that interconnects the two A-frames. Providing a central pan-operation handlebar, a joiner module 730 extends from a third side of the rotator hub assembly 100 and is engaged at its outer end with a grip end-cap module 625 mounted by a zero-unit double-male joiner module 281 (not visible).

Example 8: Four-Caster Baseplate Dolly System

Figure 41:
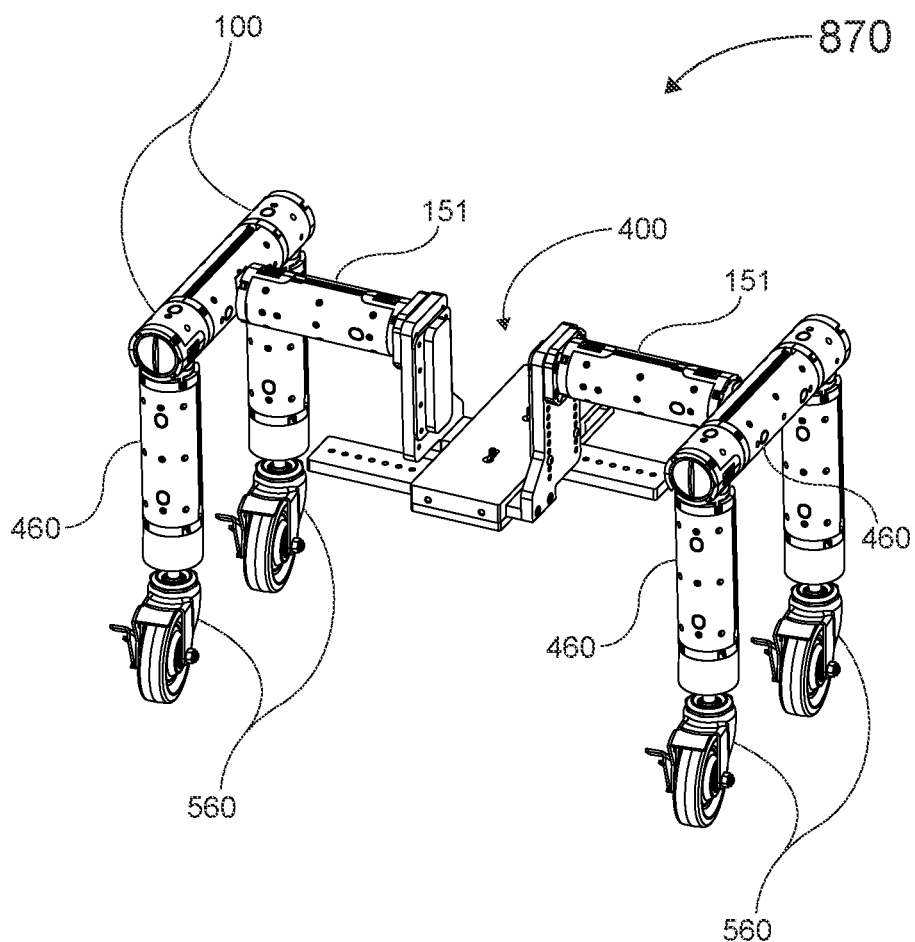
FIG. 41 is a perspective view of an example of a four-caster baseplate dolly system on casters, assembled with some of the modular components disclosed herein.

An example of a four-caster baseplate dolly system 870 is shown in FIG. 41, and is configured for use in applications such as filmmaking where it is desirable to have a camera or other such device mounted on a rolling framework as close as possible to the ground or a platform or a table and the like.

This example is configured with two pairs of castor wheel module assemblies 560, as described in reference to FIGS. 23C and 23D. Each pair comprises two 360° pivotable castor assemblies 560 wherein each assembly 560 is engaged with one end of a double-receptacle extension-tube joiner module 460, which in turn, is engaged with a closed-tube rotator hub assembly 100 at its other end. The two rotator hub assemblies 100 are interconnected with a joiner module 460. The male member plate assembly 420 on the right side of the baseplate assembly 400 is engaged with one end of a first double-receptacle rotator module 151. The other end of the first double-receptacle rotator module 151 is side-mounted to the right-side joiner module 460 that interconnects the corresponding pair of castor assemblies 560. The male member plate assembly 420 on the left side of the baseplate assembly 400 is engaged with one end of a second double-receptacle rotator module 151. The other end of the second rotator module 151 is side-mounted to the left-side joiner module 460 that interconnects the other pair of castor assemblies 560. The two rotator modules 151 in combination provide the tilt-axis point at which the baseplate assembly 400 may be rotated 360°, depending on the length of the mounted device, or may be intermittently locked by one or both of the pivot locks 60 engaged with the pivot-lock sprockets 423 (not visible) of the male member plate assemblies 420.

Example 9: Hand-Held Camera Stabilizer Assembly

Figure 42:
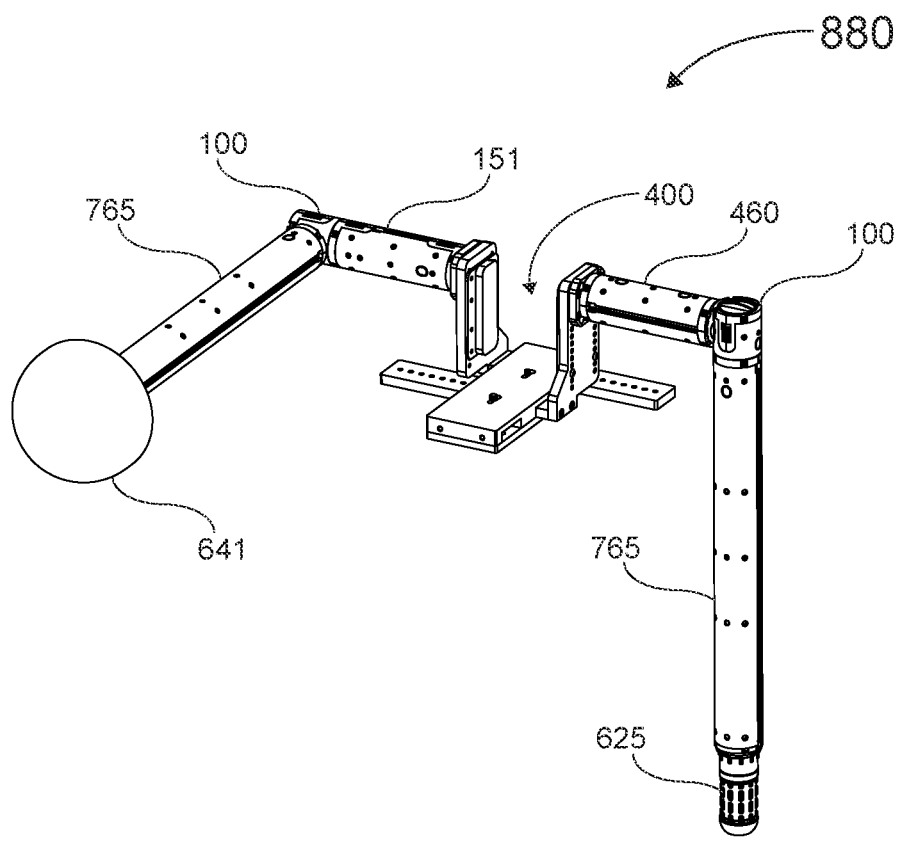
FIG. 42 is a perspective view of an example of a hand-held camera stabilizer assembly assembled with some of the modular components disclosed herein.

An example of a hand-held stabilizer assembly 880 for camera support is shown in FIG. 42, and is configured for use in applications where hand-held support is required for a tool or device such as a camera, that may be mounted into a baseplate assembly. In this example, the male member plate assembly 420 on the right side of a baseplate assembly 400 is engaged with one end of a double-receptacle joiner module 460 wherein the other end is engaged with a first closed-tube rotator hub assembly 100. The female end of a downward-extending 18-unit male/receptacle extension-tube joiner module 765 is engaged with the male end of the rotator hub assembly 100, while the male end of the joiner module 765 is provided with a grip end-cap module 625. The male member plate assembly 420 on the left side of the baseplate assembly 400 is engaged with one end of a double-receptacle rotator module 151. The other end of the rotator module 151 is engaged with a second rotator hub assembly 100. One end of a laterally extending 18-unit male/receptacle extension-tube joiner module 765 is engaged with the second rotator hub assembly 100, while the other end of the joiner module 765 is engaged with a female dome pad end-cap module 641.

An operator will be able to stably maneuver a camera mounted to the baseplate module 400 by resting the laterally extending joiner module 765 or female dome pad end-cap module 641 on their shoulder, or by holding the joiner module 765 in their left hand so that the female dome pad end-cap module 641 is pressed against their chest, and concurrently holding the downward-extending grip end-cap module 625 in their right hand, whereby they may tilt the camera angle up or down at the tilt-axis point provided by the double-receptacle rotator module 151.

Example 10: Vertical Rail-Tracking Stand Assembly

Figure 43:
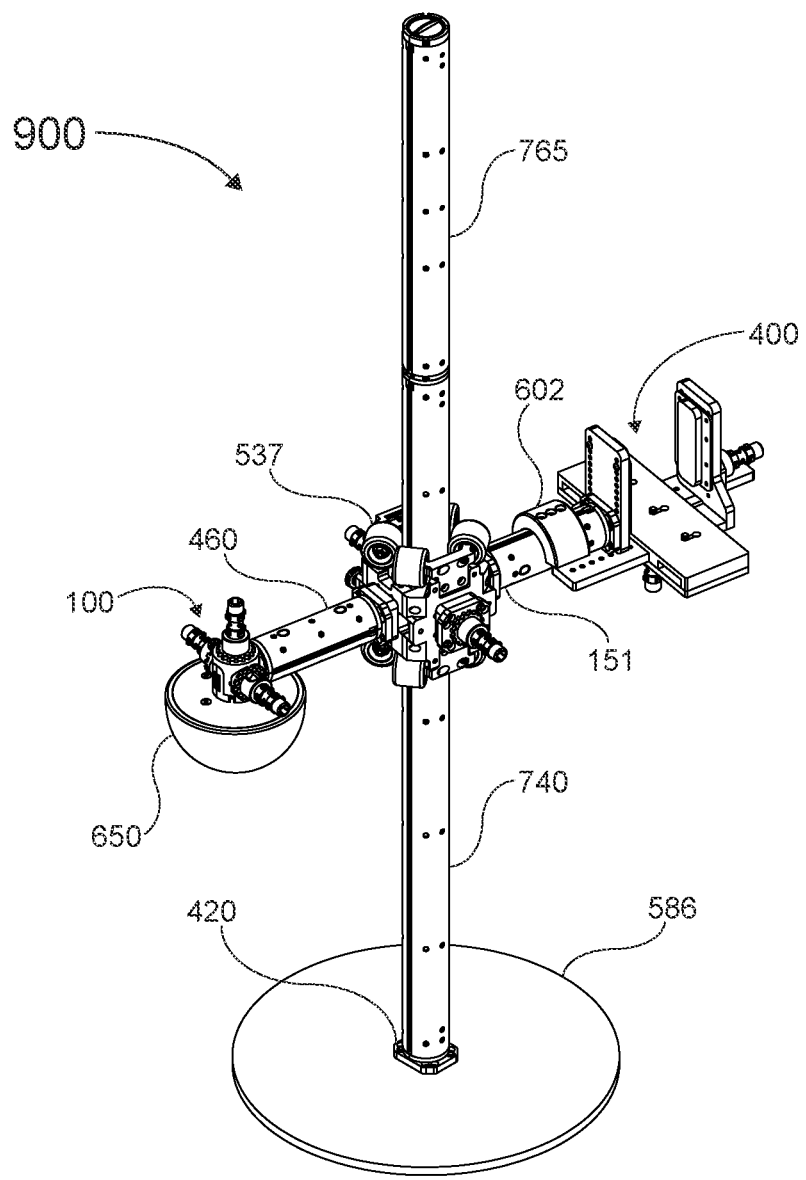
FIG. 43 is a perspective view of an example of a vertical rail-tracking stand assembly assembled with some of the modular components disclosed herein.

An example of a vertical rail-tracking stand assembly 900 is shown in FIG. 43, and is configured for use in applications where a tool or load such as a camera is required to be moved vertically up and down in a set standing position. This example comprises two sub-assemblies wherein the first is a vertical rail stand, and the second is a pivotable and rotatable rolling support for a camera or other type of device or tool.

The first sub-assembly is a vertical rail comprising an 18-unit male/receptacle extension-tube joiner module 765 interconnected with a 36-unit double-receptacle extension-tube joiner module 740 wherein the joiner module 740 is mounted to a male member plate assembly 420 atop a weighted foot plate 586 of a foot plate module 585.

The second sub-assembly comprises a pivotable and rotatable camera support structure mounted with a rail-surround rolling module assembly 537. One end of a double-receptacle rotator module 151 is engaged with a male member plate assembly 420 on the left side of a baseplate assembly 400 (as shown in FIG. 43) while the other end of the rotator module 151 is engaged with a male member plate assembly 420 extending outward from a rail-surround rolling module assembly 537, there providing an optional tilt-axis point for the baseplate assembly. A weight component 602 may be provided on the rotator module 151 interposed the baseplate module 400 and the rail-surround rolling module assembly 537. One end of a double-receptacle extension-tube joiner module 460 is engaged with the male member plate assembly 420 extending outward from the opposite side of the rail-surround rolling module assembly 537. The other end of the joiner module 460 is engaged with a rotator hub assembly 100. A male dome pad end-cap module 650 is mounted into the downward-facing receptacle of the rotator hub assembly 100.

The rail-surround rolling module assembly 537 of the second sub-assembly is slipped over the vertical rail of the first sub-assembly and may be moved upward and downward along the vertical rail as required by an operator. The male dome pad end-cap module 650 is provided to cushion a tool or device that may be mounted into the baseplate module 400 if the second sub-assembly reaches the bottom of the vertical rail of the first sub-assembly.

Example 11: Lighting Support Rack System

An example of a lighting support rack system 910 is shown in FIG. 44, and is configurable for use in applications such as in filmmaking where industrial lighting or grip equipment is used. These types of configurations may also be useful for supporting other types of loads such as audio equipment, video display equipment, and the like.

In this example, extending vertically from a weighted four-caster base assembly is a three-shaft lighting support rack assembly. The base assembly comprises four matching weighted caster-leg assemblies having each an 18-unit double-receptacle extension-tube joiner module 730 extending from the sides of the lighting support rack assembly's bottom horizontal 36-unit double-receptacle extension-tube joiner module 740 in pairs on two multi-angle male member mount brackets 335 where mounted to the 60° angled bores to form a 120° angle of separation between the two leg extensions. Connected to the outer ends of each of these is another mount bracket 335 connected at their 60° angled bores which aligns the second 60° angled bores to perpendicular to the ground whereon a vertically aligned 6-unit double-receptacle extension-tube joiner module 460 and caster module assembly 560 complete each leg assembly. Where counterbalancing of the upward lighting support rack assembly's load is required, a series of weight components 602 can be secured to the sides of the 18-unit double-receptacle extension-tube joiner modules 730, as shown in FIG. 44.

Extending upwardly from the lighting support rack assembly's bottom horizontal 36-unit double-receptacle extension-tube joiner module 740 are the three mounting shafts comprising each two 36-unit double-receptacle extension-tube rotator modules 920 connected by a zero-unit double-male joiner module 281. On each of the rotator modules 920 is a repositionable 90° offset side-mount bracket module 340 whereon each is an L-shaped mount arm assembly comprising a closed-tube joiner module hub assembly 201 followed by a 6-unit double-receptacle extension-tube joiner module 460 and additional closed-tube joiner module hub assembly 201 whereon are connected the vertically aligned ⅝" spigot lighting mount modules 490, having the spigots 498 on which a range of industrial lighting equipment may be supported. The vertical position of the mounted equipment can be adjusted by repositioning the 90° offset side-mount bracket module 340 on the corresponding square nuts within the square-nut channels along the 36-unit double-receptacle extension-tube rotator modules 920. If equipment size or spacing allows, the mounted equipment may also be pivoted 360° on the horizontal plane by rotating the 36-unit double-receptacle extension-tube rotator modules 920 where three of them are connected to the top of the horizontal 36-unit double-receptacle extension-tube joiner module 740, and three connected to the top of the first three. For the structural integrity of these types of lighting support rack assemblies, an additional horizontal 36-unit double-receptacle extension-tube joiner module 740 is connected to the ends of the upper three 36-unit double-receptacle extension-tube rotator modules 920, completing the rectangular frame of the lighting mount assembly.

Example 12: A-Frame Spooling Cart System

An example of an A-frame spooling cart system 930 is shown in FIG. 45, and is configured for use in applications where a mobile cart can be used for collecting, and moving around a location, various loads such as cable, wire, rope, hose, fabric, and the like.

In this example, across the width of the cart at the top of the A-frame is a spool bar assembly which can be rotated 360° by the operator on its 6-unit double-receptacle extension-tube rotator modules 151, by holding the assembly 930 at its grip end-cap modules 625 which extend outward from each side from a joiner-box sub-assembly. Each of the joiner-box sub-assemblies comprises three 6-unit double-receptacle extension-tube joiner modules 460, a 6-unit male/receptacle side-opening joiner module 940, and three closed-tube joiner hub assemblies 201 at three corners. The fourth corner of the joiner-box sub-assemblies are mounted to the spool assembly's cross bar by two male member side-mount assemblies 110.

The A-frame rolling chassis comprises two A-frames configured by interconnecting three 36-unit double-receptacle extension-tube joiner modules 740 with two 2-way 30° side-mount bracket modules 320 (refer to FIG. 13A) at the lower two joints and a 30° angle male member mount bracket 322 at the top joint. The two A-frames are interconnected: (i) at the bottom clamped to two 36-unit double-receptacle extension-tube joiner modules 740, and (ii) at the top with the two rotator modules 151 situated at the end of the spool bar assembly. At the four corners of the A-frame rolling chassis, mounted to the ends of two of the four base 36-unit double-receptacle extension-tube joiner modules 740, there are engaged four closed-tube joiner hub assemblies 201. Extending downward from each joiner hub assembly 201 is a 6-unit male/receptacle extension-tube rotator module 640, providing the directional pivot point of the cart system's wheel modules 550 that are side-mounted on two sides of a rotator hub assembly 100 at the base of each extension-tube rotator module 640. In this example, the wheels 552 are bolted to the wheel module's 550 wheel-axle/receptacle side-opening joiner module 555 at corresponding axle offset threaded bores 551b (not visible), so that these wheel module assemblies will act as large casters and rotate naturally into directional alignment with the directional force exerted by the operator to the dolly assembly. Extending from a central third side of the rotator hub assembly, the wheel module assemblies include a weight module assembly 600 side-mounted to a joiner module having a flat end-cap component 695.

Example 13: Pull Cart Assembly

An example of a pull cart assembly 950 suitable for a golf-bag is shown in FIG. 46. Such assemblies can be configured for transporting other types of tall vertical loads such as pressurized gas canisters. In this example, the pull cart assembly 950 comprises a vertical shaft sub-assembly with a first baseplate module 400, a horizontal wheel sub-assembly with a second baseplate module 400, and leg support sub-assembly.

The vertical shaft sub-assembly comprises an 18-unit double-receptacle extension-tube joiner module 730 interconnected with a 10-unit double-receptacle extension-tube joiner module 790 with a zero-unit double-male joiner module 281 linking the two receptacles. The open end of the joiner module 790 is engaged with one side of a first rotator hub assembly 100 while the other side of the first rotator hub assembly 100 is engaged with a 3-unit male/receptacle extension-tube joiner module 720. A second rotator hub assembly 100 is engaged with the other end of the joiner module 720. A bumper end-cap module 670 is mounted to the wide pivot segments of both of the rotator hub assemblies 100, and three grip end-cap modules 625 are side-mounted to the second rotator hub assembly 100 at 90° intervals.

The horizontal wheel sub-assembly comprises a third rotator hub assembly 100 to which a pair of 10-unit wheel-axle/receptacle side-opening joiner modules 800 are engaged at opposite sides of the hub assembly 100. A wheel 552 is bolted to the center bore of each wheel-axle module 800.

The leg support sub-assembly comprises a downward-extending 3-unit double-male extension-tube joiner module 955 to the bottom of which is engaged a grip end-cap module 625. A fourth rotator hub assembly 100 is engaged with the top of the joiner module 955. A laterally extending 10-unit double-receptacle extension-tube rotator module 710 is side-mounted to the fourth rotator hub assembly 100. A fifth rotator hub assembly 100 is side-mounted to the open end of the rotator module 710, while a 4-unit male/receptacle extension-tube joiner module 750 is side-mounted to the other side of the fifth rotator hub assembly 100. A second baseplate assembly 400 is mounted to the fifth rotator hub assembly 100. The open end of the joiner module 750 is mounted to the third rotator hub assembly 100 of the horizontal wheel sub-assembly.

A first baseplate module 400 mounted to the first rotator hub assembly 100 can be adjusted to firmly grip therein and then re-adjusted to release the side of a golf bag, for example. A second baseplate module 400 mounted to the fifth rotator hub assembly 100 can be adjusted to firmly grip therein and then re-adjusted to release the bottom of the golf bag.

Example 14: Utility Cart and Shelf Assemblies

FIG. 47 is a perspective view of an exemplary utility cart assembly 960 comprising some of the exemplary modules disclosed herein. The system assembly as shown provides both an open tray and box tray carriage function for transporting equipment, properties, materials, supplies, and the like around a worksite or other location. Optionally, in place of wheel modules, similar assemblies may be configured with foot modules 580, 585, or grip end-cap modules 625 at its base for standing shelf and storage assemblies.

In this example, the utility cart system 960 comprises four pairs of 360° pivotable caster-style wheel module assemblies 550 which are of a similar configuration as those described in Example 2, Example 7, and Example 12, using the off-center bores of their wheel-axle/receptacle side-opening joiner modules 555. Attached upwardly from each of these wheel assembly's corresponding rotator modules 640, there engaged by a zero-unit double-male joiner module 281, is a 36-unit double-receptacle extension-tube joiner module 740 providing the basis of the cart's frame. Secured from these corner post joiner modules 740 via tray collars 474 are the cart's three tray module assemblies having each the tray bottom 471 and three or four side panels 478 for containment of the load (see description in reference to FIG. 18). The grip end-cap modules 625 are provided atop two of the joiner modules 740, there each engaged by a zero-unit double-male joiner module 281, for pushing or pulling the utility cart in any direction on the 360° pivotable wheel module assemblies 550.

Example 15: Modular Workstation Assembly

An example of a modular workstation assembly 980 is shown in FIG. 48.

This example comprises a rectangular table top 990, a shelf 482 situated above the table top 990, and a rotatable under-shelf 995 mounted underneath the table top 990 adjacent the right side of the assembly.

The bottom surface of the table top 990 is provided with four circular recesses close to each of the corners of the table top 990 (refer to FIG. 19B). Each recess is configured to receive and house therein a mounting plate 484. The mounting plate 484 with a central threaded bore 485 is inserted into the recess and securely mounted to the table top 990 with, for example, five screws 487 inserted through bores 486 provided therefor in the mounting plate 484. A male member flat-mount assembly 361 is mounted to the mounting plate 484 with a mounting bolt threadably engaged with the threaded bore 485. Then, the male member flat-mount assembly 361 is inserted into the receptacle in the end of a 24-unit double-receptacle side-opening joiner module 488 and secured in place as described for joiner module 251 in reference to FIG. 8B. All four modules 488 are mounted in this manner to the four corners of the table top 990. At the base of the four joiner modules 488, there may be provided foot components such as shown four soft end-cap components 680.

In this example, a fifth recess is provided on the bottom surface of the table top 990 to receive and engage therein a fifth mounting plate 484 mounted to a male member flat-mount assembly 361. The top surface of the under-shelf 995 shown in this example is provided with a recess near the rear edge of the shelf 995 for receiving and mounting therein a sixth mounting plate 484 mounted to a male member flat-mount assembly 361. One end of a 6-unit double-receptacle extension-tube rotator module 151 is engaged with the downward-extending male member flat-mount assembly 361 from the fifth mounting plate 484, while the other end is engaged with the upward-extending male member flat-mount assembly 361 from the sixth mounting plate 484. It is to be noted that the right edge of the under-shelf 995 has been contoured to matingly engage the side of the corresponding module 488 when rotated out from under the table top 990 toward the front right. One or more additional shelves 995 may be similarly engaged to the bottom of the table top 990.

This example also shows a shelf 482 provided at the rear of the table top 990 adjacent to the left edge. Two appropriately spaced-apart recesses 483 are provided along the rear edge of the table top 990 into which are inserted and mounted with screws 487, mounting plates 484 mounted to male member flat-mount assemblies 361 (as illustrated in FIG. 19B). A pair of complimentary recesses are provided in the bottom surface of the shelf 482 into which, are inserted a pair of mounting plates 484 mounted to male member flat-mount assemblies 361. One end of a 6-unit double-receptacle side-opening joiner module 489 is engaged with the downward-extending male member flat-mount assembly 361 from a mounting plate 484 mounted in a recess in the bottom surface of the shelf 482, while the other end is engaged with the upward-extending male member flat-mount assembly 361 from the mounting plate 484 mounted into the top surface of the table top 990.

It is to be noted that the table tops may be square, rectangular, trapezoidal, triangular, pentagonal, hexagonal, heptagonal, octagonal, decagonal, circular, kidney-bean shaped, wave-shaped, and may have other forms of symmetrical and asymmetrical curvilinear shapes. Although it will be most common that the modular table assemblies disclosed herein are provided with four legs, it is optional to provide three legs for triangular table tops, and alternatively, to provide two legs at the front edge of a table top that may have been configured to fold down against a wall when not in use, and to fold out when use is desired. In such two-leg configurations, the legs may fold up against the bottom surface of the table top when the table top is folded down, and to fold down when the table top is unfolded for use. Additionally, it is optional to provide table configurations with one or two legs on broad foot assemblies such as an A-frame configuration or the foot plate module 585, described in reference to FIG. 24C.

NUMBERING KEY 10-closed-tube rotator module (FIGS. 1, 2)
11-rotator receptacle
15-closed-tube housing
18 -tube-end screw slot
20-rotator receptacle assembly (FIG. 5)
21-lock-spring rotator half-socket
22-lock-release rotator half-socket
23-screw
24-outer bushing channel
26-outer bushing
28-inner bushing channel
30-inner bushing
32-pivot-lock channel
34-square-nut slot
36-square nut
38-side-mount bore
40-retaining-lock set screw
42-retaining-lock screw bore
44-release button hole
50-retaining lock
52-retaining half-lock with spring receptacles
54-retaining half-lock with release button
55-retaining lock-release button
56-biasing spring
58-tension-adjustment screw knob
60-pivot lock
62-pivot-lock indexing peg
64-pivot-lock button
65-lock-hold tab
70-male component
71-male member closed-tube end assembly
74-pivot-lock sprocket
78-wide pivot segment
79-octagonal boss assembly (FIG. 6B, 7)
81-octagonal recess
82-prongs
84-narrow pivot segment
86-retaining-lock chamfer
87a-first collar (with leading chamfer 86)
87b-second collar
88-neck
89-threaded bore
90-connector screw
100-closed-tube rotator hub assembly (FIG. 3A)
101-6-way closed-tube rotator hub assembly (FIG. 3B)
110-male member side-mount assembly (FIG. 3A, B)
112-pivot-lock sprocket
116-wide pivot component
118-octagonal boss
120-bolt
151-double-receptacle extension-tube rotator module (FIG. 4)
152-4-way double-receptacle extension-tube rotator hub assembly (FIG. 5)
155-extension-tube housing
160-side-mount bore
162-retaining-lock screw bore
164-release button hole
168-tube-end screw slot
170-longitudinal square-nut channel
180-middle square-nut holder
182-tube rail channels -continued

NUMBERING KEY 184-positioning-rod threaded bore
186-positioning set screw
201-closed-tube joiner hub assembly (FIG. 6A)
210-5-way closed-tube joiner hub
211-joiner receptacle
215-joiner closed-tube housing
216-pivot-lock sprocket
218-tube-end screw slots
220-joiner receptacle assembly
221-lock-spring joiner half-socket
222-lock-release joiner half-socket
223-prong-retaining slot (FIG. 6, 7)
224-outer bushing channel
228-inner bushing channel
234-square-nut slot
238-side-mount bore
244-release button hole
251-male/receptacle side-opening joiner module (FIG. 8)
252-side-opening receptacle
255-extension-tube housing
256-longitudinal square-nut channel
257-tube-end screw slots
258-side-mount bore
260-side-opening receptacle component
262-prong-retaining slot
265-side connector screw
268-side-opening receptacle cover
270-male member extension-tube end assembly
271-male member tube-end plate
272-pivot-lock sprocket (FIG. 8B, 10)
274-wide pivot segment
275-octagonal boss
278-screw hole
281-double-male joiner module (FIG. 9)
282-double-male component
284-pivot-lock sprocket (FIG. 9)
286-wide pivot segment module (FIG. 13D)
288-octagonal boss
291-double-male extension-tube joiner module (FIG. 10)
295-extension-tube housing
296-square-nut channel
297-tube-end screw slot
298-side-mount bore
301-6-way extension-tube joiner hub assembly (FIG. 11)
311-double-male adapter joiner module (FIG. 12)
312-adapter joiner component
314-alternative male member component
316-threaded screw slot
320-2-way 30° side-mount bracket module (FIG. 13A)
322-30° angle male member mount bracket
323-mount screw hole
325-mount screw
326- 60° angle between the 110s
328-clamp bracket
329clamp bracket screw
330-4-way multi-angle side-mount bracket module (FIG. 13B)
331-mount screw hole
332-mount screw
334-30°/45°/60° angled bores
335-multi-angle male member mount bracket
336-bracket screw bore
338-bracket screw
339-washer
340-2-way 90° offset side-mount bracket module (FIG. 13C)
341-90° angle offset male member mount bracket
342-mount screw hole
346-screw-access opening
350-1-way 45° offset side-mount bracket
351-cylindrical 45° offset male member mount bracket
352-mount screw hole
353-central bore
354-peg hole
355-elbow male member mounting block module
356-cube male member mounting block module
357-triangular male member mounting block module
358-pyramidal male member mounting block module
359-hexagonal male member mounting block module -continued

NUMBERING KEY 360-octagonal male member mounting block module
361-male member flat-mount assembly
362-pivot-lock sprocket (FIG. 13)
363-central bore
365-peg
366-wide pivot component slot
367-wide pivot component
368-connector teeth
369-octagonal boss
370-2-way elbow male member mounting block
371-central bore
372-peg holes
373-6-way cube male member mounting block
374-central bore
375-peg hole
376-5-way triangular mounting block
377-4-way pyramidal mounting block
378-8-way hexagonal mounting block
379-10-way octagonal mounting block
380-5° increment adjustable male member mount module (FIG. 15)
381-male-mount half housing
382-side-mount bore
383-adjustment screw through-hole
384-peg hole
385-adjustment screw
386-rotation-adjustment half housing
387-threaded bore
388-5° increment teeth
389-bracket screw bore
390a-bracket 1
390b-bracket 2
391-bracket screw
392-bracket screw bore
393-central bore
394-peg hole
395-alternative male member side-mount assembly
396-pivot-lock sprocket
397-central bore
399-wide pivot component slot
400-baseplate assembly (FIG. 16)
402-baseplate body assembly
402a-baseplate top plate
402b-baseplate bottom plate
404-mounting screw
405-baseplate bore
406-baseplate screw
408-mounting bracket slot
410-mounting bracket
412-bracket arm
413-threaded bore
415-bracket side plate
416-side plate threaded bore
417-support plate
418-support pad
419-side plate screw
420-male member plate assembly
422-mounting plate
423-pivot-lock sprocket
424-wide pivot segment
425-octagonal boss
426-screw hole
428-screws
430-baseplate assembly (FIG. 17)
435-tool mount plate
436-mounting screw
437-tool-mounting slot
440-plate screw holes module
441-access bores
442-screws
445-plate wedges
446-plate screw bores
447-bracket screw holes
450-male mount slider component
452-mounting holes
453-mount screws
454-central bore
455-peg holes

NUMBERING KEY 456-bracket screw bores
460-double-receptacle extension-tube joiner module (FIG. 17)
465-male/receptacle extension-tube joiner module (FIG. 17)
466-longitudinal channel
470-tray module assembly (FIG. 18)
471-tray bottom
472-orifice
473-collar bores
474-collar
475-double-receptacle extension-tube joiner module
476-collar screw
477-longitudinal square-nut channel
478-side panel
479-side panel screw
480-desk assembly (FIG. 19)
481-desk top
482-shelf
483-plate recess
484-mounting plate
485-threaded bore
486-screw bores (x5 per side)
487-plate screws (x5 per side)
488-double-receptacle side-opening joiner module
489-double-receptacle side-opening joiner
490-lighting mount module (FIG. 20A, B)
492-extension-tube housing
494-spigot mount plate
495-tube-end screw bores
496-threaded bore
497-screw
498-demountable 5/8" spigot
500-lighting mount module (FIG. 20C, D)
501-spigot-adapter male member component
502-spigot
503-spigot receptacle
504-set screw
505-screw bore
506-pivot-lock sprocket
507-wide pivot segment
510-rail-rolling module (FIG. 21A, 22)
512-carriage plate
514-spring-suspension roller assembly
516-axle block
518-roller
520-axle bolt
522-spring block
524 -suspension bolt
526-spring tension set-screw
528-spring tension plate
530-spring
532-spacer plate
535-fixed roller assembly
536-axle block
537-rail-surround rolling module assembly (FIG. 21B, 22)
538-side plate
540-friction-pad plate
542-friction pad
544-tension adjustment knob
546-pad plate spring
548-retaining ring
550-wheel module assembly (FIG. 23A, B)
551-wheel-axle tube-end component
551a-central threaded bore
551b-offset threaded bores
552-wheel
554-axle bolt
555-wheel-axle/receptacle side-opening joiner module
560-caster wheel module assembly (FIG. 23C, D)
562-mount component
564-threaded bore
566-peg hole
568-caster wheel
580-leveling foot module (FIG. 24A, B)
581-adjustable foot component
582-threaded leveling rod
583-foot end
584-nut
585-foot plate module (FIG. 24C)
586-foot plate
587-threaded bores
590-pivotable support module (FIG. 25)
592-pivot bracket
593-lock nut
594-pad component
595-threaded bores
596-suction-cup component
598-knob
599-washer
600-weight module assembly (FIG. 26)
602-weight component
603a-outer bores
603b-center bore
604-bolt
605-double-receptacle extension-tube rotator module (similar to FIG. 4)
606-extension-tube housing
608-longitudinal square-nut channel
610-telescoping extension module (FIG. 27)
612-extension-tube housing
614-rod-retaining component
616-rod-retaining plate
618-adjustment collar component
619-screws
620-threaded rod
621-second threaded portion
622-spacer plate
624-lock nut
625-grip end-cap module (FIG. 28)
626-handle grip component
627-semi-circular end-cap portion
628-hand grip portion
629-inner sleeve
630-prong-retaining slot
631-outer sleeve
632-retainer tab
635-shell end-cap module (FIG. 29)
636-half-shell cap
637-screw
638-bore
640-male/receptacle extension-tube rotator module (FIG. 29)
641-female dome pad end-cap module (FIG. 30A, B)
642-female dome pad
643-collapsible framework
645-central orifice
646-female dome mounting plate
647-bores
648 -screw
649-mounting plate orifice
650-male dome pad end-cap module (FIG. 30C, D)
652-male dome pad
653-dome collapsible framework
654-male dome mounting plate
656-bore
657-peg holes
658-bores
660-seat module (FIG. 31)
662-seat pad
670-bumper end-cap module (FIG. 32)
672-bumper component
674-screw
680-soft end-cap component (FIG. 33A, B, C)
681-elongate leg component
682-mount plate
683-bores
685-screws
686-inserts
688-soft dome component
689-threaded bore
690-hard end-cap component
691-leg component
692-retaining-lock chamfer
693-flat surface
695-flat end-cap component
696-bore
697-extension-tube housing -continued

NUMBERING KEY 698-threaded screw slot
700-crab-steering dolly system
710-10-unit double-receptacle extension-tube rotator module
720-3-unit male/receptacle extension-tube joiner module
730-18-unit double-receptacle extension-tube joiner module
740-36-unit double-receptacle extension-tube joiner module
750-4-unit male/receptacle extension-tube joiner module
754-12-unit male/receptacle extension-tube joiner module
756-4-unit double-male extension-tube joiner module
760-vertical rail-tracking dolly system
765-18-unit male/receptacle extension-tube joiner module
770-lateral mounted rail-tracking dolly system
780-rolling jib system
790-10-unit double-receptacle extension-tube joiner module
800-10-unit wheel-axle/receptacle side-opening joiner module
810-low-angle baseplate support system
820-4-unit male/receptacle extension-tube rotator module
830-18-unit double-receptacle extension-tube rotator module
840-1-unit double-male extension-tube joiner module
850-lateral ground rail-tracking dolly system
860-double-baseplate A-frame dolly system
870-four-caster baseplate dolly system
880-hand-held camera stabilizer assembly
900-vertical rail-tracking stand assembly
910-lighting support rack system
920-36-unit double-receptacle extension-tube rotator module
930-A-frame spooling cart system
940-6-unit male/receptacle side-opening
950-pull cart assembly
955-3-unit double-male extension-tube
960-utility cart assembly joiner module
980-modular workstation assembly
990-table top
995-under-shelf joiner module

The invention claimed is:

1. A kit of portable modular components for use in demountably configuring a structural assembly, the kit comprising:
   two or more of a male end component having a distal end comprising a cylindrical body having at least one linear set of prongs around a circumferential surface of the cylindrical body wherein each set of prongs has two or more spaced apart prongs, and a proximal end comprising one of a flat base or a concave base; and
   one or more of a first elongate structural support component having a pair of opposed female ends; and/or
   one or more of a second elongate structural support component having the male end component at one end and the female end at the opposite end; and/or
   one or more of a third elongate structural support component having the female end at one end and an end cap at the opposite end;
   wherein each of said female ends has a cylindrical receptacle configured for demountably receiving and engaging therein the cylindrical body; and
   each of said female ends is provided with one or more locking assemblies for releasable engagement therein with the male end component at the end of one of the second elongate structural support component; or
   the male end component extending radially from one of the first, second, or third elongate structural support components; or
   the male end component at an end of or extending radially from one of a fourth elongate structural support component having a pair of opposed male ends, or
   the male end component at the end of or extending radially from one of a fifth elongate structural support component having the male end component at one end and an end cap at the opposite end; or
   the male end component extending radially from one of a sixth elongate structural support component having a pair of opposed end caps.

2. A kit according to claim 1, wherein the receptacle has one or more linear channels for slidingly receiving therein the at least one linear set of prongs.

3. A kit according to claim 1, wherein the receptacle has one or more prong-retaining slots for slidingly receiving therein the at least one linear set of prongs.

4. A kit according to claim 1, wherein one or more of said female ends are provided with a first locking assembly for releasable engagement therein with one of the male end component.

5. A kit according to claim 4, wherein the first locking assembly is configured for reversibly engaging a first lock sprocket provided at a base of the male end component extending outward from another one of the portable modular components.

6. A kit according to claim 5, wherein the locking assembly comprises an extendible and retractable indexing peg.

7. A kit according to claim 5, wherein the first lock sprocket provided at the base of a first male end component has a flat surface for demountable engagement of the first male end component with a flat surface of one of the portable modular components.

8. A kit according to claim 5, wherein a second lock sprocket provided at the base of a second male end component has a concave surface for demountable engagement of the second male end component with a round surface of one of the portable modular components.

9. A kit according to claim 1, wherein at least one of said female ends is provided with a second locking assembly comprising a retaining lock having a retaining half-lock with one or more spring receptacles in cooperation with a retaining half-lock with a release button.

10. A kit according to claim 1, wherein an exterior side wall of the receptacle is provided with a demountably engageable hatch extending longitudinally therealong, whereby demounting the hatch opens the cylindrical receptacle for a sideway insertion of the cylindrical body into the receptacle and reengaging the hatch and threadably engaging a screw or a bolt with the hatch securely engages the cylindrical body with the receptacle.

11. A kit according to claim 1, wherein one of the male end components is rotatable around a longitudinal axis of one of the female ends of one of the first, the second, or the third elongate structural support component.

12. A kit according to claim 1, additionally comprising one or more modules configured for demountable engagement of an imaging device or a sound recording device or a sound reproduction device or a lighting device or a light-directing device or a wheel assembly or a mounting plate for a power tool wherein each of said modules comprises: (i) a male end component for a rotational or a fixed demountable engagement with a female end at the end of the first, the second, or the third elongate structural support component, or (ii) a female end component for a rotational or a fixed demountable engagement with a male end component at the end of or extending radially from the first, the second, the third, the fourth, the fifth, or the sixth elongate structural support component.

13. A kit according to claim 1, additionally comprising one or more of a wheel module or a counter-weight balance module or a dome pad module or a seat module wherein each of said wheel module, said counter-weight balance module, said dome pad module, and said seat module comprises: (i) a male end component for a rotational or a fixed demountable engagement with a female end at the end of the first, the second, or the third elongate structural support component, or (ii) a female end component for a rotational or a fixed demountable engagement with a male end component at the end of or extending radially from the first, the second, the third, the fourth, the fifth, or the sixth elongate structural support component.

14. A kit according to claim 1, additionally comprising one or more of a capping module wherein said capping module comprises: (i) a male end component for demountable engagement with a female end at the end of the first, the second, or the third elongate structural support component, or (ii) a female end component for demountable engagement with a male end component at the end of or extending radially from the first, the second, the third, the fourth, the fifth, or the sixth elongate structural support component.

15. A kit according to claim 14, wherein the capping module is one or more of a handgrip module, a handle module, a fixed-foot module, an adjustable-foot module, a capped end plug module, a cap plate module, a bumper module, and a suction-cup module.

16. A kit according to claim 1, wherein an elongate structural element is interposed on the pair of opposed ends of the first, the second, the third, the fourth, the fifth, or the sixth elongate structural support component, wherein the elongate structural element is a tube or a rod, said tube or said rod having a circular cross-section or an elliptical cross-section or a square cross-section or a rectangular cross-section or a trapezoidal cross-section or a triangular cross-section or a hexagonal cross-section or an octagonal cross-section or a decagonal cross-section or an I-shaped cross-section.

17. A kit according to claim 16, wherein one or more of the elongate structural element has one or more demountable male end components extending radially outward therefrom, each of said male end components comprising a cylindrical body with at least one linear set of prongs on the circumferential surface of the cylindrical body, wherein each set of prongs has two or more spaced apart prongs, and wherein each of the male end components is configured for a rotational or a fixed demountable engagement with the female ends.

18. A kit according to claim 1, additionally comprising one or more flat sheet-stock modules to which one or more male end components are fastenable, or through which one or more orifice(s) provided in the flat sheet-stock therefor, one or more of the first, the second, or the third elongate structural support component are demountably engageable.

19. A kit according to claim 1, additionally comprising one or more of a tray assembly comprising:
- a tray bottom component wherein each corner is at least partially internally radiused;
- a plurality of the portable modular components, wherein both ends are provided with a female cylindrical receptacle or both ends are provided with a male end or one end is provided with a female cylindrical receptacle and the other end is provided with a male end, and wherein each of the plurality of modular components has a diameter that slidingly engages one of the at least partially internally radiused corners of the tray bottom component;
- wherein each of the plurality of portable modular components is slidingly engaged with one or more collar component(s), said collar component(s) configured for demountable engagement with the portable modular component thereby providing a stable support for the tray bottom component.

20. A kit according to claim 19, additionally comprising one or more tray side components wherein each tray side component is demountably engaged with one or more collar components demountably engaged with opposing portable modular components positioned at the corners of the tray bottom component.

21. A kit according to claim 1, additionally comprising one or more two-piece collar clamp(s) wherein an outward-facing surface of the one or more pieces of the two-piece collar clamp(s) is/are configured for demountable engagement with one male end component or two male end components or three male end components or four male end components.

22. A kit according to claim 21, wherein the one or more two-piece collar clamps are configured for demountable engagement with the first, the second, the third, the fourth, or the fifth elongate structural support component.

23. A kit according to claim 1, additionally comprising one or more three-piece collar clamps wherein (i) one of the pieces of the collar clamp is configured for encircling one half of a shaft, said piece having an outward-facing surface configured for demountable engagement with one male end component or two male end components or three male end components or four male end components, and (ii) wherein the other two pieces are matching and are configured for encircling one quarter of the shaft.

24. A kit according to claim 21, wherein one or more of the collar clamps are additionally configured for demountable engagement with a flat plate.

25. A kit according to claim 24, wherein the flat plate is configured for demountable engagement of an imaging device or a sound recording device and/or a sound reproduction device or a lighting device or a light-directing device or a power tool.

26. A kit according to claim 23, wherein one or more of the collar clamps are additionally configured for demountable engagement with a flat plate.

27. A kit according to claim 26, wherein the flat plate is configured for demountable engagement of an imaging device or a sound recording device or a sound reproduction device or a lighting device or a light-directing device or a power tool.

28. A kit according to claim 1, additionally comprising one or more mounting blocks for demountable engagement with one or more outward-facing male end components.

29. A kit according to claim 28, wherein the mounting block is one of a cube or an equilateral pyramid having a base and three upward-extending surfaces or an equilateral pyramid having a base and four upward-extending surfaces.

30. A kit according to claim 28, wherein the mounting block is one of a round shape, a triangular block, a square block, a rectangular block, a pentagonal block, a hexagonal block, a heptagonal block, an octagonal block, and a decagonal block.

31. A kit according to claim 1, additionally comprising one or more first rail-rolling modules wherein each rail-rolling module comprises:
- a carriage plate having an outward-facing surface and an opposed inward rail-facing surface;
- a male end component engaged with the outward-facing surface of the carriage plate, said male end component comprising a cylindrical body with at least one linear set of spaced-apart prongs on the circumferential surface of the cylindrical body; and a pair of roller assemblies engaged with the carriage plate at approximate opposite ends of the carriage plate, wherein each of the roller assemblies comprises an axle block having matching inclined axle ends extending toward or from the inward rail-facing surface of the carriage plate and a free-spinning roller demountably engaged with each inclined axle end.

32. A kit according to claim 31, wherein each of the inclined axle ends extends toward or from the inward rail-facing surface of the carriage plate by an angle selected from a range of 5 degrees to 80 degrees.

33. A kit according to claim 31, wherein a spacer plate is demountably engaged with the outward-facing surface of the carriage plate whereon the male end component is demountably engaged with the spacer plate.

34. A kit according to claim 31, wherein each of the roller assemblies is fitted with a shock-absorbing element.

35. A kit according to claim 31, wherein the inward rail-facing surface of the carriage plate is fitted with a deployable and retractable friction plate for controllable engagement and disengagement with a rail.

36. A kit according to claim 31, additionally comprising a second rail-rolling module wherein the second rail-rolling module comprises two first rail-rolling modules interconnected by at least one side plate wherein the side plate is affixed at a first end to the inward rail-facing surface or a side edge of the carriage plate interposed the pair of roller assemblies of one of said first rail-rolling modules, and wherein the side plate is affixed at a second opposite end to the inward rail-facing surface or a side edge of the carriage plate interposed the pair of roller assemblies of the other of said first rail-rolling modules.

37. A kit according to claim 36, wherein an outward-facing surface of the at least one side plate is engaged with: (i) an outward-extending male end component, or (ii) a spacer plate whereon the male end component is engaged with the spacer plate.

38. A kit of parts for configuring a rail-rolling module assembly, comprising:
a carriage plate having an outward-facing surface and an opposed inward rail-facing surface, wherein the outward-facing surface is a demountable spacer plate;
a male end engaged with the outward-facing surface of the carriage plate, said male end comprising a cylindrical body with at least one linear set of spaced-apart prongs on a circumferential surface of the cylindrical body; and
a pair of roller assemblies engaged with the carriage plate at approximate opposite ends of the carriage plate, wherein each of the roller assemblies comprises an axle block having matching inclined axle ends extending toward or from the inward rail-facing surface of the carriage plate and a roller demountably engaged with each said inclined axle end.

39. A kit according to claim 38, wherein each of the inclined axle ends extends toward or from the inward rail-facing surface of the carriage plate by an angle selected from a range of 5 degrees to 80 degrees.

40. A kit according to claim 38, wherein the male end is demountably engaged with the demountable spacer plate.

41. A kit according to claim 38, wherein each of the roller assemblies is fitted with a shock-absorbing element.

42. A kit according to claim 38, wherein the inward rail-facing surface of the carriage plate is fitted with a deployable and retractable friction plate for controllable engagement and disengagement with a rail.

43. A kit according to claim 38, additionally comprising a second rail-rolling module wherein the second rail-rolling module comprises two first rail-rolling modules interconnected by at least one side plate wherein the side plate is affixed at a first end to the inward rail-facing surface or a side edge of the carriage plate interposed the pair of roller assemblies of one of said first rail-rolling modules, and wherein the at least one side plate is affixed at a second opposite end to the inward rail-facing surface or a side edge of the carriage plate interposed the pair of roller assemblies of the other of said first rail-rolling modules.

44. A kit according to claim 43, wherein an outward-facing surface of the at least one side plate is engaged with: (i) an outward-extending male end, or (ii) a spacer plate whereon the male end is engaged with the spacer plate.

45. A kit of parts for configuring a rail-rolling device, the device comprising:
a top carriage plate having an outward-facing surface, an opposed inward rail-facing surface, a pair of roller assemblies engaged with said top carriage plate at approximate opposite ends of said top carriage plate, wherein each assembly of the pair of roller assemblies comprises an axle block having matching inclined axle ends extending toward or from the inward rail-facing surface of said top carriage plate, and wherein each of said inclined axle ends has a free-spinning roller demountably engaged with each end;
a bottom carriage plate having an outward-facing surface, an opposed inward rail-facing surface; and a pair of roller assemblies engaged with said bottom carriage plate at approximate opposite ends of said bottom carriage plate, wherein each assembly of the pair of roller assemblies comprises an axle block having matching inclined axle ends extending toward or from the inward rail-facing surface of said bottom carriage plate and wherein each of said inclined axle ends has a free-spinning roller demountably engaged with each end; and
at least one first side plate affixed at a first end to the inward rail-facing surface or a side edge of said top carriage plate interposed on the pair of roller assemblies, and wherein the at least one said first side plate is affixed at a second opposite end to the inward rail-facing surface or a side edge of said bottom carriage plate interposed on the pair of roller assemblies.

46. A kit according to claim 45, wherein each of the inclined axle ends extends toward or from the inward rail-facing surface of the top carriage plate and the bottom carriage plate by an angle selected from a range of 5 degrees to 80 degrees.

47. A kit according to claim 45, wherein an outward-facing surface of the top carriage plate and/or the bottom carriage plate is engaged with: (i) an outward-extending male end, or (ii) a spacer plate whereon is engaged the outward-extending male end.

48. A kit according to claim 45, wherein each of the roller assemblies is fitted with a shock-absorbing element.

49. A kit according to claim 45, wherein the inward rail-facing surface of the top carriage plate and/or the bottom carriage plate is fitted with a deployable and retractable friction plate for controllable engagement and disengagement with a rail.

50. A kit according to claim 45, wherein an outward-facing surface of the at least one first side plate is engaged with: (i) an outward-extending male end, or (ii) a spacer plate whereon is engaged the outward-extending male end.

51. A kit according to claim 45, wherein a second side plate is interposed on the top carriage plate and the bottom carriage plate opposite the at least one first side plate.

52. A kit according to claim 51, wherein an outward-facing surface of the second side plate is engaged with: (i) an outward-extending male end, or (ii) a spacer plate whereon is engaged the outward-extending male end.

\* \* \* \* \*